US012288929B2

(12) United States Patent
Anguera Pros et al.

(10) Patent No.: US 12,288,929 B2
(45) Date of Patent: Apr. 29, 2025

(54) WIRELESS HANDHELD DEVICES, RADIATION SYSTEMS AND MANUFACTURING METHODS

(71) Applicant: IGNION, S.L., Barcelona (ES)

(72) Inventors: Jaume Anguera Pros, Vinaros (ES); Aurora Andujar Linares, Barcelona (ES); Carles Puente Baliarda, Barcelona (ES)

(73) Assignee: IGNION, S.L., Barcelona (ES)

( * ) Notice: Subject to any disclaimer, the term of this patent is extended or adjusted under 35 U.S.C. 154(b) by 0 days.

(21) Appl. No.: 18/327,675

(22) Filed: Jun. 1, 2023

(65) Prior Publication Data

US 2023/0318169 A1 Oct. 5, 2023

Related U.S. Application Data

(60) Continuation of application No. 17/882,188, filed on Aug. 5, 2022, now abandoned, which is a (Continued)

(51) Int. Cl.
*H01Q 1/24* (2006.01)
*H01Q 1/22* (2006.01)

(Continued)

(52) U.S. Cl.
CPC ........... *H01Q 1/243* (2013.01); *H01Q 1/2283* (2013.01); *H01Q 1/36* (2013.01); *H01Q 1/38* (2013.01);

(Continued)

(58) Field of Classification Search
CPC ...... H01Q 9/06; H01Q 9/0421; H01Q 9/0414; H01Q 1/36; H01Q 1/2283; H01Q 1/243
See application file for complete search history.

(56) References Cited

U.S. PATENT DOCUMENTS 6,064,283 A 5/2000 Asada
6,388,631 B1 5/2002 Livingston (Continued)

FOREIGN PATENT DOCUMENTS

EP 1569300 8/2005
JP 2002064601 2/2002

(Continued)

OTHER PUBLICATIONS

Aguilar , D. ; Anguera , J. ; Puente , C. ; Ribo , M., Small handset antenna for FM reception, Microwave and Optical Technology Letters, Oct. 1, 2008.

(Continued)

*Primary Examiner* — Graham P Smith
(74) *Attorney, Agent, or Firm* — Edell, Shapiro & Finnan, LLC

(57) ABSTRACT

A stand-alone component for a radiating system of a wireless device comprises a dielectric support and first and second surfaces respectively comprising first and a second conductive surface elements spaced by the dielectric support and electrically connected by a conductor. The stand-alone component features a parallelepiped shape, and the first and second surfaces are polygons. The first and second surfaces are the largest surfaces of the parallelepiped component. The stand-alone component has a maximum size smaller than a longest operating wavelength of the stand-alone component divided by 20 and is connected to a radiofrequency system and coupled to a ground plane within the radiating system.

31 Claims, 39 Drawing Sheets

Related U.S. Application Data continuation of application No. 16/922,633, filed on Jul. 7, 2020, now Pat. No. 11,450,945, which is a continuation of application No. 16/280,525, filed on Feb. 20, 2019, now Pat. No. 10,749,246, which is a division of application No. 15/835,007, filed on Dec. 7, 2017, now abandoned, which is a continuation of application No. 15/093,513, filed on Apr. 7, 2016, now Pat. No. 9,865,917, which is a continuation of application No. 13/946,922, filed on Jul. 19, 2013, now Pat. No. 9,331,389, which is a continuation-in-part of application No. 13/803,100, filed on Mar. 14, 2013, now Pat. No. 9,379,443.

(60) Provisional application No. 61/671,906, filed on Jul. 16, 2012.

(51) Int. Cl.

| | |
|---|---|
| ***H01Q 1/36*** | (2006.01) |
| ***H01Q 1/38*** | (2006.01) |
| ***H01Q 1/48*** | (2006.01) |
| ***H01Q 7/00*** | (2006.01) |
| ***H01Q 9/04*** | (2006.01) |
| ***H01Q 9/06*** | (2006.01) |

(52) U.S. Cl.
CPC ................ *H01Q 1/48* (2013.01); *H01Q 7/00* (2013.01); *H01Q 9/0414* (2013.01); *H01Q 9/0421* (2013.01); *H01Q 9/06* (2013.01)

(56) References Cited

U.S. PATENT DOCUMENTS

| | | | |
|---|---|---|---|
| 6,762,723 | B2 | 7/2004 | Di Nallo |
| 6,791,498 | B2 | 9/2004 | Boyle |
| 6,873,299 | B2 | 3/2005 | Dakeya |
| 7,079,077 | B2 | 7/2006 | Lee |
| 7,205,944 | B2 | 4/2007 | Lee |
| 7,274,340 | B2 | 9/2007 | Ozden et al. |
| 7,345,634 | B2 | 3/2008 | Ozkar et al. |
| 7,405,698 | B2 | 7/2008 | de Rochemont |
| 7,417,591 | B2 | 8/2008 | Iguchi et al. |
| 7,760,146 | B2 | 7/2010 | Ollikainen |
| 7,764,236 | B2 | 7/2010 | Hill |
| 7,821,461 | B2 | 10/2010 | Lai et al. |
| 7,940,222 | B2 | 5/2011 | Man et al. |
| 8,178,457 | B2 | 5/2012 | De Rochemont |
| 8,237,615 | B2 | 8/2012 | Anguera et al. |
| 8,565,891 | B2 | 10/2013 | Mumbru et al. |
| 8,659,485 | B2 | 2/2014 | Lan et al. |
| 8,730,109 | B2 | 5/2014 | Despesse |
| 9,379,443 | B2 | 6/2016 | Anguera et al. |
| 9,537,223 | B2 | 1/2017 | Hall et al. |
| 9,577,325 | B2 | 2/2017 | Andújar et al. |
| 2003/0063036 | A1 | 4/2003 | Sato et al. |
| 2003/0193437 | A1 | 10/2003 | Kangasvieri |
| 2006/0214856 | A1 | 9/2006 | Nakano et al. |
| 2007/0146212 | A1 | 6/2007 | Ozden |
| 2007/0152885 | A1 | 7/2007 | Sorvala |
| 2008/0018543 | A1 | 1/2008 | Baliarda et al. |
| 2009/0051597 | A1 | 2/2009 | Wen et al. |
| 2009/0051615 | A1 | 2/2009 | Wen et al. |
| 2009/0128425 | A1 | 5/2009 | Kim et al. |
| 2009/0322619 | A1 | 12/2009 | Ollikainen et al. |
| 2010/0073253 | A1 | 3/2010 | Ollikainen et al. |
| 2010/0176999 | A1 | 7/2010 | Anguera et al. |
| 2011/0117976 | A1 | 5/2011 | Nishikido et al. |
| 2012/0288762 | A1 | 11/2012 | Hardin |
| 2013/0004658 | A1 | 1/2013 | Yang |
| 2014/0300518 | A1 | 10/2014 | Ramachandran et al. |
| 2014/0375521 | A1 | 12/2014 | Andújar et al. |
| 2016/0285166 | A1 | 9/2016 | Andújar Linares et al. |

FOREIGN PATENT DOCUMENTS

| | | |
|---|---|---|
| JP | 2005175846 | 6/2005 |
| JP | 2008167172 | 7/2008 |
| WO | 02/13306 | 2/2002 |
| WO | 02/095869 | 11/2002 |
| WO | 2007/039668 | 4/2007 |
| WO | 2007/074369 | 7/2007 |
| WO | 2007/128340 | 11/2007 |
| WO | 2007/141187 | 12/2007 |
| WO | 2008/009391 | 1/2008 |
| WO | 2008/119699 | 10/2008 |
| WO | 2010/015364 | 2/2010 |
| WO | 2010/015365 | 2/2010 |
| WO | 2011/095330 | 8/2011 |
| WO | 2012/017013 | 2/2012 |
| WO | 2012/100178 | 7/2012 |

OTHER PUBLICATIONS

Andujar , A. ; Anguera , J. ; Picher , C. ; Puente , C., Human head interaction over ground plane booster antenna technology: functional and biological analysis, Progress in Electromagnetics Research (PIER) B, Jun. 1, 2012, vol. 41.

Andujar , A. ; Anguera , J. ; Puente , C., Ground plane boosters as a compact antenna technology for wireless handheld devices, Antennas and Propagation, IEEE Transactions on, May 1, 2011, vol. 5, No. 59.

Andujar , A. ; Anguera , J. ; Puente , C., Ground plane boosters to provide multi-band operation in wireless handheld devices, Antennas and Propagation (EUCAP), 5th , 2011. European Conference on, Apr. 11, 2011.

Anguera , J. ; Daniel , J. ; Borja , C. ; Mumbru , J. ; Puente , C. ; Leduc , T. ; Sayegrih , K. ; Roy , P., Metallized foams for antenna design: Application to fractal shaped sierpinski-carpet monopole, Progress in Electromagnetics Research (PIER) 104, May 1, 2010, No. 104.

Anguera , J. ; Daniel , J. P. ; Borja , C. ; Mumbru , J. ; Puente , C. et al., Metallized foams for fractal-shaped microstrip antennas, Antennas and Propagation Magazine, IEEE, Dec. 1, 2008.

Arzemi , A. ; Tovainen , J. ; Laitinen , T. et al, On diversity performance of Two-Element coupling element based antenna structure for mobile terminal, Antennas and Propagation (EUCAP), 4th , 2010. European Conference on, Apr. 12, 2010.

Buchholz , M. et al, Analysis, realisation and measurement of broadband miniature antennas for digital TV receivers in handheld terminals, Broadband Multimedia Systems and Broadcasting Preliminary Program (BMSB), 2006. IEEE International Symposium on, Apr. 6, 2006.

Cabedo Fabres , M., Systematic design of antennas using the theory of characteristic modes, Universitat Politecnica de Valencia, Feb. 1, 2007.

Chan , S. P., The electrical engineering handbook, Boca Raton CRC Press, Jan. 14, 2000.

Chaudhury , S. K. ; Chaloupka , H. J. ; Ziroff , A., Novel MIMO antennas for mobile terminal, Microwave Conference (EuMC), 38th , 2008. European, Oct. 27, 2008.

Chu, L.J., Physical limitations of omnidirectional antennas, Journal of Applied Physics, No. 19, p. 1163-1175, Dec. 1, 1948.

Fujimoto, K., Antennas for mobile communications, Encyclopedia of RF and Microwave Engineering, John Wiley & Sons, 2005, pp. 355, 357.

Gongora , S., Compact architectures of ground plane boosters for laptop and smartphones platforms : Analisis y diseño de arquitecturas compactas de ground-plane booster para plataformas smartphone y laptop, Universitat Ramon Llull—La Salle, Jan. 1, 2012.

Holopainen , J., Antenna for handheld DVB terminal—Full, Helsinki University of Technology, May 17, 2005.

Holopainen , J., Mobile terminal antennas implemented by using direct coupling, Antennas and Propagation (EUCAP), 1st , Nice, 2006. European Conference on, Nov. 6, 2006.

(56) References Cited

OTHER PUBLICATIONS

Holopainen , J. ; Villanen , J. ; Valkonen , R. et al, Mobile terminal antennas implemented using optimized direct feed, Antenna Technology (IWAT), 2009. IEEE International Workshop on, Mar. 2, 2009.
Holopainen , J. et al, Antenna for handheld DVB terminal, Antenna Technology : Small Antennas and Novel Metamaterials (IWAT), 2006. IEEE International Workshop on, Mar. 8, 2006.
Ikonen, P., "Artificial electromagnetic composite structures in selected microwave applications," Helsinki University of Technology Radio Laboratory Publications, Report S 285, Mar. 2007, p. 32-33.
Kildal , P. et al, Report on the state of the art in small terminal antennas: technologies, requirements and standards, ACE (Antenna Centre of Excellence), Dec. 22, 2004.
Kivekas , O. et al., Design of high-efficiency antennas for mobile communications devices, Helsinki University of Technology, Aug. 1, 2005.
Kyro , M. ; Mustonen , M. et al., Dual-element antenna for DVB-H terminal, Loughborough (LAPC), 2008. Antennas and Propagation Conference, Mar. 17, 2008.
Leiva , J. L., Analysis and design of distributed antenna systems robust to the effects of the hand—Analisis y diseño de sistemas distribuidos de antenas robustos a los efectos de la mano, Universitat Ramon LLull (URL)—La Salle, Jan. 1, 2011.
Martens , R. ; Safin , E. ; Manteuffel , D., Selective excitation of characteristic modes on small terminals, Antennas and Propagation (EUCAP), 5th , 2011. European Conference on, Apr. 1, 2011.
Martinez-Vazquez , M., Design of antennas for mobile communications devices: practical aspects, Antennas and Propagation Society (APS), 2011. IEEE International Symposium, Aug. 1, 2011.
Ollikainen , J. et al., Design and implementation techniques of wideband mobile communications antennas, Helsinki University of Technology, Nov. 1, 2004.
Picher , C. ; Anguera , J. ; Andujar , A. ; Puente , C., Multiband handset antennas by combining monopoles and Intelligent ground planes, Antennas and Propagation (EUCAP), 6th , 2012. European Conference on, Mar. 1, 2012.
Poutanen , J., Interaction between mobile terminal antenna and user, Helsinki University of Technology, Sep. 10, 2007.
Rahola , J. ; Ollikainen , J., Optimal antenna placement for mobile terminals using characteristic mode analysis, Antennas and Propagation (EUCAP), 1st , Nice, 2006. European Conference on, Nov. 1, 2006.
Song , C.T.P. et al., Wide tunable dual-band reconfigurable antenna for future wireless devices, Loughborough (LAPC), 2009. Antennas and Propagation Conference, Nov. 16, 2009.
Vainikainen , P ; Mustonen , M ; Kyrö , M. et al, Recent development of MIMO antennas and their evaluation for small mobile terminals, 17th International Conference on Microwave Radar and Wireless Communications (MIKON), May 19, 2008.
Vainikainen , P., Design and measurements of small antennas for mobile terminals—Part II, Helsinki University of Technology, Jun. 22, 2006.
Valkonen , R. ; Luxey , C. ; Holopainen , J., Frequency-reconfigurable mobile terminal antenna with MEMS switches, 4th European Conference on Antennas and Propagation (EUCAP), Apr. 12-17, 2010.
Valkonen , R. et al., Broadband tuning of mobile terminal antennas, 2nd European Conference on Antennas and Propagation (EUCAP), Nov. 8, 2007.
Valkonen , R., Impedance matching and tuning of non-resonant mobile terminals antennas, Aalto University, Mar. 15, 2013.
Villanen , J., Miniaturization and evaluation methods of mobile terminal antenna structures, Helsinki University of Technology. Radio Laboratory Publications, Sep. 3, 2007.
Villanen , J., Coupling element based mobile terminal antenna structures, Transactions on Antennas and Propagation, IEEE, Jul. 1, 2006.
Villanen , J., Compact antenna structures for mobile handsets, 58th Vehicular Technology Conference (VTC), IEEE Oct. 6, 2003.
Villanen , J., Mobile broadband antennas, Simposium Nacional de la Union Cientifica Internacional de la Radio (URSI), Gandia, Oct. 20, 2005.
Villanen , J., Mobile terminal antennas, Helsinki University of Technology, Feb. 1, 2005.
Wheeler, H.A., Fundamental limitations of small antennas, Proceedings of the IRE, vol. 35, issue 12, p. 1475-1484, Dec. 1, 1947.
Wong , K. L., Planar antennas for wireless communications_Full, Wiley Interscience, Jan. 1, 2003.
Zhao , H. ; Lin , G. ; Beckman , C., Design of a coupling element based penta-band mobile phone antenna, Loughborough Antennas and Propagation Conference (LAPC), Nov. 16, 2009.

WIRELESS HANDHELD DEVICES, RADIATION SYSTEMS AND MANUFACTURING METHODS

CROSS REFERENCE TO RELATED APPLICATIONS

This application is a continuation of U.S. patent application Ser. No. 17/882,188 filed Aug. 5, 2022, which is a continuation of U.S. patent application Ser. No. 16/922,633 filed Jul. 7, 2020, which is now U.S. Pat. No. 11,450,945 issued on Sep. 20, 2022, which is a continuation of U.S. patent application Ser. No. 16/280,525 filed Feb. 20, 2019, which is now U.S. Pat. No. 10,749,246, issued on Aug. 18, 2020, which is divisional of U.S. patent application Ser. No. 15/835,007 filed Dec. 12, 2017, now abandoned, which is a continuation of U.S. patent application Ser. No. 15/093,513 filed Apr. 7, 2016, which is now U.S. Pat. No. 9,865,917, issued on Jan. 9, 2018, which is a continuation of U.S. patent application Ser. No. 13/946,922 filed Jul. 19, 2013, which is now U.S. Pat. No. 9,331,389, issued on May 3, 2016, which is a continuation-in-part of U.S. patent application Ser. No. 13/803,100 filed Mar. 14, 2013, which is now U.S. Pat. No. 9,379,443, issued on Jun. 28, 2016, which claims priority under 35 U.S.C. § 119(e) from U.S. Provisional Patent Application Ser. No. 61/671,906, filed Jul. 16, 2012, the entire contents of each of which are hereby incorporated by reference.

BACKGROUND

The vast majority of the portable and handheld wireless devices feature nowadays an internal antenna. Internal antennas, particularly those in charge or providing connectivity for cellular services (e.g. 2G, 3G and 4G services such as GSM, CDMA, WCDMA, UMTS, LTE operated within their corresponding frequency bands) require their customization for each model of wireless device as the shape of the device and its radioelectric specifications usually vary from model to model. On the other hand, it is a conventional wisdom that antennas need to keep a certain size with respect to the wavelength in order to radiate efficiently. Therefore, current internal antennas including patches (e.g. PIFAs), IFAs, monopoles and related antenna modules feature a size or length proportional to an operating wavelength of the device, quite typically on the order of a quarter of such operating wavelength. In practice this means that existing internal antennas, internal antenna modules and alike are about the size of the shortest edge of mobile phone (about 35-40 mm for a typical phone, between 40-55 mm in the case of a smartphone). Such a size is particularly inconvenient as the space inside a mobile device is severely limited. Particularly during the design process, the integration of the antennas inside the device becomes a cumbersome task due to the many handheld components such as displays, batteries, speakers, vibrators, shieldings, and the like that compete for real-state with the antenna. The electromagnetic fields radiated by an antenna are quite sensitive to such neighboring components, which makes the design process even more difficult and slow, as addressing all these issues usually involves multiple design iterations. Finally, the fact that the antenna is sizeable and not standard in shape makes its integration in an automatized manufacturing process particularly challenging, which means that most of the time the assembly of the antenna inside the device is done manually.

Developing a small, standard antenna that would fit inside every single handheld device would overcome many of the problems related to the handset design and manufacturing process. However, it is well known that reducing the antenna size to make it fit in every handheld severely limits its performance, namely bandwidth and efficiency. H. Wheeler and L. Chu, in the 1940's, first described the fundamental limits on small antennas. They defined a small antenna as an antenna fitting inside a radiansphere, that is, an imaginary sphere of a diameter equal to the longest operating wavelength of the antenna divided by pi (half an sphere in case of unbalanced antennas such as monopoles). They concluded that below such a limit, the maximum attainable bandwidth scales down with the volume of the antenna relative to the wavelength volume (being the wavelength volume a cube volume having an edge length equal to one operating wavelength). In the limit, when the antenna becomes much smaller than the wavelength, it radiates so inefficiently that it can hardly be considered an antenna anymore.

In order to develop a standard radiation system featuring an easy integration into wireless handheld devices, patent applications WO 2010/015365, WO 2010/015364, WO 2011/095330, WO 2012/017013, U.S. 61/661,885, U.S. 61/671,906, disclose for instance a new antenna related technology based on radiation boosters. Such radiation boosters are electrically very small elements (e.g. they feature small volumes fitting inside a cube with an edge about only 1⁄30 wavelengths and below, typically below 1⁄50 of the longest operating wavelength), which are in charge of properly exciting the electric currents of a ground plane mode for radiation. Said ground plane is a conductive surface built in the wireless handheld devices, typically including one conductive layer on a printed circuit board which hosts the RF circuitry of the wireless handheld device.

The radiating system in those patent applications further comprises a radiofrequency system (including inductors, capacitors, resistors, and transmission lines) in order to be operative in the desired frequency band or frequency bands such as for example and not limited to LTE700, GSM/CDMA850, GSM900, GSM1800, GSM/CDMA1900, UMTS, LTE2100, LTE2300, LTE2500.

A prior art solution for a radiation booster disclosed, for instance, a solid metal cube as the booster element. Such a cube was designed to feature a very small size compared to the wavelength while minimizing the ohmic resistance losses and reactance of the element. Owing to its small size, a radiation booster supports a significant current density, so a solid, homogeneous, conductive cube option was proposed to minimize the potential losses and reactance and therefore maximize the radiation efficiency of the whole set. Therefore, that embodiment provided a better performance than other boosters that concentrated all the electric current through a single narrow, wire like element. In another test, the miniature solid metal cube was also found to feature a better performance (e.g., bandwidth and efficiency) than a small, conductive thumbtack like booster placed over the ground plane of the wireless device. So in summary, the solid metal cube became over time a preferred solution for an efficient ground plane booster within a wireless device.

Despite said solid conductive cube provided a top performance compared to other booster elements, it still presented multiple problems for real use applications in mass-produced wireless devices, such as for instance: the element was quite heavy owing to the density of its homogeneous metal structure; both the conductive material and manufacturing procedure involving for instance steel mills were far from optimum for producing large quantities of boosters, and from the assembly and integration into the wireless device perspectives, the high thermal conductivity of the booster made it difficult to solder it onto the typical PCB of a wireless device. In addition, due to their physical characteristics, those cubes would not fit well within an automated pick-and-place or SMD processes which are quite typical for PCB electronics manufacturing.

SUMMARY

The present invention relates to the field of wireless handheld or portable devices, and generally to wireless portable devices which require both the transmission and reception of electromagnetic wave signals.

It is an object of the present invention to provide a new wireless handheld or portable device including a very compact, small size and light weight radiation booster operating in a single or in multiple frequency bands; that is, a radiation booster for a radiating system embedded into a wireless handheld device, wherein said radiating system including said booster is configured to both transmit and receive simultaneously in a single band or in multiple frequency bands. The present invention discloses radiation booster structures and their manufacturing methods that enable reducing the cost of both the booster and the entire wireless device embedding said booster inside the device. In the context of the present document the terms 'radiation booster' and 'booster' will be both used indistinctly to refer to a 'radiation booster' for a wireless handheld or portable device according to the present invention.

It is an object of the present invention to provide a wireless handheld or portable device (such as, for instance but not limited to, a mobile phone, a smartphone, a phablet, a tablet, a PDA, a digital music and/or video player (e.g. MP3, MP4), a headset, a USB dongle, a laptop computer, a gaming device, a remote control, a digital camera, a PCMCIA or Cardbus 32 card, a wireless or cellular point of sale or remote paying device, or generally a multifunction wireless device) comprising said radiation booster for the transmission and reception of electromagnetic wave signals.

A wireless handheld or portable device according to the present invention operates one, two, three, four or more cellular communication standards (such as for example GSM/CDMA 850, GSM 900, GSM 1800, GSM/CDMA 1900, UMTS, HSDPA, CDMA, W-CDMA, CDMA2000, TD-SCDMA, UMTS, LTE700, LTE2100, LTE2300, LTE2500, etc.), wireless connectivity standards (such as for instance WiFi, IEEE802.11 standards, Bluetooth, ZigBee, UWB, WiMAX, WiBro, or other high-speed standards), and/or broadcast standards (such as for instance FM, DAB, XDARS, SDARS, DVB-H, DMB, T-DMB, or other related digital or analog video and/or audio standards), each standard being allocated in one or more frequency bands, and said frequency bands being contained within one, two, three or more frequency regions of the electromagnetic spectrum.

In the context of this document, a frequency band preferably refers to a range of frequencies used by a particular cellular communication standard, a wireless connectivity standard or a broadcast standard; while a frequency region preferably refers to a continuum of frequencies of the electromagnetic spectrum. For example, the GSM 1800 standard is allocated in a frequency band from 1710 MHz to 1880 MHz while the GSM 1900 standard is allocated in a frequency band from 1850 MHz to 1990 MHz. A wireless device operating the GSM 1800 and the GSM 1900 standards must have a radiating system designed to operate in a frequency region from 1710 MHz to 1990 MHz. As another example, a wireless device operating the GSM 1800 standard and the UMTS standard (allocated in a frequency band from 1920 MHz to 2170 MHz), must have a radiating system designed to operate in two separate frequency regions. In some examples, a frequency region of operation (such as for example the first and/or the second frequency region) of a radiating system is preferably one of the following (or contained within one of the following): 824-960 MHz, 1710-2170 MHz, 2.4-2.5 GHz, 3.4-3.6 GHz, 4.9-5.875 GHz, or 3.1-10.6 GHz.

According to the present invention, a wireless handheld or portable device advantageously comprises at least five functional blocks: a user interface module, a processing module, a memory module, a communication module and a power management module. The user interface module comprises a display, such as a high resolution LCD, OLED or equivalent, and it is an energy consuming module, most of the energy drain coming typically from the backlight use. The user interface module may also comprise a keypad and/or a touchscreen, and/or an embedded stylus pen. The processing module, that is a microprocessor or a CPU, and the associated memory module are also major sources of power consumption. The fourth module responsible of energy consumption is the communication module, an essential part of which is the radiating system. The power management module of the wireless handheld or portable device includes a source of energy (such as for instance, but not limited to, a battery or a fuel cell) and a power management circuit that manages the energy of the device.

In accordance with the present invention, the communication module of a wireless handheld or portable device includes a radiating system configured to both transmit and receive electromagnetic wave signals in at least one frequency region of the electromagnetic spectrum. Said radiating system comprises a radiating structure comprising: at least one ground plane layer configured to support at least one radiation mode, the at least one ground plane layer including at least one connection point; at least one radiation booster to couple electromagnetic energy from/to the at least one ground plane layer, the/each radiation booster including a connection point; and at least one internal port. The/each internal port is defined between a connection point of the/each radiation booster and one of the at least one connection points of the at least one ground plane layer. The radiating system further comprises a radiofrequency system, and an external port.

In some embodiments according to the present invention, each of the boosters disclosed here are designed to be arranged in a clearance of the at least one ground plane. A clearance is for instance a region of the ground plane underneath the booster where a substantial portion of the metal is removed. According to the present invention a booster is mounted on a clearance when the projection or footprint of the booster on the plane comprising said at least one ground plane does not intersect substantially with a portion of the conductive surface of said ground plane. For instance, in some of such embodiments the booster is configured so that its footprint overlaps a ground plane conductive surface in 60% or less of the booster's footprint. Still, in many of said embodiments a smaller overlap between the booster footprint and the conductive ground plane is preferred, for instance a 50% or less, a 20% or less or even a 5% or a 0% overlap of the booster's footprint.

In some cases, the radiating system of a wireless handheld or portable device comprises a radiating structure consisting of: at least one ground plane layer including at least one connection point; at least one radiation booster, the/each radiation booster including a connection point; and at least one internal port. In some embodiments a radiation booster comprises two, three or more points that define, together with a corresponding point on a ground plane, two, three or more internal ports.

The radiofrequency system comprises a port connected to each of the at least one internal ports of the radiating structure (i.e., as many ports as there are internal ports in the radiating structure), and a port connected to the external port of the radiating system. Said radiofrequency system modifies the impedance of the radiating structure, providing impedance matching to the radiating system in the one or more frequency regions of operation of the radiating system.

In this text, a port of the radiating structure is referred to as an internal port; while a port of the radiating system is referred to as an external port. In this context, the terms "internal" and "external" when referring to a port are used simply to distinguish a port of the radiating structure from a port of the radiating system, and carry no implication as to whether a port is accessible from the outside or not.

In some embodiments, the radiating structure comprises two, three, four or more radiation boosters according to the present invention, each of said radiation boosters including a connection point, and each of said connection points defining, together with a connection point of the at least one ground plane layer, an internal port of the radiating structure. Therefore, in some embodiments the radiating structure comprises two, three, four or more radiation boosters, and correspondingly two, three, four or more internal ports.

It is an object of the present invention to provide a new very compact, small size and light weight radiation booster operating in a single or in multiple frequency bands; that is, a radiation booster for a radiating system embedded into a wireless handheld device, wherein said radiating system including said booster is configured to both transmit and receive simultaneously in a single band or in multiple frequency bands. In particular, the present invention discloses multiple structures for radiation boosters to enable its standard integration into wireless handheld devices. Some of the main benefits derived from the present invention are: a faster time to market for wireless handhelds; a lower manufacturing costs and scalability for large scale manufacturing, including simplification and automatization of the assembly and soldering process in large scale production; a low weight and small size solution, together with the benefits of enabling a standard radiation solution across multiple handheld wireless platforms.

In order to achieve the aforementioned features, the present invention provides a method for manufacturing radiation boosters. The invention also provides an integrated package solution for both the radiation boosters and the related radiofrequency system.

A radiation booster according to the present invention might comprise a concave conductive structure. In the context of the present invention, a geometry, whether 2D or 3D, is convex if for every pair of points within the geometry every point on the straight line segment that joins them belongs to the geometry. The opposite is called a concave or non-convex geometry. For instance, a solid homogeneous cube is convex, while the whole set of walls enclosing the cube is, by itself a concave geometry.

A radiation booster according to the present invention comprises a conductive concave structure entirely fitting inside a cube with an edge length smaller than the longest operating wavelength divided by 20. In some further examples, the radiation booster has a maximum size smaller than 1/30, 1/40, 1/50, 1/60, 1/80, 1/100, 1/140 or even 1/180 times the free-space wavelength corresponding to the lowest frequency of the lowest frequency region of operation of the device.

In some embodiments according to the present invention, a conductive concave structure will entirely fit inside a limiting volume equal or smaller than $L^3/8000$ and in some cases equal or smaller than $L^3/30000$, and in some cases equal or smaller than $L^3/100000$, and in some cases equal or smaller than $L^3/125000$, $L^3/200000$, $L^3/250000$ or even smaller than $L^3/500000$ being L the longest free-space operating wavelength of the booster.

In some embodiments, said limiting volume is a cube, while in others it might be a hexahedron such as, for instance, a cuboid or a prism such as for instance a rectangular prism. In some embodiments, the longest edge of said limiting volume will be equal or smaller than L/50, but preferably smaller than L/60 and L/70. In some very small boosters, the limiting volume will feature a longest edge equal or smaller than L/100, a volume equal or smaller than $L^3/1000000$ or a combination of both features. For the avoidance of doubt, a conductive concave structure according to the present invention should not be interpreted as a portion of a larger homogeneous conductive structure which would extend beyond said limiting volume. In addition, in some embodiments, the radiation booster is a miniature stand-alone electronic component or individual part or piece that fits inside any of the limiting volumes as described above. By a stand-alone component it is meant that the component is a separate part that can be for instance manufactured, distributed, sold and assembled into a wireless handheld device independently of other electronic components.

A radiation booster according to the present invention might comprise a surface conductive element. In the context of the present invention a surface conductive element will be understood as a surface-like conductive element featuring a substantially balanced geometrical aspect ratio, for instance a maximum width not narrower than 4 times a maximum length of the element. On the other hand, a linear conductive element is understood as a conductive element featuring a significantly unbalanced aspect ratio, for instance a maximum length to maximum width ratio larger than 3:1. According to the present invention, a surface conductive element and a linear conductive element can be placed conformal to a non-planar surface, for instance a dihedral surface, a curved surface, a polyhedral surface, a cylindrical, conical or spherical surface and alike. Also, it is understood that both surface and linear conductive elements will necessarily have some thickness as any real world conductive structure will have necessarily some thickness, even if such a thickness is so thin as a single layer of atoms, as for instance in the case of a graphene layer.

According to an embodiment of the present invention, a stand-alone component including a radiation booster entirely fitting inside a limiting volume as described above comprises a conductive concave structure. For instance, such conductive concave structure comprises a surface conductive element and one, two or more linear conductive elements and the corresponding booster and stand-alone component are configured to be arranged on a clearance of the at least one ground plane. Preferably, a radiation booster comprises two surface conductive elements and two linear elements, one, two or more of said linear elements interconnecting said two surface conductive elements. In some of such embodiments one or more of such two or more conductive surfaces feature a convex geometry, while in other embodiments it features a concave geometry. By using two or more linear elements and two surface conductive elements, the electric current related to an operating wavelength becomes distributed over said elements reducing the losses and therefore increasing the efficiency of the overall radiation system, and in turn, the radiation efficiency of the overall handheld wireless device. This way, despite of the concave arrangement of the conductors in the radiation booster, the overall efficiency of the radiation system is kept within an operable range. By improving the overall efficiency, the wireless device will feature an increased coverage range, an improved sensitivity, a better quality communication link and overall an enhanced user experience. In addition, the use of concave conductive structure has several advantages compared to a convex one; for instance, a concave conductive structure is combined in several embodiments with a dielectric element. Such a dielectric element might be a printed circuit board, a glass fiber composite, a ceramic material, a plastic material, a foam material or a combination of them. The concave metal structure is designed in some of those cases such that at least a portion of it is made conformal to said dielectric element. This way the dielectric element mostly provides mechanical stability and manufacturability features to the stand-alone component, while said metal structure supports the electric currents at the operating frequency bands of the radiating system.

In some embodiments, a radiation booster featuring a size smaller than one of the limiting volumes listed above comprises a concave structure consisting of two or more surface conductive elements interconnected side by side through at least one edge within said elements. In some embodiments, by excluding the use of linear elements the efficiency of the booster might be increased, to the expense of maybe some additional cost in the manufacturing of said booster.

In some embodiments, the radiation booster entirely fitting inside a limiting volume as described above according to the present invention comprises two linear elements. For instance, by wrapping two or more linear elements around a dielectric material, a radiation booster provides multiple connection points to a ground plane which can be used for multiple purposes. In some embodiments, said boosters are configured to split the current between elements therefore minimizing losses and inductance of the whole set. In other embodiments they are configured to provide more flexibility to the electric component in terms of impedance tuning and matching.

Owing to the very small size and construction of the conducting structure of the booster, a radiation booster according to multiple embodiments of the present invention in general but also in every of the particular cases described above, might be configured to feature a characteristic resonant frequency above any of the operating bands of the booster. A characteristic resonant frequency is understood as the resonant frequency of the booster tested when mounted in the wireless device excluding any matching network or loading reactive element between the booster input port and the port of the frequency testing device. In some embodiments, the ratio between said characteristic resonance frequency and the lowest operating frequency of the booster is a factor of 3 or more; in particular, sometimes said ratio is 4 or more or even 5, 6, 10 or more.

Commonly-owned patent applications WO2008/009391 and US2008/0018543 describe a multifunctional wireless device. The entire disclosure of said application numbers WO2008/009391 and US2008/0018543 are hereby incorporated by reference.

Commonly-owned patent applications WO2010/015365, WO2010/015364, WO2011/095330, WO2012/017013, U.S. Ser. No. 13/799,857, U.S. Ser. No. 13/803,100, U.S. 61/837,265, EP13003171.9, describe wireless devices comprising a radiation booster. The entire disclosure of said application numbers WO2010/015365, WO2010/015364, WO2011/095330, WO2012/017013, U.S. Ser. No. 13/799,857, U.S. Ser. No. 13/803,100, U.S. 61/837,265, EP13003171.9, are hereby incorporated by reference.

A stand-alone component fitting inside a limiting volume according to the present invention comprises a radiation booster. Said radiation booster comprises a conductive element and a dielectric element. In some embodiments the conductive element is attached to the dielectric element through a heat staking process. In some embodiments the conductive element is affixed on the dielectric element using printed circuit techniques. In other embodiments the conductive element and the dielectric element are combined using insertion molding (MID) techniques. Other radiation booster architectures and manufacturing procedures that combine conductive and dielectric elements according to the present invention include: metallizing foams; gluing a rigid or flexible conductive elements on a rigid or flexible dielectric, wrapping a conductive fabric or conductive flexible material around a dielectric element such as for instance a dielectric foam or foam that is coated with a conductive material; wrapping one or more graphene layers around a dielectric element; building a conductive 3D element on a 3D graphene structure such as for instance a graphene foam. Without any limiting purpose, some examples of conductive materials according to the present invention include: copper, gold, silver, aluminum, brass, steel, tin, nickel, lithium, lead, titanium, graphene.

A radiation booster entirely fitting inside a limiting volume as described above comprises a first conductive surface on a dielectric layer, said conductive surface connected to a conductive linear element, said linear element connected to a second conductive surface or linear element. For instance, said conductive surface might include a convex or a concave metal shape printed on a first metallic layer (for instance a copper layer) within a multiple layer printed circuit board (PCB), said linear element might be a via hole within said multiple layer PCB, and said second conductive surface might be a convex or a concave metal shape printed on a second metallic layer connected to said via hole. In some embodiments, said conductive concave structure will include 2, 3, 4, 5, 6, 7, 8 or more linear or via hole elements to interconnect said first and second conductive layers. In some embodiments, said metal shapes would be a concave or a convex substantially quadrilateral shape such as for instance a rectangle or a square (either solid or including some holes or gaps in the metal to make it concave), said one or more via holes interconnecting said two or more metal shapes through a region nearby the corners of said quadrilateral shapes. In some embodiments, the booster element comprises 3 or more metal shapes printed on 3 or more layers of said multiple layer PCB, together with one or more via holes interconnecting said 3 or more metal shapes, preferably nearby one or more corners within said metal shapes. A radiation booster comprising a single-layer or multilayer PCB, a plurality of metal shapes within one or more of said layers of said PCB, and one or more conductive linear elements such as via holes as described above is packaged as a surface mount device (SMD) stand-alone component according to the present invention. The SMD packaging of the booster benefits from a low cost manufacturing process and a standardized pick-and-place assembly process into a wireless device as discussed before.

In some embodiments, a radiation booster entirely fitting inside a limiting volume as described above is embedded into an integrated circuit (IC) package. In particular, the booster is embedded in some embodiments in a stand-alone component featuring for instance one of the following IC packaging architectures: single-in-line (SIL), dual-in-line (DIL), dual-in-line with surface mount technology DIL-SMT, quad-flat-package (QFP), pin grid array (PGA), ball grid array (BGA) and small outline packages. Other suitable packaging architectures according to the present invention are for instance: plastic ball grid array (PBGA), ceramic ball grid array (CBGA), tape ball grid array (TBGA), super ball grid array (SBGA), micro ball grid array μBGA® and leadframe packages and modules.

One of the benefits of integrating a radiation booster into an integrated circuit package is that in some embodiments such a package integrates additional electronic components. For instance, the radiation booster might be integrated together with one or more inductors, one or more capacitors, or a combination of both. Those might be for instance discrete lumped elements mounted on the package and/or they can be distributed elements printed or etched on the package or on a semiconductor die. In particular, in some embodiments the integrated circuit package embeds a radiation booster and one or more elements of the radiofrequency system comprised in the radiating system of the wireless handheld or portable device. For instance, the IC package integrates a matching network connected to a radiation booster. Said matching network includes in some cases a reactance cancellation circuit, a broadband matching circuit, a fine tuning circuit or every combination of them.

A radiation booster entirely fitting inside a limiting volume as described above comprises, according to the present invention, a metallized foam structure, said foam structure featuring preferably a polyhedral shape such as a prism or a cylindrical shape, and either a closed-cell or open-cell structure in a rigid or flexible form. In some embodiments, said rigid or flexible foam is partially or totally wrapped with a conductive fabric, while in others the conductive or metal material is deposited in a surface of said foam by using techniques such as for instance sputtering, printing, coating or chemical plating. While in some embodiments the foam is dielectric, in other embodiments the foam is made conductive as well to lower the ohmic resistance and losses of the whole booster. A radiation booster entirely fitting inside a limiting volume as described above comprises an element selected from the group consisting of: a conductive cushion, a conductive web, a conductive foam, a shield foam gasket, a conductive elastomer. By building a booster on a foam structure the resulting element combines the radioelectric performance of the booster with the mechanical properties of the foam: light weight, low cost, flexible geometry. This combination of electric and mechanical features makes the resulting booster particularly suitable for mobile wireless and cellular devices where such a device needs to combine an optimum radiofrequency response with light weight and low cost. Moreover, the flexible nature of a foam based booster makes it easy to embed it inside a small handheld or portable wireless device where other components and mechanical elements might leave limited room for the booster. A foam based booster is able to adapt to virtually any internal volume shape of a wireless device therefore maximizing its volume without any specific customization effort at the manufacturing stage.

A radiation booster entirely fitting inside a limiting volume as described above comprises a concave conductive element and a concave dielectric element. In some embodiments of such a radiation booster, the concave conductive element is a stamped piece of metal, wherein in some cases, said stamped metal includes one, two or more bends. A stamped metal piece is affixed onto a concave dielectric element for instance by means of heat-stacking process. In some embodiments said conductive element is built on the surface of the concave dielectric element by means of a double injection molding process, a laser direct structuring (LDS) process or generally a molded interconnect device (MID) technique.

A ultra small radiation booster according to the present invention (e.g. featuring limiting volumes smaller than $L^3/500000$, $L^3/1000000$, $L^3/2000000$) uses a highly conductive material to optimize the radioelectric performance of the wireless or cellular handheld or portable device, particularly of a device which transmits or both transmits and receives wireless and/or cellular waves. Said highly conductive material is made of one or more layers of silver or graphene which is associated to a convex or a concave dielectric element. In some embodiments such association is done by means of chemical vapor deposition, spraying, sputtering or a coating technique. In some embodiment said one or more layers is mechanically associated with a dielectric element by means of adhesion. One, two or multiple graphene layers according to the present invention can be affixed onto a dielectric element by depositing the graphene on an adhesive film wrapping said dielectric element.

In some embodiments, a wireless device according to the present invention comprises a radiation booster, said radiation booster featuring one or more functions in addition to contributing to the transmission and reception of electromagnetic waves within the radiating system. Said additional function or functions might include one or more of the following: mechanical affixing two or more parts of the wireless device; providing EM shielding capabilities to the wireless device; providing grounding contact between conductive elements of the wireless device; reducing mechanical vibrations on the overall wireless device and/or protecting it from mechanical crash; modifying the acoustic properties of the wireless device or providing electric contact to other circuit elements within said device.

DETAILED DESCRIPTION

Further characteristics and advantages of the invention will become apparent in view of the detailed description of some preferred embodiments which follows. Said detailed description of some preferred embodiments of the invention is given for purposes of illustration only and in no way is meant as a definition of the limits of the invention, made with reference to the accompanying figures.

Figure 1:
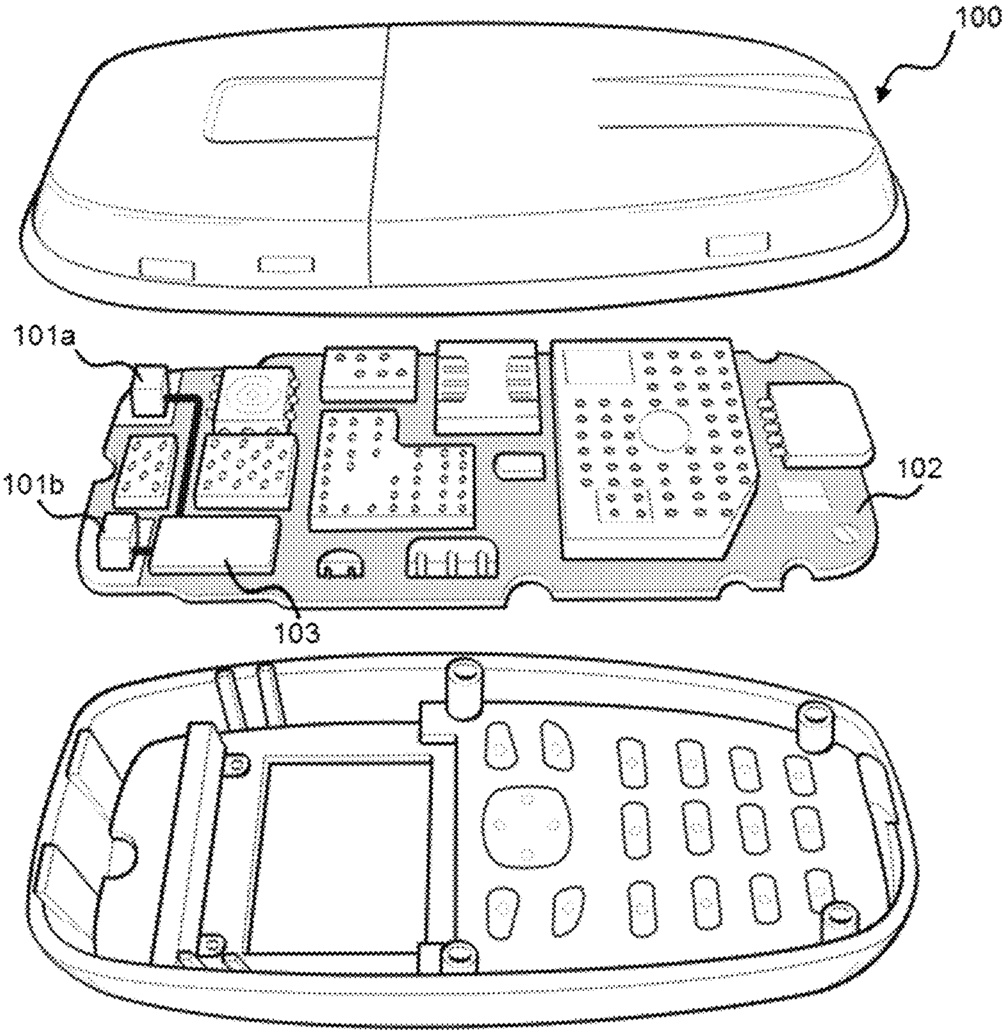
FIG. 1 illustrates an example of a wireless handheld or portable device including a radiating system according to the present invention in an exploded view.

FIG. 1 shows an illustrative example of a wireless handheld or portable device 100 according to the present invention. In FIG. 1*a*, there is shown an exploded perspective view of the wireless handheld or portable device 100 comprising a radiating structure that includes a first radiation booster 101*a*, a second radiation booster 101*b* and a ground plane layer 102 (which might be included in a layer of a multilayer Printed Circuit Board—PCB). Both boosters 101*a* and 101*b* are stand-alone components fitting inside a limiting volume selected among any of the limiting volumes described in the present document. The wireless handheld or portable device 100 also comprises a radiofrequency system 103, which is interconnected with said radiating structure. Although in this example the radiation boosters 101*a* and 101*b* are arranged on a clearance area of the ground plane layer 102, in other words, there is no overlapping between the footprints of the radiation boosters and the conductive surface of the ground plane layer, in other examples there is a partial overlapping between the footprints of the radiation boosters and the conductive surface of the ground plane layer.

Figure 2A:
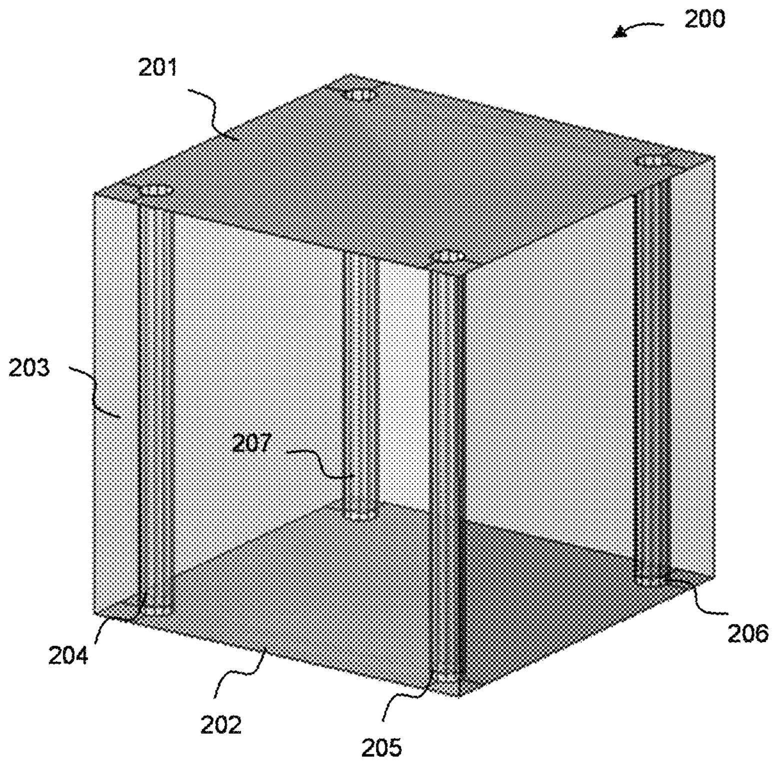
FIG. 2*a* shows a radiation booster comprising a cubic shape comprising a top and bottom conductive parts connected with vias and spaced by a dielectric support (for clarity purposes the dielectric is drawn transparent).

FIG. 2*a* shows a preferred structure for a fabrication of a stand-alone radiation booster 200. The said radiation booster 200 comprises a top 201 conductive part and a bottom 202 conductive part, spaced by a dielectric support 203 having a parallelepiped shape. For the present example, the parallelepiped is a cube, but other prisms might be used as well. Both parts 201 and 202 are connected by connecting means 204, 205, 206, and 207. The whole set of conductive elements 201, 202, 204, 205, 206, 207 form a concave conductive structure according to the present invention. Connecting means 204, 205, 206 and 207 might be implemented for instance by means of electroplated via holes. Other linear conductive elements might be used to provide said connecting means.

In one embodiment, the dielectric support 203 is FR4 which is a low cost material suitable for mass production. The connecting means 204, 205, 206, and 207 are via holes which comprise a hole through the dielectric support 203. Said via holes are metallized so as to electrically connect the top conductive part 201 with the bottom conductive part 202. This particular example comprises 4 via holes 204, 205, 206, and 207 located substantially close to the corners of the top 201 and bottom 202 parts.

For explanation purposes, the dielectric support 203 has been drawn transparent. In reality, most of the dielectric supports are opaque. Furthermore, the resulting structure is compatible with SMD (Surface Mount Device) technology.

Figure 2B:
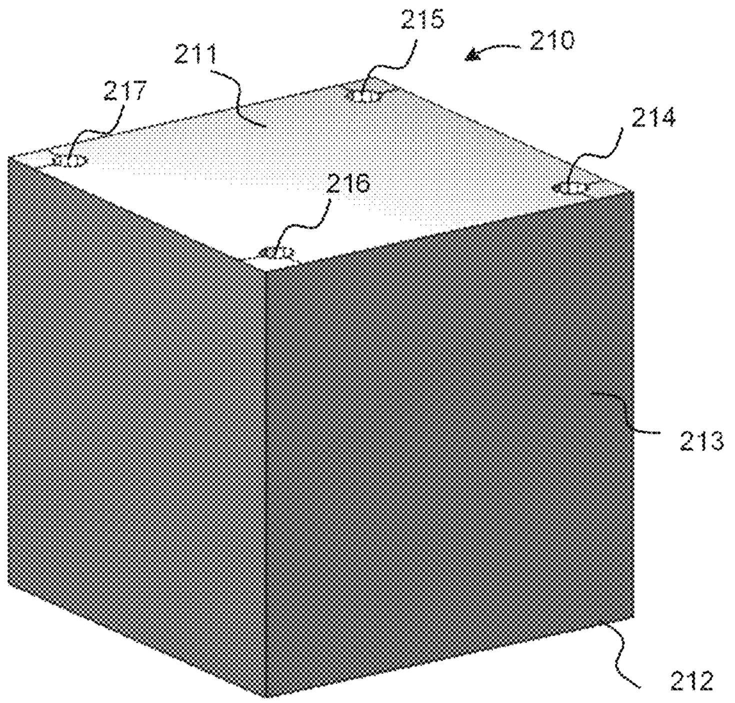
FIG. 2*b* shows the radiation booster where the dielectric support is opaque.

FIG. 2*b* shows the radiation booster 200 of FIG. 2*a* for an opaque dielectric support 213. For a preferred example, the dielectric support 213 is FR4/fiber glass. The radiation booster 210 comprises a top conductive part 211 and a bottom conductive part 212 electrically connected by connecting means 214, 215, 216, and 217.

The present novel structure for fabrication of a radiation booster is suitable for mass production using standard PCB manufacturing techniques.

Figure 2C:
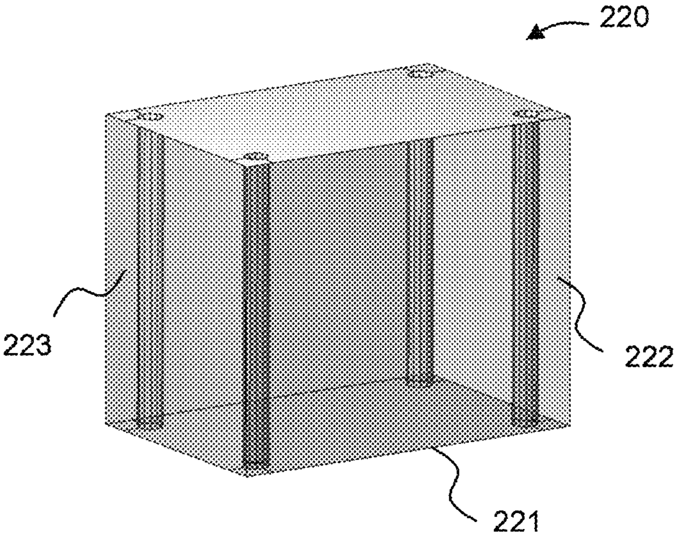
FIG. 2*c* shows a radiation booster comprising different dimensions in X, Y, and Z axis.

FIG. 2*c* shows a stand-alone component including a radiation booster 220 fitting inside a limiting volume as described above. Booster 220 comprises a concave conductive structure and a dielectric element. The geometry of booster 220 substantially matches a parallelepiped volume, said parallelepiped defined by three parallelograms 221, 222, 223 with a different area. In some embodiments, said parallelepiped fits inside one or more of any of the limiting volumes described in the present invention. Booster 220 comprises four linear elements such as for instance via holes to electrically connect conductive surface elements placed on a bottom surface 221 and on a top surface substantially parallel to surface 221.

Component 220 is an example of a radiation booster featuring a substantially cuboid geometry. This configuration may be advantageously used to introduce a degree of freedom on the design of the radiation booster and its integration in the wireless device hosting it. An additional advantage of a cuboid shape as opposed to a cube shape is that the manufacturing complexity and cost can be reduced; this is achieved for instance by using a single standard layer of dielectric material as opposed to stacking multiple layers. This can be achieved by adjusting a thickness of the component to match the standard thickness of a standard dielectric layer (e.g. adjusting width height of 222 and 223), while maintaining the overall volume of the component within a limiting volume, by adjusting the remaining surfaces (e.g. 221).

Figure 2D:
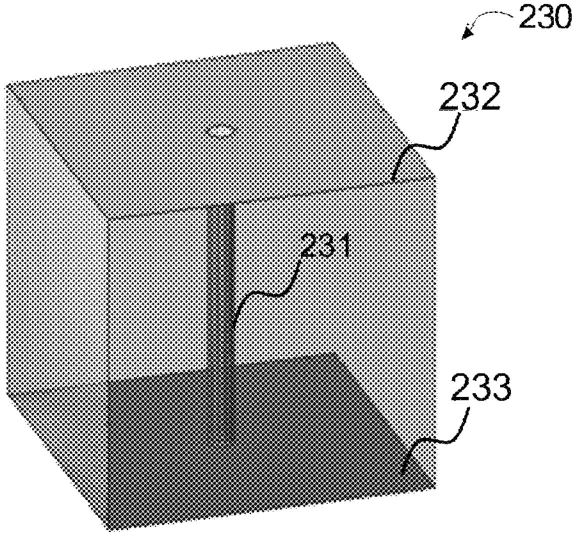
FIG. 2*d* shows a radiation booster comprising one via.

FIG. 2*d* depicts a radiation booster including a concave conductive structure, said concave structure comprising elements conductive surface elements 232, 233 and linear element 231. Booster 230 comprises one connecting means 231 connecting a top 232 and bottom 233 conductive parts. For this particular example, the location of said connecting means 231 is preferably located substantially at the center of both conductive top 232 and bottom 233 parts. In another example the location of said conductive means 231 is located close to a corner. A stand-alone component comprising booster 233 fits in one or more of any of the limiting volumes described in the present invention.

Figure 2E:
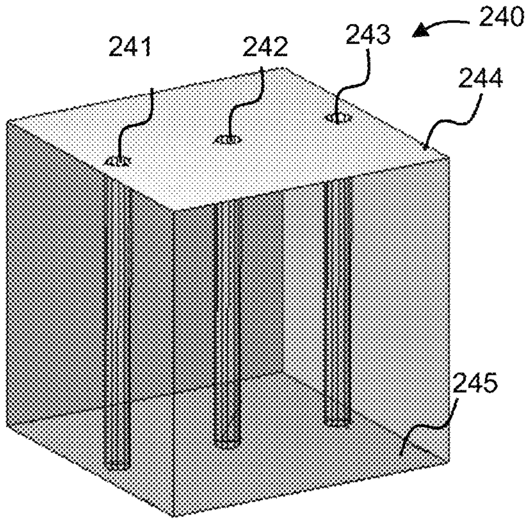
FIG. 2*e* shows a radiation booster comprising three vias.

FIG. 2*e* depicts a radiation booster 240 according to the present invention comprising three connecting means 241, 242, and 243 connecting a top 244 and bottom 245 conductive parts. A stand-alone component comprising booster 240 fits in one or more of any of the limiting volumes described in the present invention.

Figure 2F:
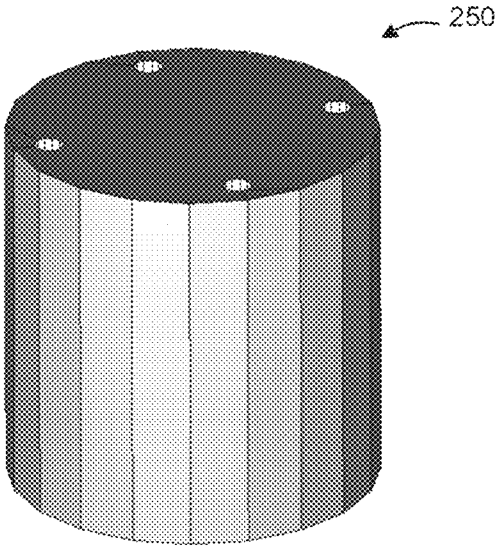
FIG. 2*f* shows a radiation booster comprising a cylindrical shape.

FIG. 2*f* shows a radiation booster 250 comprising a cylindroid. For this particular example, the cross section of the cylindroid is circular resulting in a cylinder shaped radiation booster. In some embodiments the cross section of such a cylindroid approaches a circular or elliptical sector as opposed to a full circle or ellipse. This can be advantageously used to integrate a radiation booster in a rounded cavity of a wireless handheld or portable device. A stand-alone component comprising booster 250 fits in one or more of any of the limiting volumes described in the present invention. In this particular embodiment four linear elements such as for instance via holes connect conductive surfaces placed on flat top and bottom surfaces of the cylindroid.

Figure 2G:
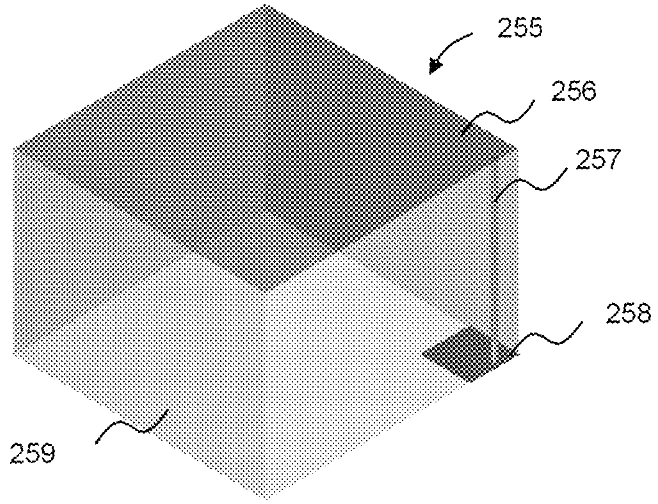
FIG. 2*g* shows a radiation booster comprising a parallelepiped comprising a top conductive part, a via, and a pad.

FIG. 2*g* shows a radiation booster 255 comprising concave conductive structure and featuring substantially polyhedral form factor approaching a parallelepiped. Said parallelepiped comprises a top conductive surface element 256 connected to a small conductive area (pad) 258 by means of a linear conductive element such as for instance a via 257. Said conductive part 256 and pad 258 are printed on a dielectric element 259. In some examples said dielectric support is FR4. This architecture of radiation booster is advantageously used in PCB having ground plane underneath. Since the radiation booster 255 has no bottom conductive part except for a small portion defined by the pad 258, a ground plane can overlap almost the overall footprint of the radiation booster. Therefore, this radiation booster can overlap a ground plane of a wireless handheld or portable device. The pad 258 is useful for connecting the radiation booster to a radiofrequency system. A stand-alone component comprising booster 255 fits in one or more of any of the limiting volumes described in the present invention.

Figure 2H:
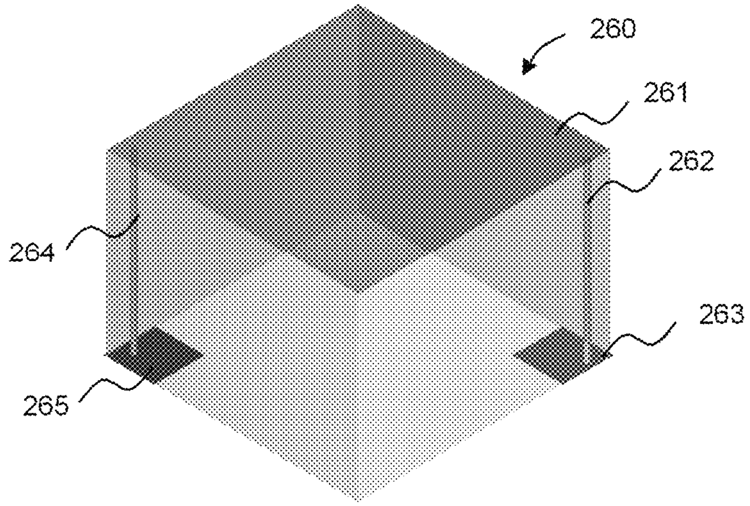
FIG. 2*h* shows a radiation booster comprising a top conductive part and two vias connected each one to a pad.

FIG. 2*h* shows a radiation booster 260 including a dielectric element and a concave conductive structure comprising a top surface conductive element 261 connected to pads 263 and 265 through linear conductive elements (vias) 262 and 264, respectively. This example is advantageously used to connect pad 263 to a radiofrequency system, and pad 265 to a connection point of a ground plane. In some other examples, the connection of pad 265 to a point of the ground plane is done using a lumped circuital electric component. This is useful for impedance matching purposes. Other linear conductive elements such as for instance strips printed or etched at the edges of the dielectric element might be used instead of the via holes. A stand-alone component comprising booster 260 fits in one or more of any of the limiting volumes described in the present invention.

Figure 2I:
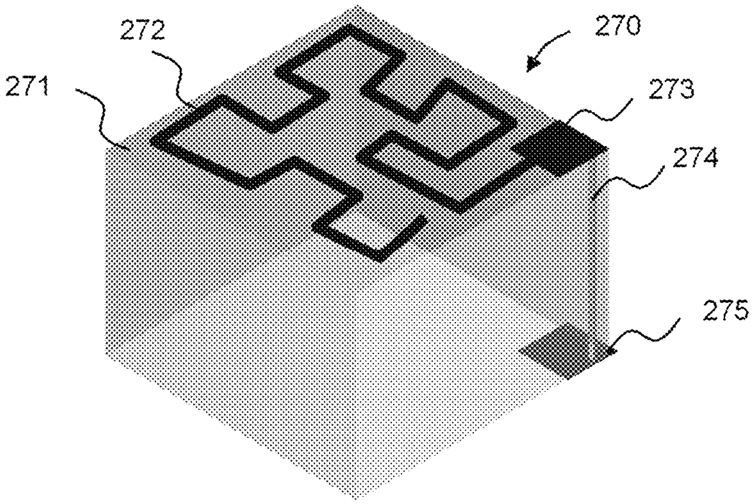
FIG. 2*i* shows a radiation booster comprising an SFC (Space Filling Curve).

FIG. 2*i* shows a radiation booster 270, said booster comprising a dielectric element 271 and a concave conductive structure. Said concave conductive structure might include a conductive space-filling structure (272) featuring 10 or more linear conductive segments connected and forming an angle between elements. Said space-filling structure might approach in some embodiments the shape of a fractal geometry such as for instance a Hilbert curve (272). In some embodiments said conductive space-filling structure 272 is connected to pad 275 by means of the via 274 and pad 273. In some embodiments said structure 272 is connected to a surface conductive element, such as for instance a surface printed in a layer of a multilayer dielectric element. A stand-alone component comprising booster 270 fits in one or more of any of the limiting volumes described in the present invention.

This architecture of the radiation booster 270 is advantageously used for impedance matching purposes. In some examples, the space-filling curve decreases the reactance behavior of a radiation booster. This configuration allows simplifying the reactance cancellation circuit of a radiofrequency system associated to said radiation booster. The pad 275 is useful for connecting the radiation booster to a radiofrequency system.

Figure 2J:
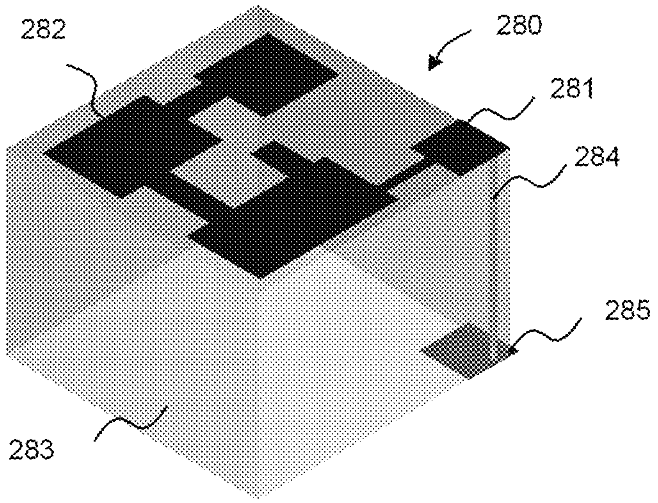
FIGS. 2*j* and 2*k* show radiation boosters comprising a concave 2D structure.

FIG. 2*j* shows a radiation booster 280 comprising a conductive surface element 282 featuring a concave 2D shape and a dielectric element 283. Said conductive surface element together with linear conductive element 284 and pads 281 and 285 forms a concave conductive 3D structure according to the present invention. The pad 285 is useful for connecting the radiation booster to a radiofrequency system.

Figure 2K:
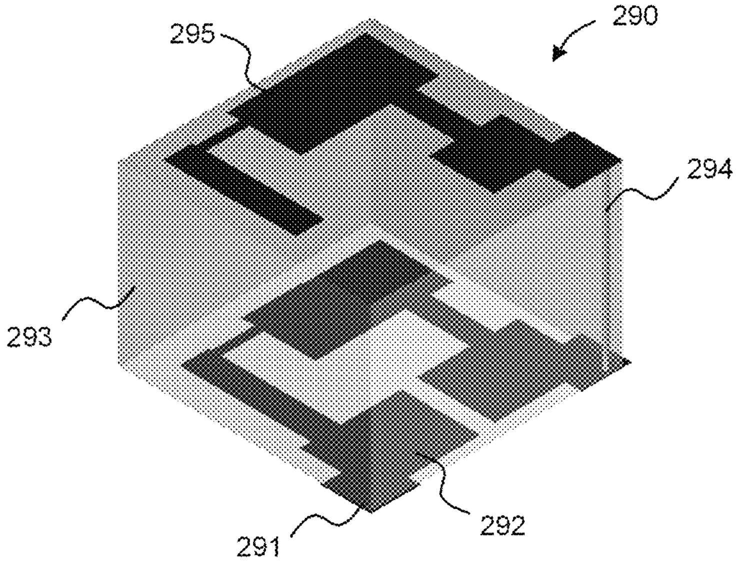

FIG. 2*k* shows a similar example of a radiation booster 290 comprising a dielectric support 293, a top conductive part comprising a concave 2D structure 295, a bottom conductive part comprising a concave 2D structure 292 and a linear conductive element 294. Both top and bottom conductive parts are connected using the via 294. The bottom conductive part comprises a pad 291 useful for connecting the radiation booster to a radiofrequency system. A stand-alone component comprising booster 280 or 290 fits in one or more of any of the limiting volumes described in the present invention.

Figure 3:
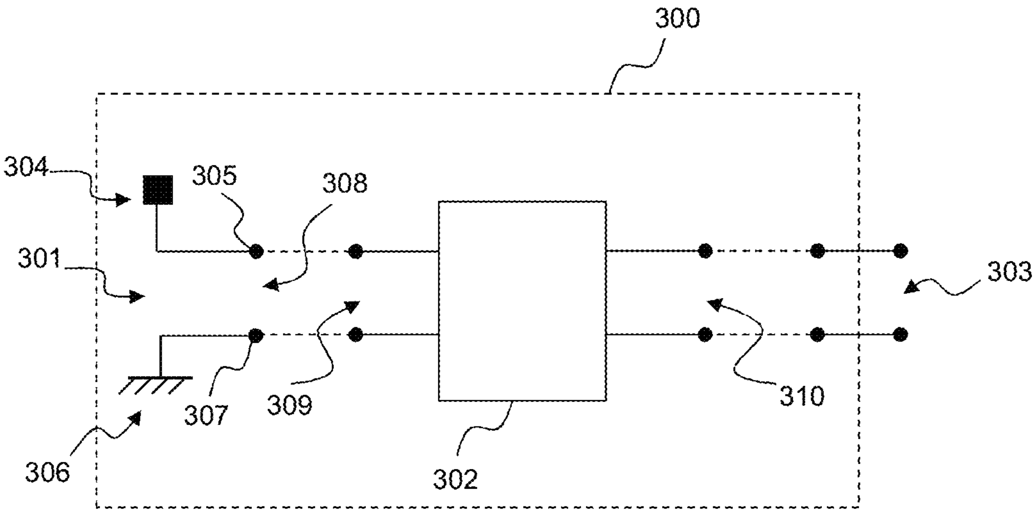
FIG. 3 is a schematic representation of an example of a radiating system according to the present invention.

In FIG. 3 it is depicted a radiating system 300 for a wireless handheld or portable device according to the present invention. The radiating system 300 comprises a radiating structure 301, a radiofrequency system 302, and an external port 303. The radiating structure 301 comprises a radiation booster 304, which includes a connection point 305, and a ground plane layer 306, said ground plane layer also including a connection point 307. The radiating structure 301 further comprises an internal port 308 defined between the connection point of the radiation booster 305 and the connection point of the ground plane layer 307. Furthermore, the radiofrequency system 302 comprises two ports: a first port 309 is connected to the internal port of the radiating structure 308, and a second port 310 is connected to the external port of the radiating system 303.

Figure 4A:
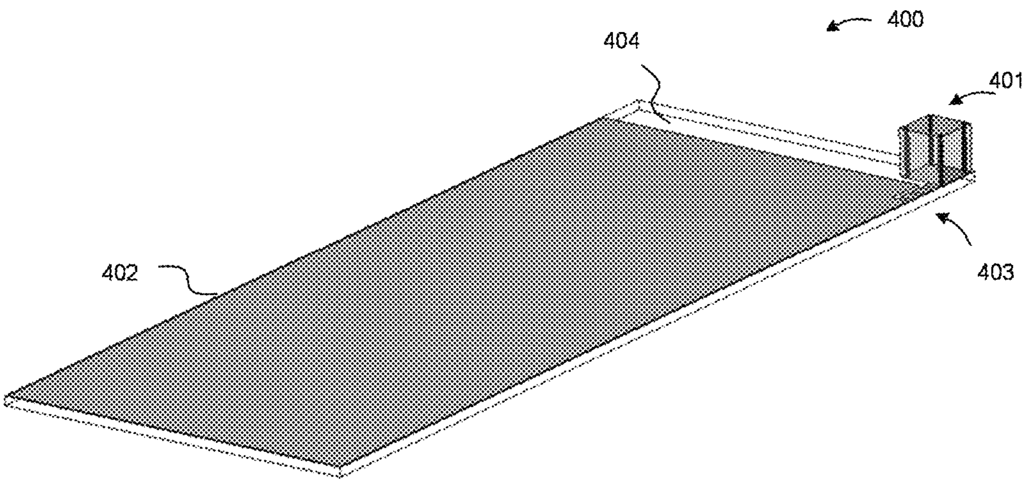
FIG. 4*a* is a general view of a radiating structure for a radiating system, the radiating structure comprising a radiation booster.

FIG. 4*a* depicts an example of a radiating structure 400 suitable for a radiating system 300. The radiating structure comprises a stand-alone component comprising a radiation booster 401 according to the present invention and a ground plane layer 402. In this example, a ground plane layer 402 is printed on a layer of dielectric substrate 404 which can be for instance a rigid substrate (e.g. FR4) or a flexible film. The ground plane layer comprises connecting means 403 for a radiofrequency system.

Figure 4B:
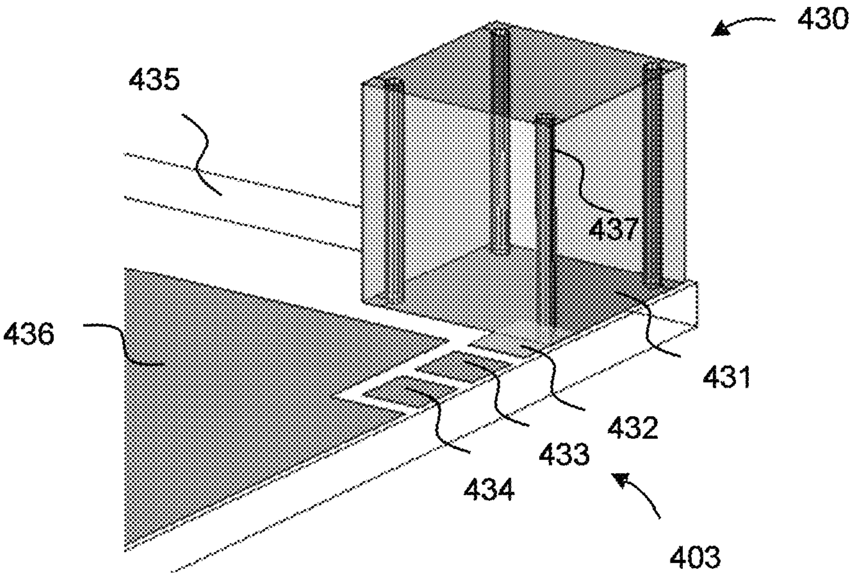
FIG. 4*b* is a detailed view of the radiation booster and the connecting means.

FIG. 4*b* shows a detailed view of a radiating system comprising a radiating structure including a radiation booster 430 and a ground plane layer 436 printed on a layer of dielectric substrate 435. The radiating system further comprises conductive means 403 for a radiofrequency system. For this particular example, the ground plane layer 436 comprises conductive areas or pads 432, 433, and 434 to allocate components for a radiofrequency system. In some embodiments one or more of said pads are directly connected to a ground plane layer 436, in other embodiments none of the pads are directly connected to a ground plane. The radiation booster 430 comprises a bottom conductive layer 431 directly connected to a conductive means 432. For illustrative purposes, the bottom conductive part 431 is shown transparent in order to show the pad 432 which overlaps the said bottom conductive part 431. Said overlap is useful to solder the radiation booster 430 to said pad 432 by applying heat through the via 437.

Figure 4C:
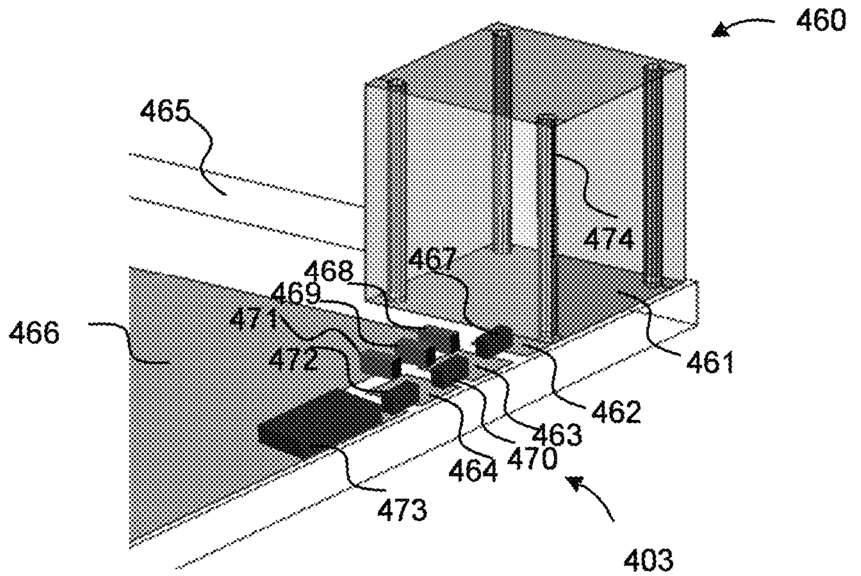
FIG. 4*c* is a detailed view of the radiation booster, components of a radiofrequency system and an integrated circuit chip.

FIG. 4*c* shows a detailed view of the components 467, 468, 469, 470, and 471 of the radiofrequency system 403. For this particular example, the radiation booster 460 comprises a bottom conductive layer 461 which is directly connected to a first port of the radiofrequency system 403. For a preferred example, the radiofrequency system comprises a reactance cancellation element 467 and a broadband matching network comprising two shunt reactive elements 468 and 469 connected to conductive area 463. A final stage comprising components 470 and 471 adds flexibility for impedance fine tuning purposes. In some examples, there is no need to add a fine tuning stage and therefore, components 470 and 471 are not included or can be for instance jumper elements (0 ohm resistance components). The external port of the radiofrequency system 403 is connected to a port of an integrated circuit chip 473 performing radiofrequency functionality by means of a jumper 472. For this particular example, said jumper 472 is a 0 ohms resistance using a SMD component. In the same manner as described in FIG. 4*b*, the radiation booster 460 is soldered to pad 462 by injecting heat through the via 474. The ground plane layer 466 is printed on a layer of dielectric substrate 465.

According to the present invention, each of the radiation boosters shown in embodiments 400, 430 and 460 might be replaced in other embodiments by each of the radiation boosters described in the present document.

In relation with FIG. 3, the internal port 308 is defined between a connection point 462 of the radiation booster 460 and a connection point of the ground plane 466. The first port of the radiofrequency system 403 (equivalent to 302 of FIG. 3) is defined between a connection point of the conductive means 462 and a connection point of the ground plane layer 466. The second port of the radiofrequency system 403 (equivalent to 302 of FIG. 3) is defined between a connection point of the conductive means 464 and a connection point of the ground plane layer 466.

Figure 5:
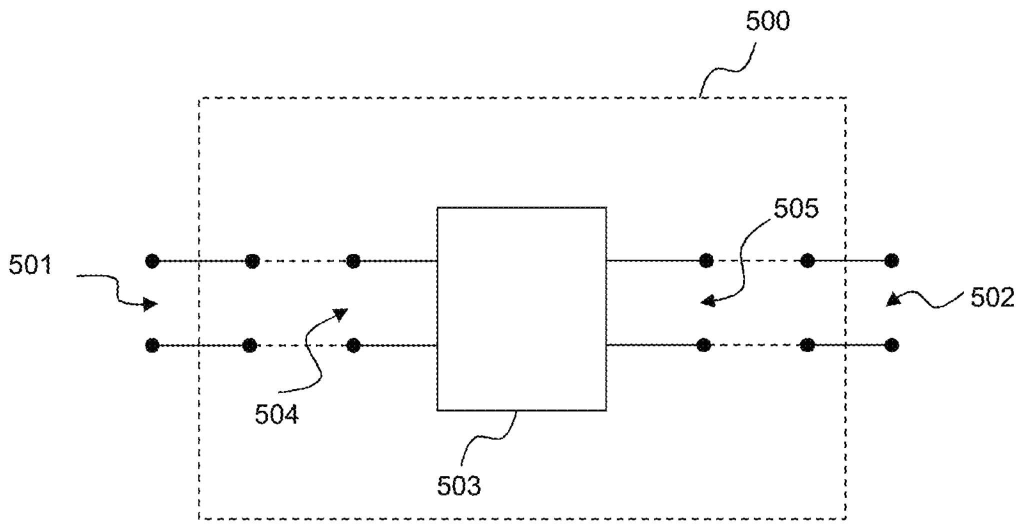
FIG. 5 is a block diagram of an example of a matching network for a radiofrequency system used in a radiating system of FIG. 3.

In FIG. 5 a matching network 500 comprises a reactance cancellation circuit 503. In this example, a first port of the reactance cancellation circuit 504 may be operationally connected to the first port of the matching network 501 and another port of the reactance cancellation circuit 505 may be operationally connected to a second port of the matching network 502.

Figure 6A:
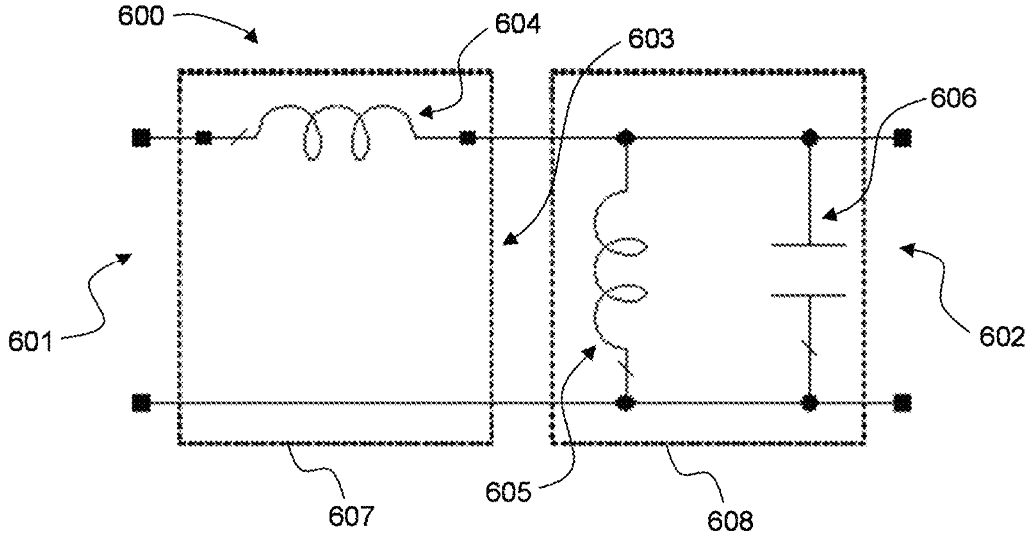
FIG. 6*a* is a schematic representation of a matching network used in the radiofrequency system of FIG. 5.

FIG. 6*a* is a schematic representation of the matching network 600, which comprises a first port 601 to be connected to the internal port of the radiating structure 400, and a second port 602 to be connected to the external port of a radiating system. In this example, the matching network 600 further comprises a reactance cancellation circuit 607 and a broadband matching circuit 608.

The reactance cancellation circuit 607 includes one stage comprising one single circuit component 604 arranged in series and featuring a substantially inductive behavior in the first and second frequency regions. In this particular example, the circuit component 604 is a lumped inductor. The inductive behavior of the reactance cancellation circuit 607 advantageously compensates the capacitive component of the input impedance of the first internal port of the radiating structure 400.

With the small dimensions of a radiation booster according to the present invention, the input impedance of the radiating structure 400 measured at the internal port, features an important reactive component (non-resonant element) within the frequencies of operation when disconnected from the radiofrequency system. Said reactive component is inductive when its value is greater than zero and it is capacitive when its value is smaller than zero.

Figure 6B:
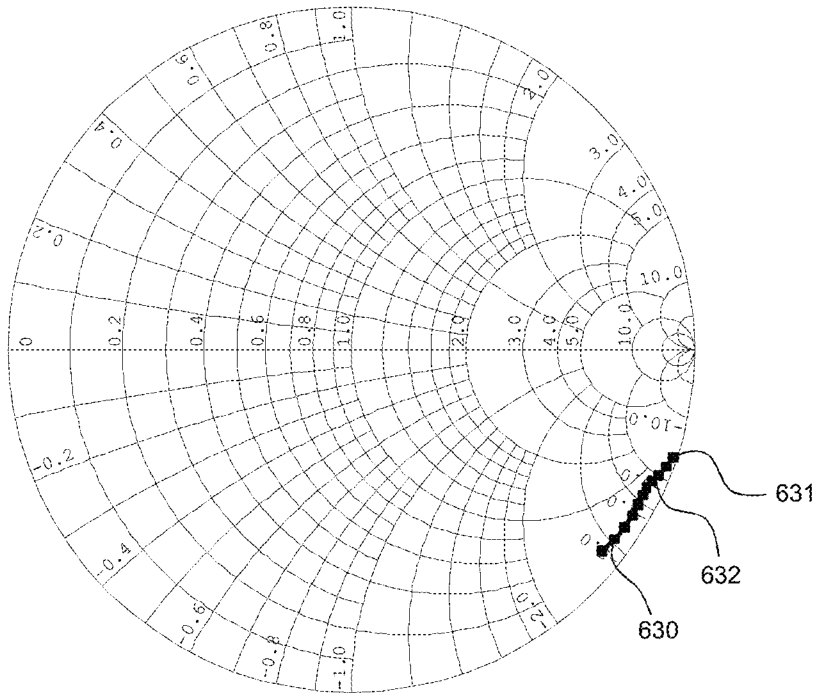
FIG. 6*b* shows input impedance at an internal port when disconnected from the matching network of the radiofrequency system.

In FIG. 6*b*, curve 630 represents on a Smith chart a typical complex impedance at the internal port of the radiating structure 400 as a function of the frequency when no radiofrequency system is connected to said first internal port. In particular, point 631 corresponds to the input impedance at the lowest frequency of a frequency region, and point 632 corresponds to the input impedance at the highest frequency of the said frequency region.

Curve 630 is located on the lower half of the Smith chart, which indeed indicates that the input impedance at the first internal port has a capacitive component (i.e., the imaginary part of the input impedance has a negative value) for at least all frequencies of a first frequency range (i.e., between point 631 and point 632).

Figure 6C:
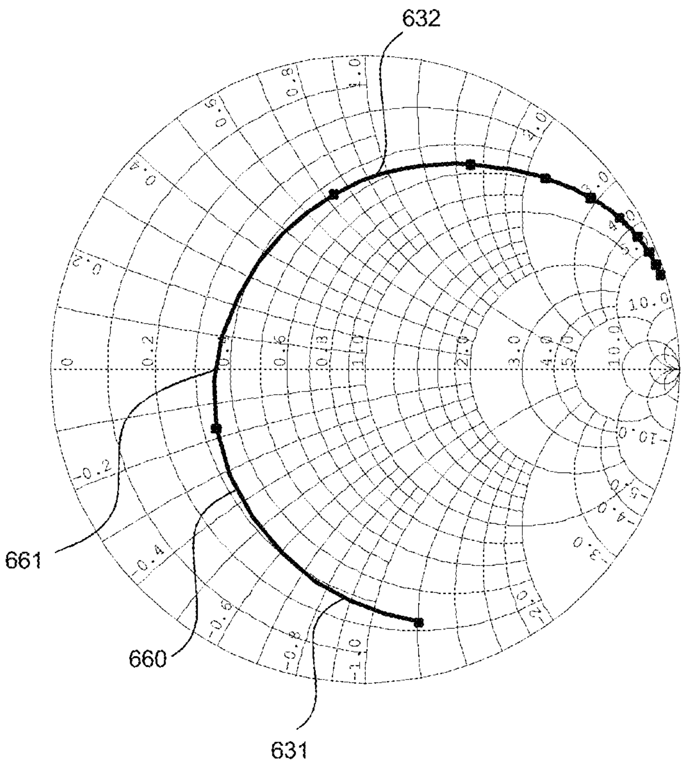
FIG. 6*c* shows input impedance after connection of a reactance cancellation circuit to the internal port.

The reactance cancellation effect can be observed in FIG. 6*c*, in which the input impedance at the first internal port of the radiating structure 400 (curve 630 in FIG. 6*b*) is transformed by the reactance cancellation circuit 607 into an impedance having an imaginary part substantially close to zero in a frequency region (see FIG. 6*c*). Curve 660 in FIG. 6*c* corresponds to the input impedance that would be observed at the second port 602 of the first matching network 504 if the broadband matching circuit 608 were removed and said second port 602 were directly connected to a port 603. Said curve 660 crosses the horizontal axis of the Smith Chart at a point 661 located between point 631 and point 632, which means that the input impedance at the internal port of the radiating structure 400 has an imaginary part equal to zero for a frequency advantageously between the lowest and highest frequencies of a first frequency region.

The broadband matching circuit 608 includes also one stage and is connected in cascade with the reactance cancellation circuit 607. Said stage of the broadband matching circuit 608 comprises two circuit components: a first circuit component 605 is a lumped inductor and a second circuit component 606 is a lumped capacitor. Together, the circuit components 605 and 606 form a parallel LC resonant circuit (i.e., said stage of the broadband matching circuit 608 behaves substantially as a resonant circuit in the frequency region of operation).

Figure 6D:
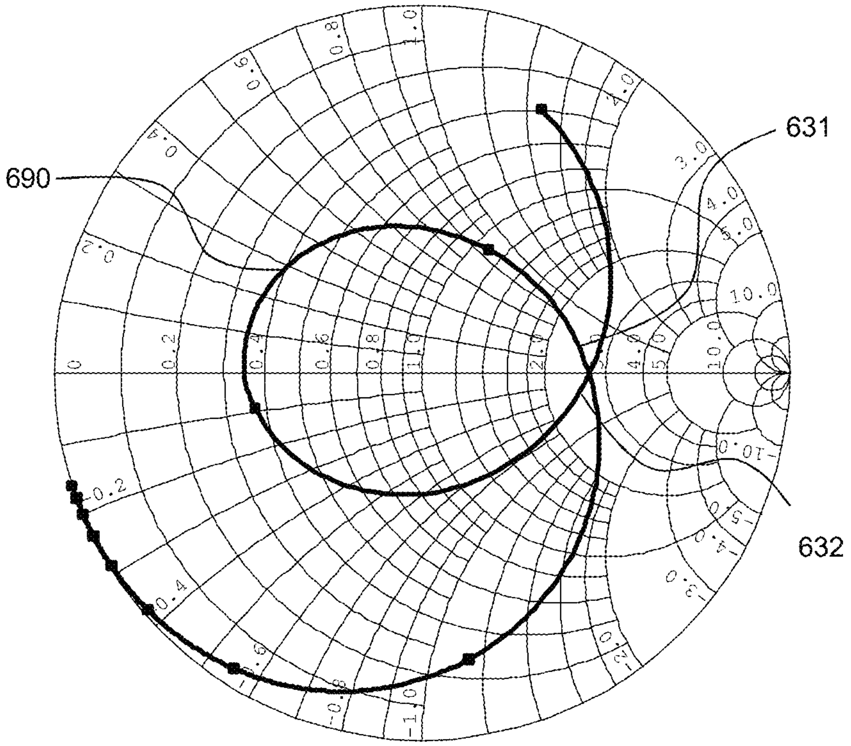
FIG. 6*d* shows impedance after the connection of a broadband matching circuit in cascade with the reactance cancellation circuit.

Comparing FIGS. 6*c* and 6*d*, it is noticed that the broadband matching circuit 608 has the beneficial effect of "closing in" the ends of curve 660 (i.e., transforming the curve 660 into another curve 690 featuring a compact loop around the center of the Smith chart). Thus, the resulting curve 690 exhibits an input impedance (now, measured at the second port 602 when no other circuitry is connected at port 602) within a voltage standing wave ratio (VSWR) 3:1 referred to a reference impedance of 50 Ohms over a broader range of frequencies.

Figure 7A:
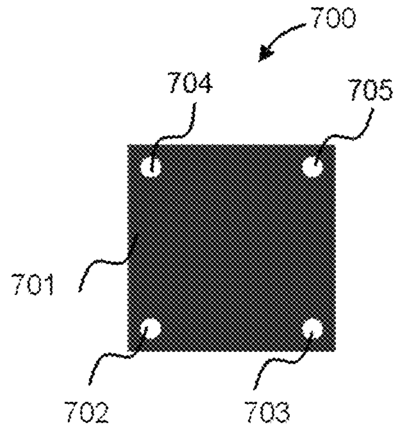
FIG. 7*a* is a top view of a schematic of a radiation booster. b) bottom view; c) lateral view.
Figure 7B:
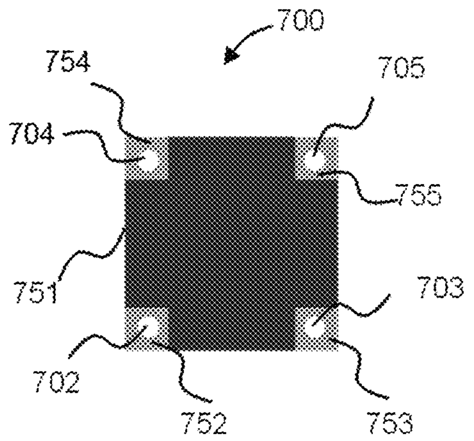
FIG. 7*b* is a bottom view of a schematic of a radiation booster.
Figure 7C:
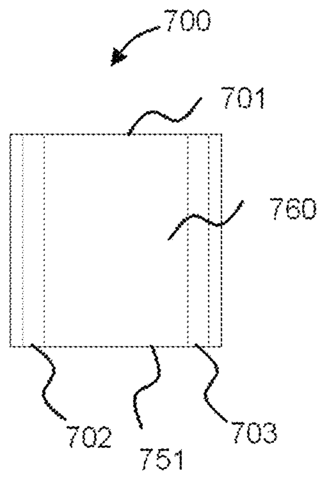
FIG. 7*c* is a lateral view of a schematic of a radiation booster.

FIGS. 7*a*, 7*b* and 7*c* show another preferred scheme for a fabrication of a radiation booster 700 seen from the top, the bottom, and a side, respectively. Said radiation booster comprises a first conductive part 701 and a second conductive part 751 spaced by a dielectric element 760 such as for instance single layer dielectric substrate or a multiple layer dielectric substrate. In this particular example, 4 connection means 702, 703, 704, and 705 connect the first conductive part 701 with the second conductive part 751. In some examples, the connecting means are via holes. Said via holes comprise a hole from the first conductive part 701 to the second conductive part 751. Said hole is conductive so as to electrically connect both parts 701 and 751. Conductive parts 701 and/or 751 might be a convex or a concave conductive structure according to the present invention. A stand-alone component comprising booster 700 fits in one or more of any of the limiting volumes described in the present invention.

In yet another example, the top conductive part is covered by a thin layer of ink (for example, a silk screen ink) which does not affect the electromagnetic performance of the radiation booster when it is integrated in a radiating system. Said ink layer is useful for marking and/or marketing purposes. In some example, the ink layer is used to mark a patent number. In some other examples, a part number is printed in the ink layer. In some other examples, the logo of the company is printed in said ink layer. Another ink layer covers the bottom conductive part 751 except at small areas 752, 753, 754, and 755. Said small areas are conductive areas since they are portions of the conductive part 751 not covered by the ink layer. Said small conductive areas 752, 753, 754, and 755 are called pads herein. The via holes 702, 703, 704, and 705 electrically connect the conductive second part 751 with the top conductive part 701. With this configuration, the radiation booster is a Surface Mount Device (SMD). This preferred radiation booster product is compatible with industry standard soldering processes.

At least one pad 752, 753, 754 and 755 is a connection point 305 of the radiation booster as shown in FIG. 3. Said connection point with a connection point in the ground plane layer defines an internal port of the radiating structure.

Figure 8A:
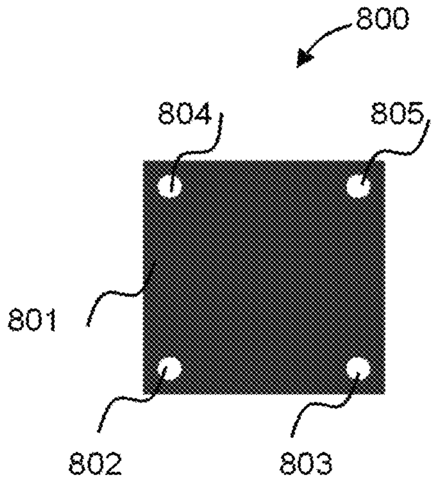
FIG. 8*a* is a top view schematic of a radiation booster having a thin profile.
Figure 8B:
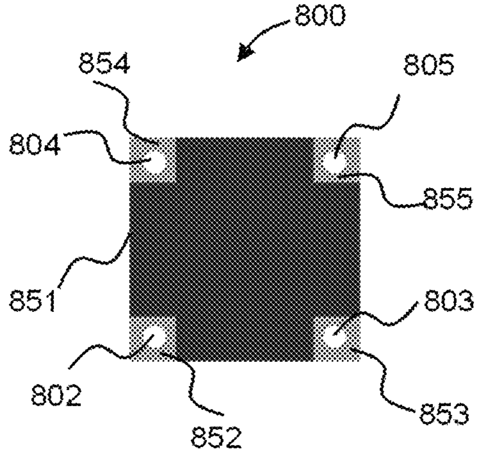
FIG. 8*b* is a bottom view schematic of a radiation booster having a thin profile.
Figure 8C:
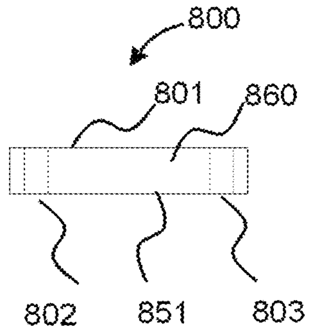
FIG. 8*c* is a lateral view schematic of a radiation booster having a thin profile.

FIGS. 8*a*, 8*b* and 8*c* show another example of a radiation booster 800 as the one described in FIG. 7 from a top view, a bottom view, and a side view, respectively. For this example, the thickness or height is at least five times less the shorter side of the minimum quadrilateral that encloses either the top 801 or the bottom 851 conductive parts. This is a low profile SMD radiation booster which is suitable for slim wireless platforms. As in the previous structure, four via holes 802, 803, 804, and 805 electrically connect through the substrate 860, the top conductive part 801 with the bottom conductive part 851. At least one pad 852, 853, 854 and 855 is a connection point 305 of the radiation booster as shown in FIG. 3. Said connection point with a connection point in the ground plane layer defines an internal port of the radiating structure.

Figure 8D:
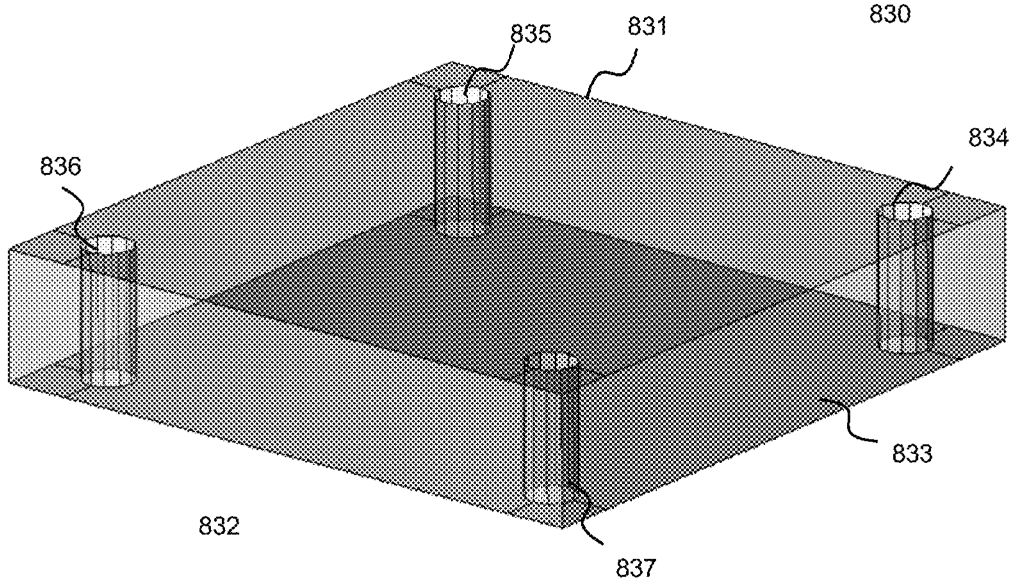
FIG. 8*d* is a three-dimensional view schematic of a radiation booster having a thin profile.

FIG. 8*d* shows a 3D view of the SMD radiation booster described in FIGS. 8*a*, 8*b*, and 8*c*. The radiation booster 830 comprises a top 831 and a bottom 832 conductive parts spaced by a dielectric support 833 (shown transparent for illustrative purposes). Both top 831 and bottom 832 conductive parts are connected with vias 834, 835, 836, and 837.

Figure 8E:
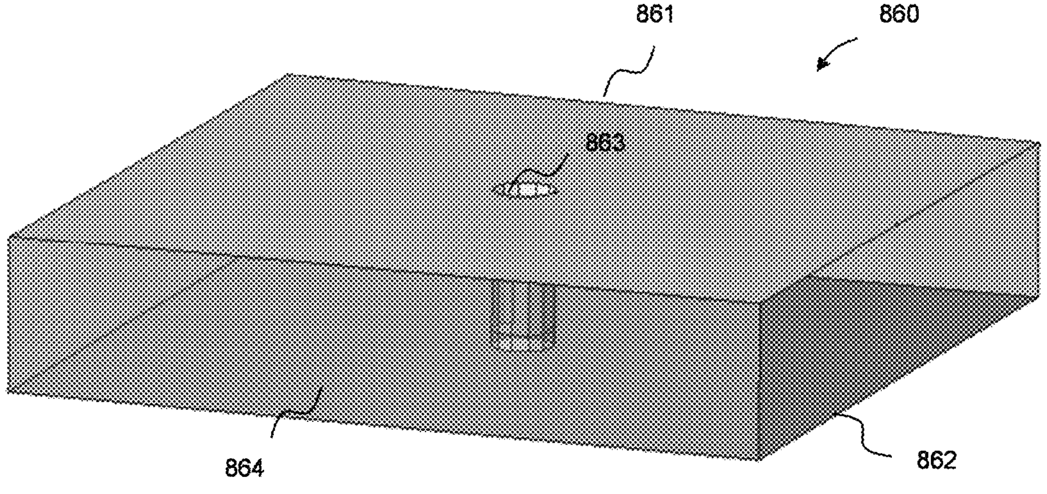
FIG. 8*e* is a three-dimensional view of a radiation booster with a single connecting means between the top and bottom parts.

FIG. 8*e* shows a radiation booster 860 comprising a top 861 and a bottom 862 conductive part spaced by a dielectric support 864. The radiation booster 860 comprises one via 863 connecting the top conductive part 861 with the bottom conductive part 862. This is a low profile radiation booster which is advantageously used for slim wireless platforms.

Figure 9:
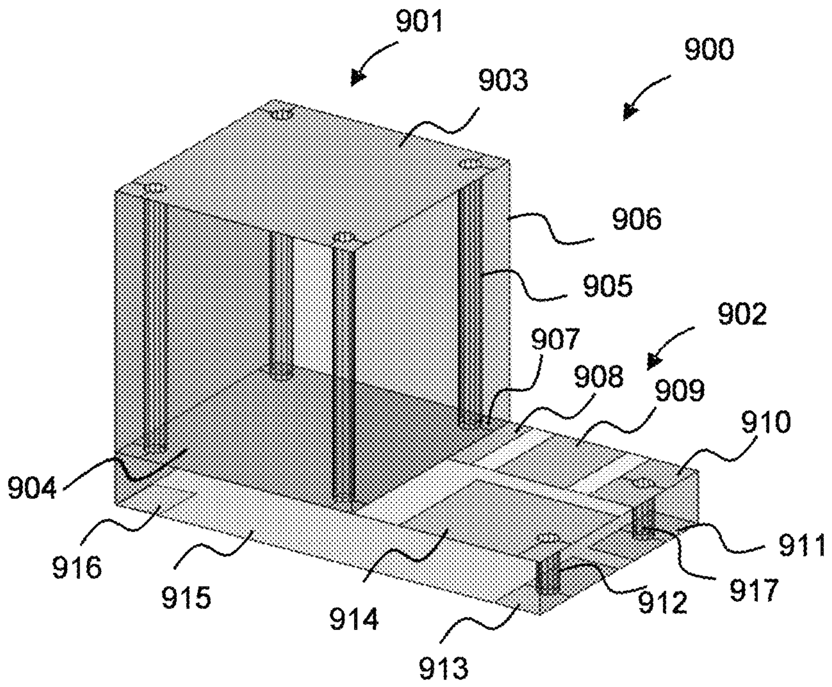
FIG. 9 is an example of an integration of a radiation booster with a package including several conductive means for integrating a radiofrequency system.

FIG. 9 shows an example of a radiation booster in package 900. Said radiation booster in package 900 comprises a radiation booster 901 and a radiofrequency module 902. The radiation booster 901 comprises a dielectric support 906, a top conductive part 903 and a bottom conductive part 904 connected by vias (an example of via is shown in 905). The radiofrequency module 902 comprises several conductive areas 908, 909, 910, 914 to host components for a radiofrequency system. The conductive areas are called pads. The radiofrequency module also comprises a pad 911 for connecting the radiation booster in package to an integrated circuit chip of the wireless handheld device in charge of transmitting and receiving electromagnetic wave signals. The radiation booster in package also comprises a pad 913 to connect it to a ground plane layer 402 as the one shown in FIG. 4*a*. Pads 910 and 911 are connected through via 917. In the same manner, pad 914 and 913, which are separated by a dielectric support 915, are connected through via 912. The radiation booster in package also comprises a pad 916 to fix the package to a substrate 404 used to support a ground plane layer 402 (FIG. 4*a*). Said pad 916 in some example is soldered to a pad in the substrate 404.

The radiation booster 901 further comprises a pad 908. Said pad 908 defines a connection point 907. Said connection point with a connection point of a ground plane layer defines the internal port. Said port is connected to a port of a radiofrequency system for matching purposes.

This radiation booster in package configuration is suitable for a standard solution integrating both a radiation booster and a radiofrequency module useful to host several components of a radiofrequency system to provide operation at the desired frequency bands. This scheme is useful because there is no need to customize pads in a ground plane of a wireless handheld device.

Figure 10:
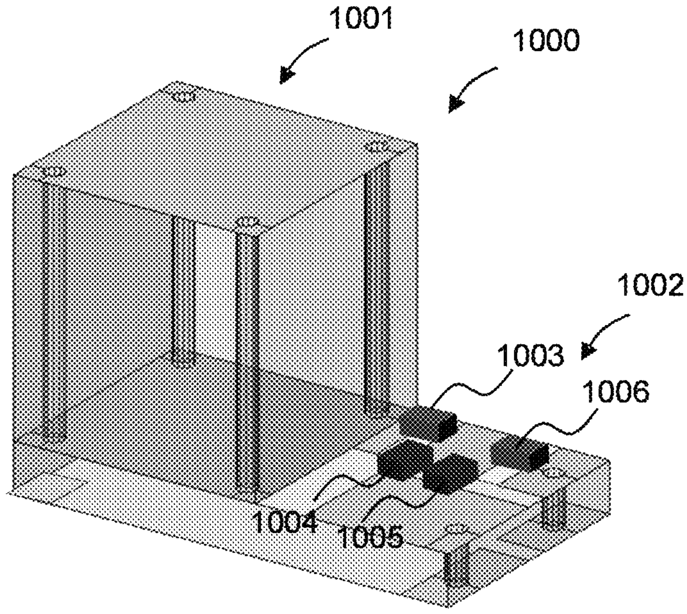
FIG. 10 is an example of an integration of a radiation booster with a package including a radiofrequency system comprising SMD components.

FIG. 10 shows an example of the previous radiation booster in package illustrating the components of a radiofrequency system connected to a radiation booster 1001. The radiofrequency module 1002 of the radiation booster in package 1000 comprises several pads to host a radiofrequency system. In this example, the radiofrequency system comprises four components 1003, 1004, 1005, and 1006. In a preferred embodiment, the component 1003 is a reactance cancellation element comprising an inductor; a broadband matching network comprising an LC resonator (1004 and 1005) and a final stage 1006 which is a fine tune stage. In some examples, the said fine stage is not necessary and therefore, 1006 is a jumper, for example, a 0 ohms resistance. The series element 1003 together with shunt elements 1004 and 1005 are schematically represented in the example of FIG. 6*a*.

This particular example is suitable for a radiating system to provide operation in one, two or more bands within a frequency region between 698 MHz and 806 MHz. In some other examples, this particular example is suitable for a radiating system to provide operation in a frequency region between 824 MHz and 960 MHz. In other example, it provides operation between 690 MHz and 960 MHz. In yet another example, it provides operation between 1710 MHz and 2170 MHz. In a further example, it provides operation between 1710 MHz and 2690 MHz.

Figure 11:
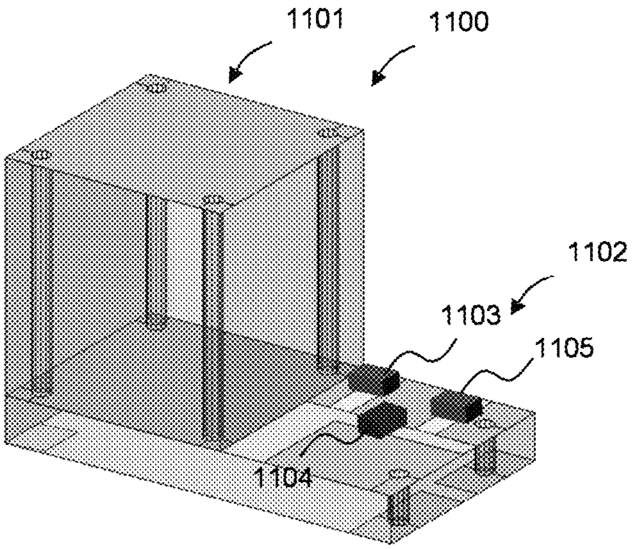
FIG. 11 is an example of an integration of a radiation booster with a package including a radiofrequency system comprising SMD components using a T-type configuration.

FIG. 11 shows an example of a radiation booster in package 1100 comprising a radiation booster 1101 and a radiofrequency module 1102. The radiofrequency module comprises a radiofrequency system comprising a T-type network (1103, 1104, and 1105).

In other embodiments, a circuit package such as those in FIG. 10 and FIG. 11 includes a second radiofrequency system connected to said radiation booster, said second radiofrequency system enabling the operation of the same booster within a second frequency region selected from the group consisting of: 698 MHz-806 MHz; 824 MHz-960 MHz; 690 MHz-960 MHz; 1710 MHz and 2170 MHz; 1710 MHz and 2690 MHz.

Figure 12A:
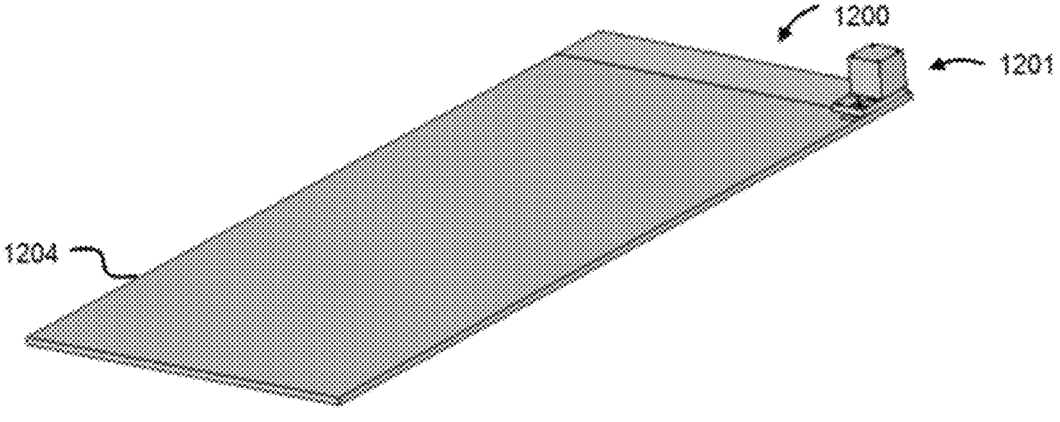
FIG. 12*a* is an example of an integration of a radiation booster with a package including a radiofrequency system comprising SMD components and the integration in a radiating structure for a radiating system
Figure 12B:
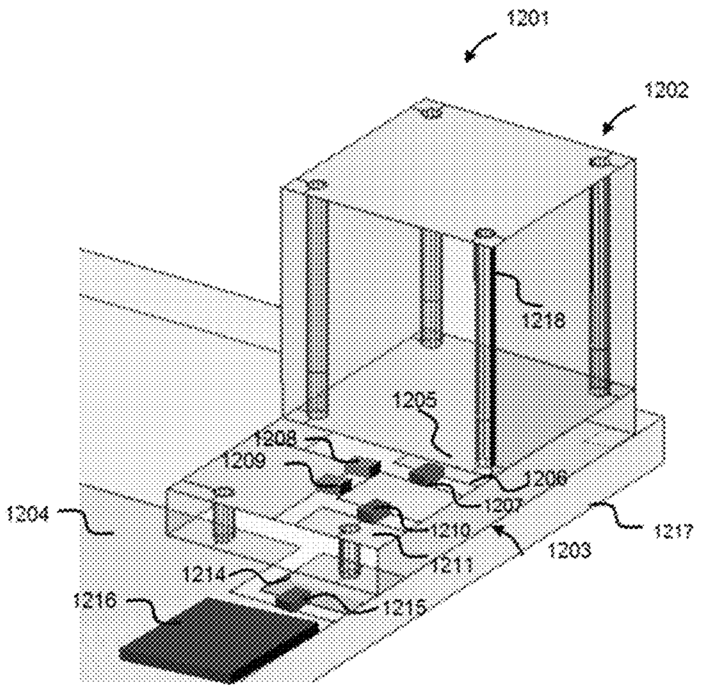
FIG. 12*b* is a more detailed view of the example of FIG. 12*a*.

FIG. 12*a* shows an example of an integration of a radiation booster in package 1201 in a radiating system 1200. FIG. 12*b* shows a detailed view of said integration. The radiation booster in package 1201 comprises a bottom conductive surface 1205 overlapping a pad 1206. This allows the radiation booster 1202 to be soldered to the pad 1206 by injecting heat through via 1218. A connection point in said pad 1206 with a connection point of the ground plane layer 1204 defines an internal port of the radiating structure of the radiating system 1200. This internal port is connected to a first port of the radiofrequency system defined between a connection point in the pad 1206 and a connection point in the ground plane layer. A radiofrequency module 1203 of the radiation booster in package 1201 comprises several pads to host a radiofrequency system. Said radiofrequency system comprises a series component 1207 (reactance cancellation), a broad band matching network (1208 and 1209) and a fine-tuning stage (1210). The second port of the radiofrequency system is defined between a connection point in the pad 1211 and a connection point of the ground plane layer 1204. Said port is connected to the external port of the radiating system 1200 which is defined between a connection point in the pad 1214 and a connection point in the ground plane layer 1204. In this example, a series component 1215 connects the external port of the radiating system with an integrated circuit chip 1216 performing radiofrequency functionality. In some examples, said integrated circuit chip 1216 is a Front End Module in charge of providing a multiplexing functionality. In this particular example, the ground plane layer 1204 is printed on a dielectric substrate 1217.

Figure 13:
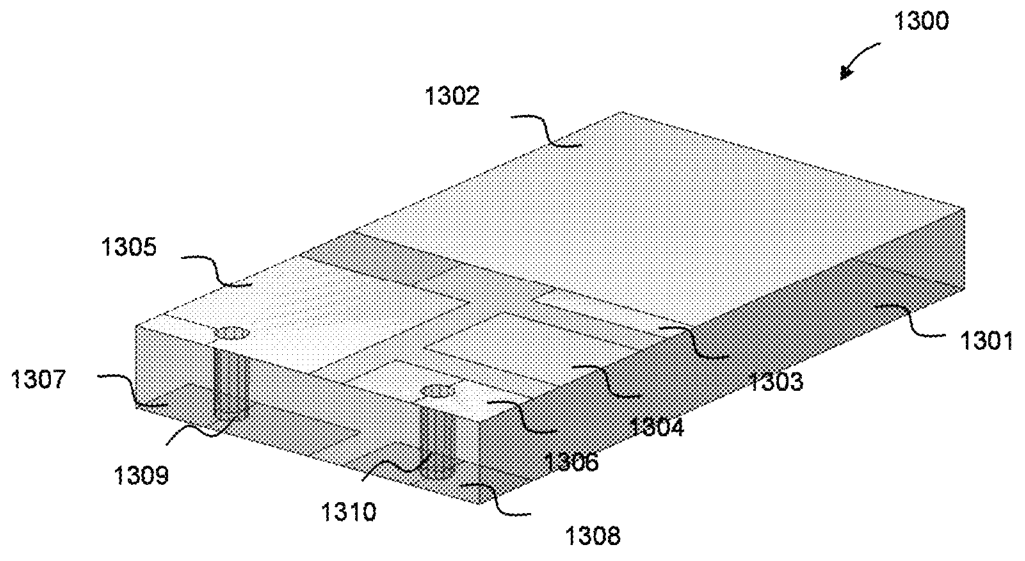
FIG. 13 is an example of a package for integrating a radiation booster and a radiofrequency system.

FIG. 13 shows a radiofrequency module 1300 comprising several pads 1302, 1303, 1304, 1305 to host components for a radiofrequency system and a radiation booster. In particular, the pad 1302 allows the electrically connection between a radiation booster as the ones described in FIGS. 2 (i.e., 2*a* through, 2*k* both included), 7, 8, 22 and 23 where the bottom conductive part of a radiation booster is electrically in contact with the pad 1302. At the same time, said pad 1302 is in contact with pad 1303. The gap between the pad 1303 and 1304 allows the integration of at least one series component. The gap between the pad 1304 and 1305 allows the integration of at least one shunt component. The gap between the pad 1304 and 1306 allows the integration of at least one series component. The pad 1306 is electrically connected to a pad 1308 by a via 1310. The pad 1305 is connected to pad 1309 through via 1307. The pad 1305 is intended to provide a ground connection which is provided by electrically connecting pad 1309 with a point in a ground plane layer.

In particular this configuration is preferred to integrate a radiation booster as the ones shown in FIGS. 2, 7, 8, 22 and 23. Furthermore, this radiofrequency package is preferred to integrate a series inductor connecting pad 1303 and 1304, a broadband LC matching network connecting pad 1304 and 1305, and a series component connecting pad 1304 and pad 1306.

This radiofrequency package is supported by a dielectric support 1301. In some examples, this dielectric support is FR4, glass fiber or glass epoxy, which are suitable for mass production at a competitive cost. The advantage of this radiofrequency module is that minimum customization of a PCB of a wireless handheld device is required since the needed pads are allocated in the radiofrequency module.

Figure 14:
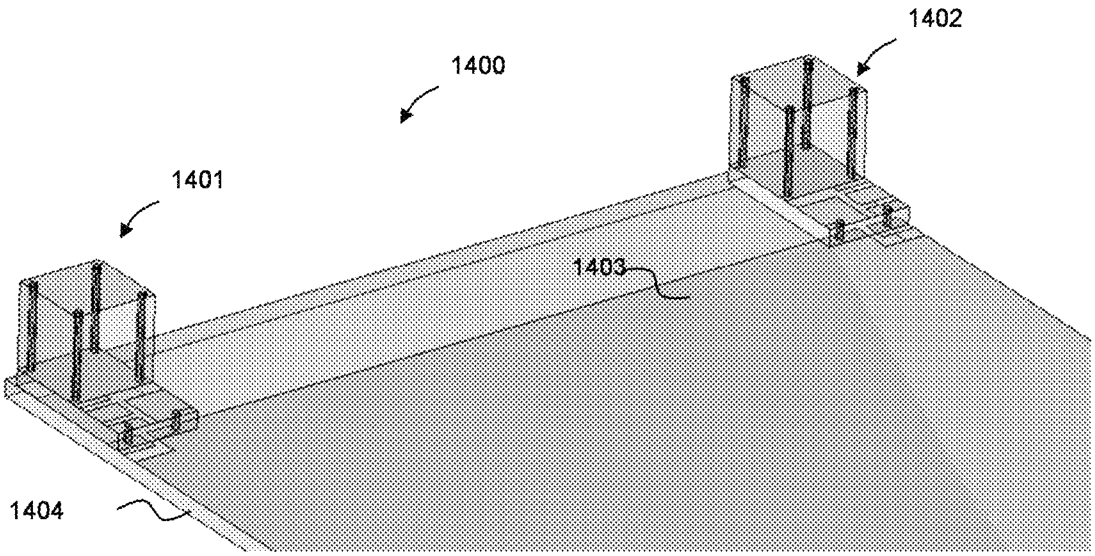
FIG. 14 is an example of two packages for a radiating system including a radiation booster and conductive means for integrating a radiofrequency system.

FIG. 14 shows a radiating structure 1400 for a radiating system operating in a first and a second frequency region of the electromagnetic spectrum. For a particular example, the radiation booster in package 1401 is suitable for exciting an efficient radiation mode of the ground plane and thus providing operation in a first frequency region of the electromagnetic spectrum. In a similar manner, the radiation booster in package 1402 is suitable for exciting an efficient radiation mode of the ground plane and thus providing operation in a second frequency region of the electromagnetic spectrum. In some examples a first frequency region ranges from 698 MHz to 960 MHz and a second frequency region ranges from 1710 MHz to 2690 MHz. In some other examples, both radiation boosters in package provide operation in the same frequency range. This particular embodiment is particularly useful to provide robustness to human loading effects. For instance, when the finger of the user blocks one radiation booster in package, the other is still free to operate. In yet another example, both radiation booster in package operate in the same frequency region to provide MIMO operation, for example at least one of LTE700, LTE2100, LTE2300, LTE2500. In this example, the radiating structure 1400 has a ground plane layer 1403 printed on a dielectric substrate 1404. In this example, the footprints of the radiation boosters 1401 and 1402 do not intersect the conductive surface of the ground plane layer due to their arrangement on a clearance area of the ground plane layer 1403.

Figure 15A:
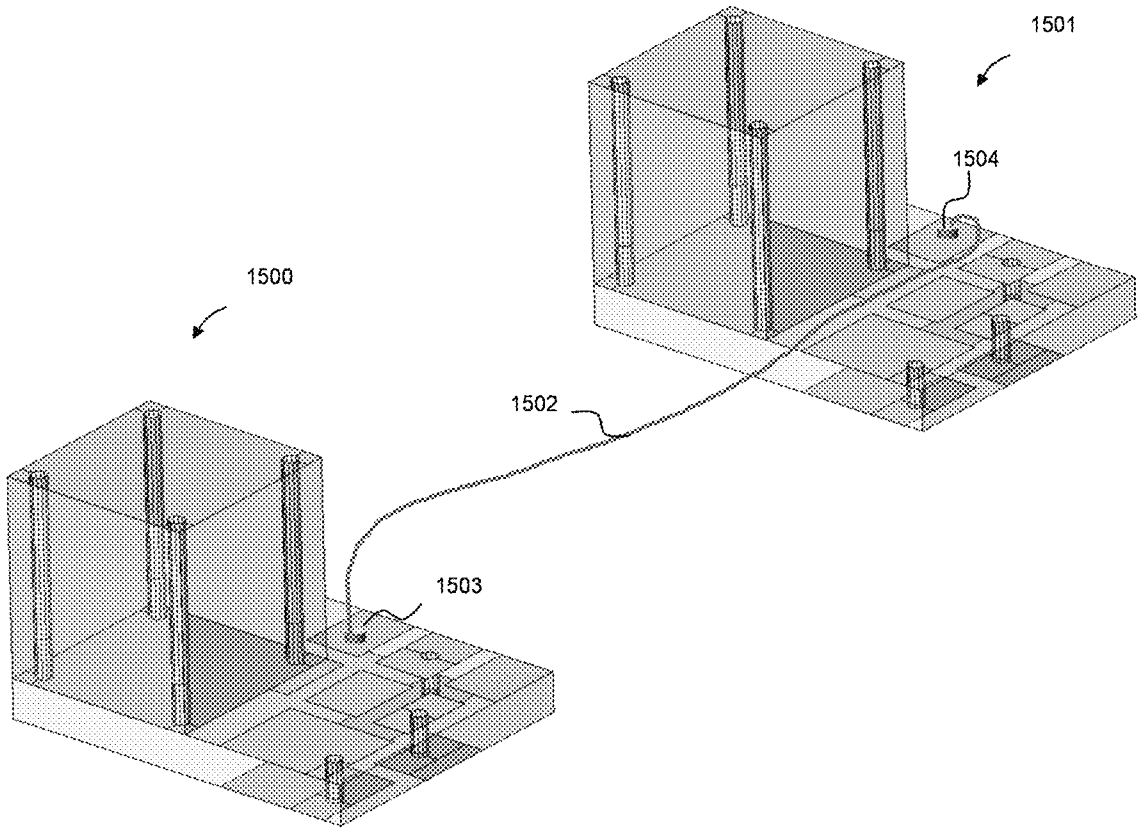
FIG. 15*a* is an example of two radiation boosters in package connected by a connection means.

FIG. 15 shows two radiation boosters in package 1500 and 1501 connected using a connection means 1502. One end of said connection means 1502 is electrically connected to pad 1503 and the other end of said connection means 1502 is electrically connected to pad 1504.

In some preferred examples, the connection means 1502 is a transmission line.

Figure 15B:
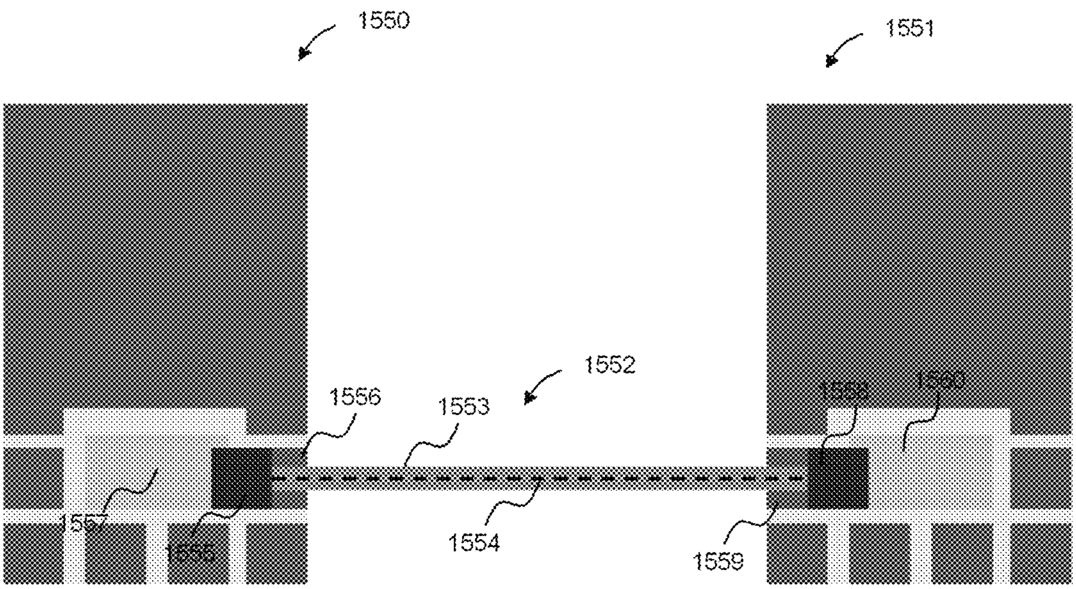
FIG. 15*b* is an example of interconnection of two radiofrequency modules using a transmission line.

This is illustrated in FIG. 15*b*. FIG. 15*b* shows a first radiation booster in package 1550 and a second radiation booster in package 1551 connected by a transmission line 1552. Said transmission line 1552 comprises a part 1553 connected in one end, to pad 1557 through the component 1555. Said pad 1557 is at the same time connected to a connection point in the ground plane layer of a radiating structure. The other end of part 1553 of the transmission line 1552 is connected to pad 1560 through component 1558. Said pad 1560 is at the same time connected to a connection point in the ground plane layer of a radiating structure. The part 1554 (for example, the inner conductor of a microcoaxial cable) is connected in one to pad 1556 through component 1555. The other end of part 1554 is connected to pad 1559 through component 1558. In some examples the components 1555 and 1558 are IPX connectors. Said IPX connectors are SMD components. In some examples, the external part of said connector is connected to pad 1557 and the inner part to pad 1556. In some examples, the transmission line 1552 is a microcoaxial cable. Said microcoaxial cable has an external part 1553 and an inner part 1552. Both parts 1554 and 1553 are conductive parts. In some examples, the outer part of the microaxial cable is electrically grounded through component 1555 and 1559.

Figure 16A:
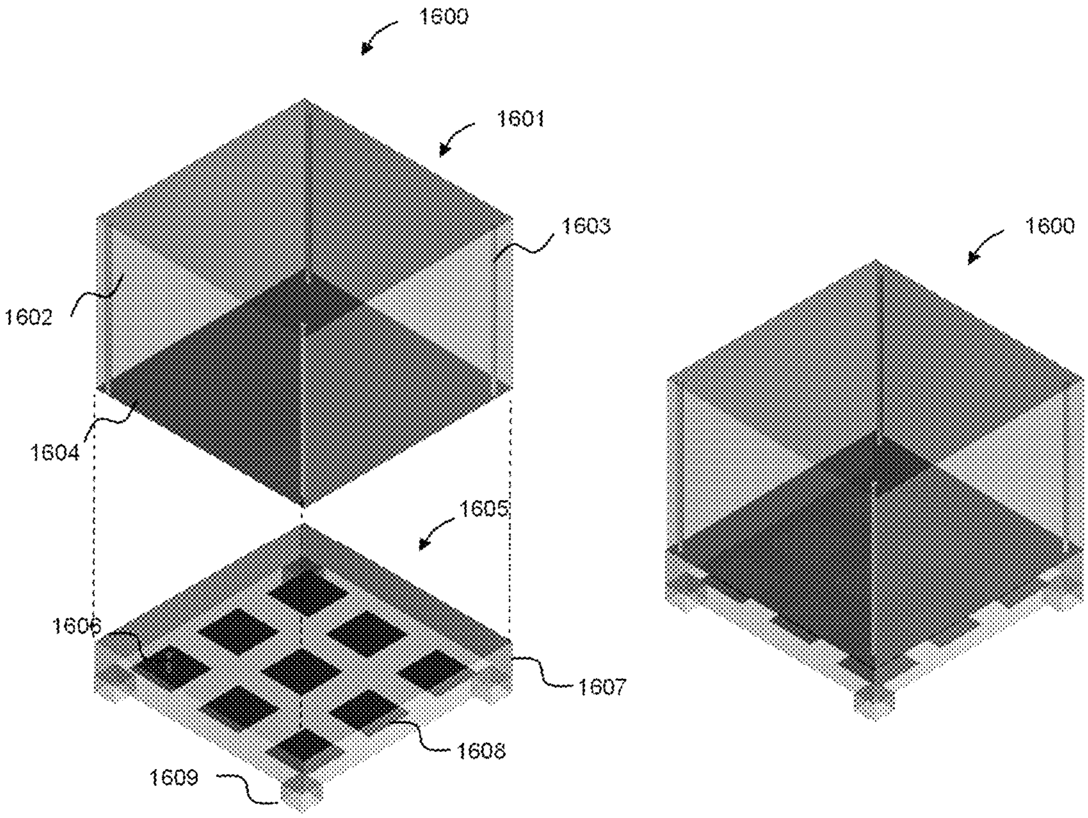
FIG. 16*a* is an example of packages for integrating a radiation booster and a radiofrequency system showing a whole view of a radiation booster and a radiofrequency system located below the radiation booster.

FIG. 16*a* shows an example of a stand-alone component including radiation booster in package element 1600, said element 1600 comprising a radiation booster 1601 and a radiofrequency module 1605 stacked one to each other so as to form a compact radiation booster in package different to the one described in FIG. 9. An advantage of this solution is to minimize the area occupied when the radiation booster in package is integrated in a device.

The radiation booster 1601 comprises a top 1601 and a bottom 1604 conductive parts connected by four vias as the one shown in 1603. Both top and bottom parts are spaced by a dielectric element 1602. The radiofrequency module 1605 including a dielectric material 1607 is located underneath the radiation booster 1601. The bottom layer of this radiofrequency module 1605 comprises several conductive means (pads) 1608 useful to connect lumped components of a radiofrequency system. The bottom conductive part 1604 of the radiation booster 1601 is electrically connected to a pad of the radiofrequency module by means of via 1606. The whole radiation booster in package is fixed to the PCB of the device by means of spacers (1609) which can be glued or soldered to the PCB of a wireless handheld or portable device. Other kind or radiation boosters as the ones described in FIG. 2 can benefit of this scheme for obtaining a radiation booster in package.

Figure 16B:
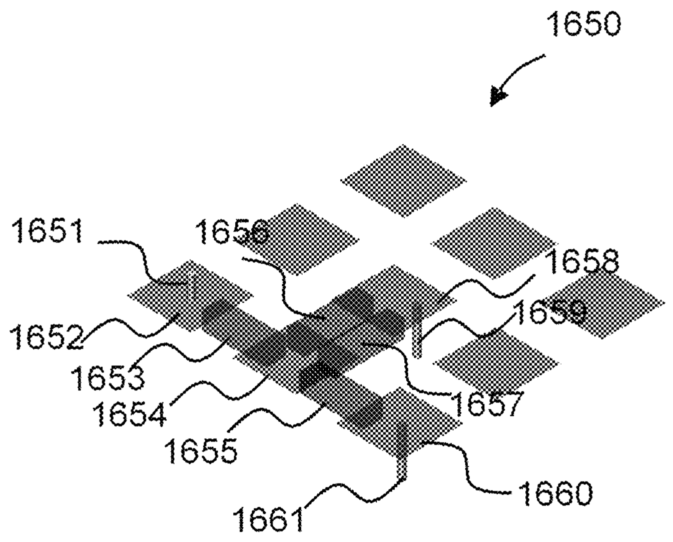
FIG. 16*b* is an example of packages for integrating a radiation booster and a radiofrequency system showing a particular view of a radiation booster and a radiofrequency system located below the radiation booster.

As shown in FIG. 16*b*, pad 1652 from the radiofrequency module 1650 is connected to the bottom conductive part 1604 of the radiation booster 1601 with via 1651. A series component 1653 is connected between pad 1652 and pad 1654. Two shunt components 1656 and 1657 are connected between 1654 and pad 1658. Said pad 1658 is connected to a point of a ground plane later by means of via 1659. A series component is connected between pad 1654 and 1660. Said pad 1660 is connected to via 1661. Said via is useful for connecting the radiation booster in package to an integrated circuit chip performing radiofrequency functionality.

Figure 16C:
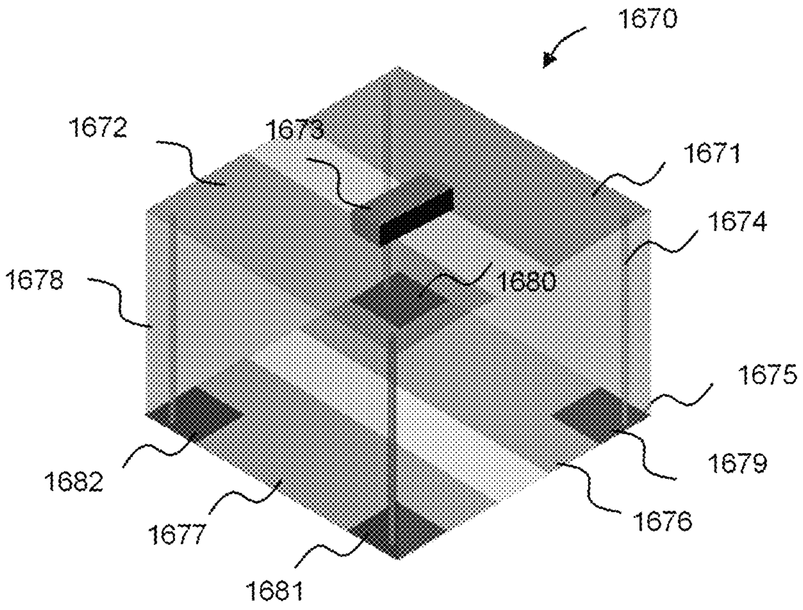
FIG. 16*c* shows an example of a lumped element embedded on the radiation booster.

FIG. 16*c* shows a radiation booster in package 1670 comprising a dielectric support 1678, a first conductive surface 1671 and a second conductive surface 1675 connected by, for instance, conductive linear elements or vias as the one shown in 1674. It also comprises a third conductive surface 1672 connected to a fourth conductive surface 1677 by for instance conductive linear elements or vias. The bottom conductive part 1676 and 1677 comprises several pads 1679, 1680, 1681, 1682 which are useful for connecting to a radiofrequency system or for soldering the radiation booster in package 1670 to a PCB. The bottom conductive parts 1676 and 1677 are in some examples covered by a thin layer of ink (ex: silk screen ink) except for in the pads 1679, 1680, 1681, 1682 leaving the conductive part free. This particular embodiment is useful for matching purposes since enables including one or more lumped elements such as for instance 1673, said element connecting both top conductive surface elements 1671 and 1672. Said lumped element is in some examples an inductor. In some examples it is a capacitor. In some examples it is a combination of an inductor and capacitor. In some embodiments 1673 is an active element which is useful for matching purposes. An additional advantage of lumped element or elements such as 1673 is that they can provide flexibility in the interconnection and dynamic arrangement of the whole set. For instance, an active element as a switch can be turned on and off depending on the operating band, meaning that element 1670 might become a single radiation booster (when 1673 interconnects 1671 and 1672) or two functional, adjacent radiation booster (when 1673 effectively disconnects 1671 and 1672). Similarly, such connecting elements 1673 might take the form of frequency selective elements (e.g. reactive elements, filters, resonators) that would couple or uncouple elements 1671 and 1672 depending on the operating frequencies of the wireless device.

The input impedance of said radiation booster 1670 is such that it becomes a non-resonant element (imaginary part of the input impedance not equal to zero) for all frequencies of operation when disconnected from a radiofrequency system. In this regard, when the element 1673 is a 0Ω resistance, the input impedance of said radiation booster 1670 of a radiating system when disconnected from its radiofrequency system is non-resonant for all frequencies of operation.

As discussed, an advantage of this embodiment when removing the lumped element 1673 is to provide two radiation boosters in the same package. For this case, one radiation booster operates in a frequency region and the other radiation booster in a different frequency region. For example, one radiation booster operates (the one comprising the top 1671 and bottom 1676 conductive parts) at GSM850 and GSM900 and the other radiation booster (the one comprising the top 1672 and bottom 1677 conductive parts) operates at GSM1800, GSM1900, UMTS, LTE2100, LTE2300, and LTE2500.

Figure 17A:
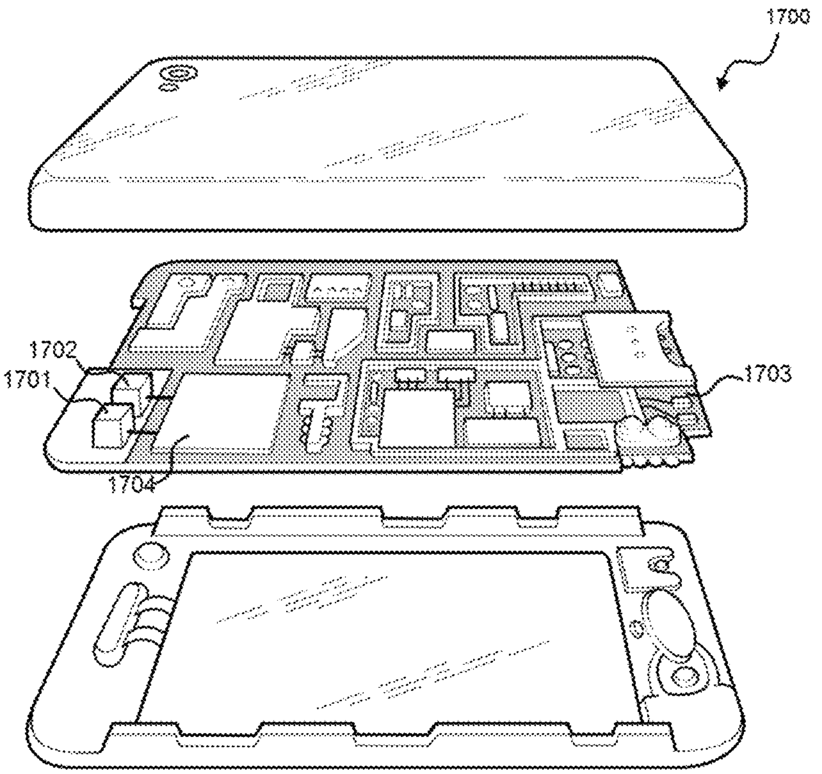
FIG. 17*a* is an example of a wireless handheld or portable device including a radiating system comprising two radiation boosters in a compact configuration.

FIG. 17*a* shows an illustrative example of wireless handheld or portable device 1700, in an exploded view, designed for multiband operation according to the present invention comprising a radiating structure that includes a first radiation booster 1701, a second radiation booster 1702, and a ground plane layer 1703 (which could be included in a layer of a multilayer PCB). The wireless handheld or portable device 1700 also comprises a radiofrequency system 1704, which is interconnected with said radiating structure.

In some examples, both radiation boosters 1701 and 1702 feature the same topology. For example, both radiation boosters feature a substantially cubic shape as those described in FIG. 2. This is advantageously used to minimize the number of different parts in a device. Moreover, having the same radiation booster topology avoids mounting errors of the radiation booster in a wireless handheld or portable device.

In some other examples, the first radiation booster 1701 and a second radiation booster 1702 feature a different form factor. For instance, 1701 might feature a cubic topology as embodiments in FIG. 2 and the second radiation booster 1702 features a parallelepiped shape such as for instance an embodiment in FIG. 8. This is advantageously used to optimize the performance at each frequency region of operation associated to the radiation boosters.

Figure 17B:
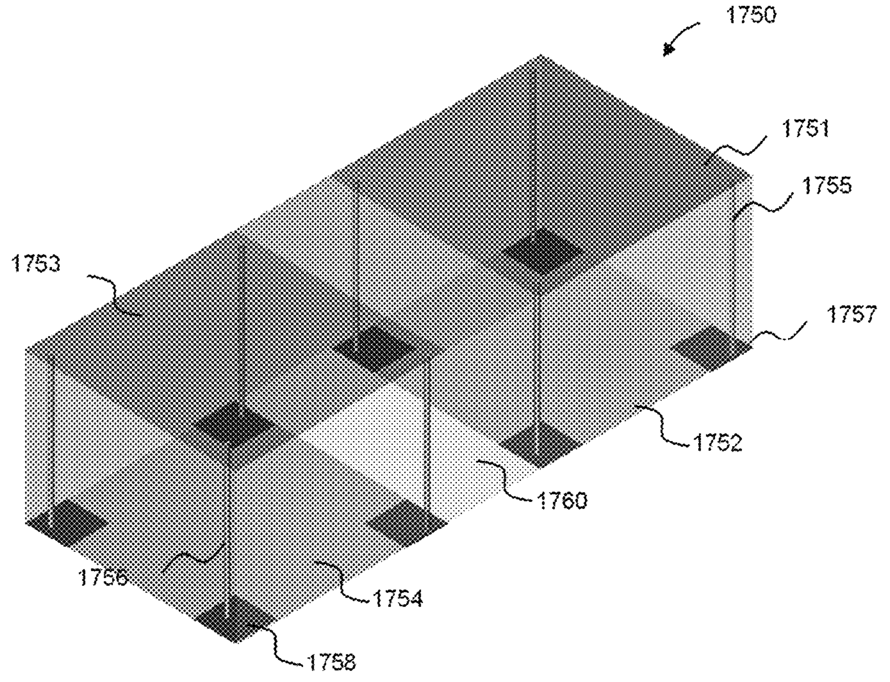
FIG. 17*b* are examples of a package comprising two radiation boosters.

FIG. 17*b* shows a stand-alone component 1750 comprising two radiation boosters embedded in a unitary dielectric structure or support 1760. A first radiation booster includes a concave conductive structure comprising conductive elements 1753, 1754 and one or more conductive elements such as 1756. A second radiation booster includes a concave conductive structure comprising conductive elements 1751, 1752 and one or more conductive elements such as 1755. While the figure describes the use of four conductive elements 1756 and 1755 within each booster, the concave conductive structure might include one, two, three, five or more of them as well within each booster as well. In some embodiments one or more of said boosters fits inside one or more of any of the limiting volumes described in the present invention. In some embodiments, the whole stand-alone component fits in one or more of any of the limiting volumes described in the present invention.

Embodiments described in FIG. 17*b* are interesting for a concentrated configuration as the one shown in FIG. 17*a*. In one embodiment one radiation booster comprises a top 1751 and a bottom conductive part 1752 connected by vias. In some examples, the bottom conductive part is covered by a thin layer of ink (ex: silk screen ink). Some areas do not have said thin layer, resulting in pads 1757 and 1758 being useful for connection to a radiofrequency system or for fixing the radiation booster to a PCB. In a similar manner, a second radiation booster comprises a top 1753 and a bottom 1754 conductive parts connected by vias as the ones shown in 1755 and 1756.

In particular, a first radiation booster in 1750 is associated to a first frequency region and a second radiation booster is associated to another frequency region making it possible for the radiating system to provide operability for the LTE 700/1700/1900/2300/2500, GSM 850/900/1800/1900, CDMA 850/1700/1900, WCDMA (UMTS) 850/900/1700/1900/2100.

Figure 17C:
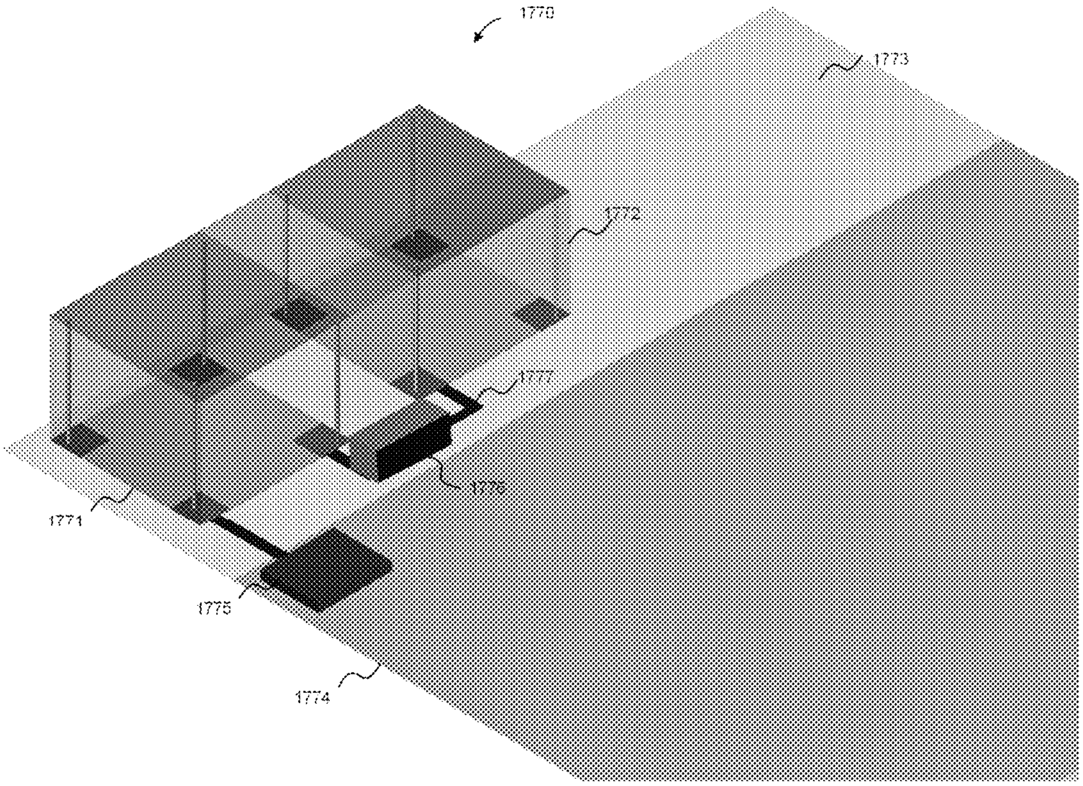
FIG. 17*c* shows a package comprising two radiation boosters and a SMD component to connect said two radiation boosters.

An advantage of an embodiment featuring two or more radiation boosters such as stand-alone component 1750 is that the radiation boosters can be connected by an external circuitry so as to a form a single electrically functioning unit such as for instance a single radiation booster as illustrated in FIG. 17*c*. The radiating structure 1770 comprises radiation boosters 1771 and 1772 which are connected by a component 1776 and conductive traces 1777. In this particular example, the component 1776 is a SMD component. In other examples, said component is a conductive trace printed in the PCB 1773. The radiation booster 1771 is connected to a radiofrequency system 1775 placed over a ground plane 1774.

Figure 18:
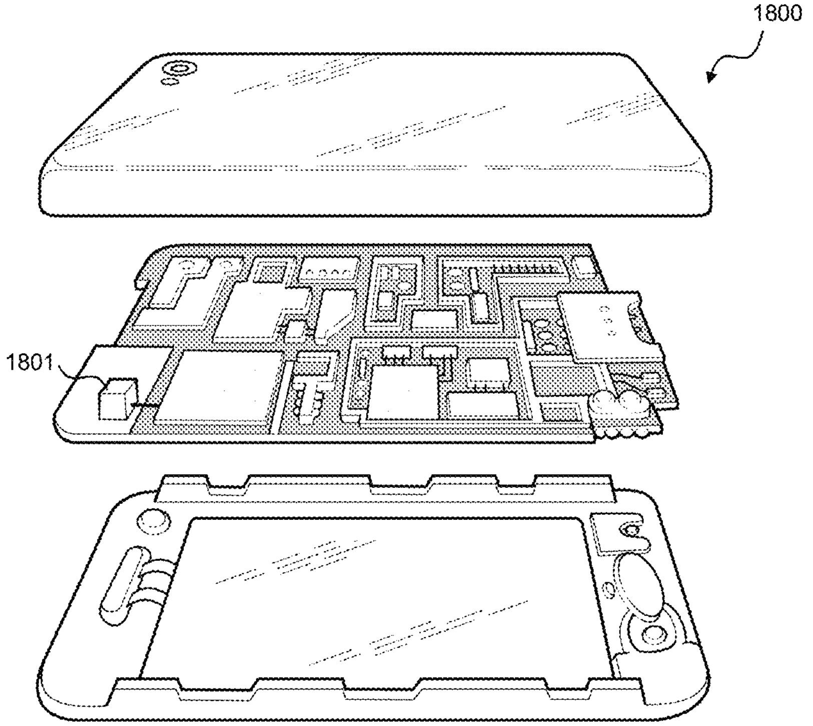
FIG. 18 is an example of a wireless handheld or portable device including a radiating system comprising a radiation booster.

FIG. 18 shows an illustrative example of wireless handheld or portable device 1800, in an exploded view, designed to feature a multiband operation according to the present invention comprising a radiating structure that includes a radiation booster 1801.

Figure 19:
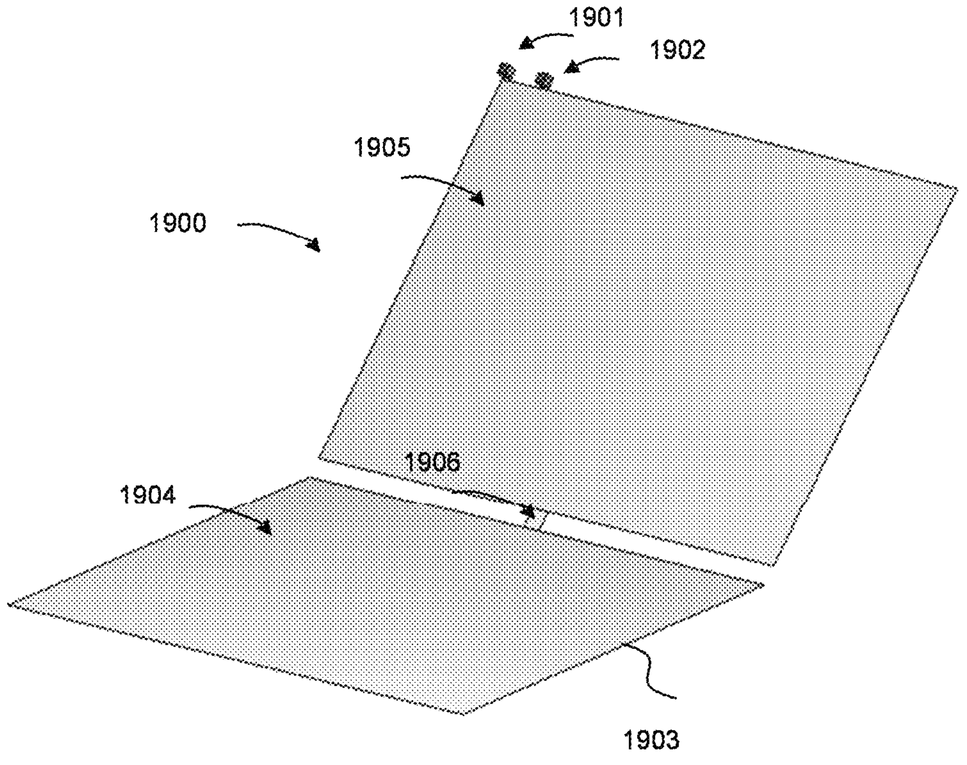
FIG. 19 is an example of a radiating structure for a radiating system, the radiating structure including a first and a second radiation booster integrated in a laptop device.

FIG. 19 represents a wireless or cellular laptop including two or more radiation boosters such as 1901 and 1902 according to the present invention. In particular FIG. 19 shows a radiating structure 1900 comprising two radiation boosters 1901 and 1902 located on a ground plane layer 1903 having dimensions and topology that fits the form factor of a laptop so that the whole set can be embedded completely inside a laptop. The radiation booster 1901 and 1902 include a conductive part featuring a polyhedral shape comprising six faces. Although other geometries such as those illustrated in figures above can be used instead. In some preferred embodiments one or more boosters are placed substantially close to an edge of the laptop. In some embodiments each of the two bodies of the laptop connected through a hinge include one or more radiation boosters.

The ground plane layer 1903 comprises two elements (bottom part 1904 and upper part 1905). In some embodiments, elements 1904 and 1905 are electromagnetically coupled at one or more of the frequencies of operation of the wireless or cellular laptop through coupling means 1906 in the hinge area. In some embodiments elements 1904 and 1905 remain uncoupled at one or more of the frequencies of operation of the wireless or cellular laptop.

In this particular example, the radiation boosters 1901 and 1902 are located in the upper body 1905 of the ground plane layer 1903 where a display will typically be placed, whereas in other preferred examples, one or more radiation boosters are located in the bottom body 1904 of the ground plane layer.

In a particular example, the radiation boosters 1901 and 1902 are located at the long upper edge of the upper part 1905 of the ground plane layer 1903. In yet other examples, the radiation boosters 1901 and 1902 are located close to the hinge of the ground plane layer 1903. In a further example, a radiation 1901 is located at the long upper edge of the upper part 1905 of the ground plane layer while a second radiation booster 1902 is located at the long upper edge of the bottom part 1904 of the ground plane layer 1903.

Figure 20:
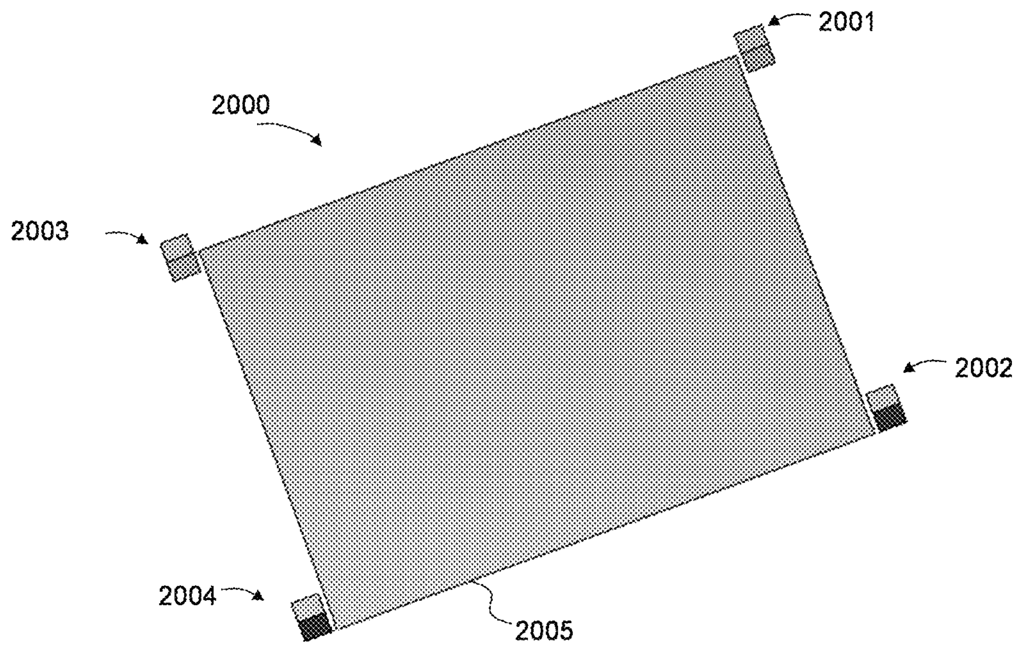
FIG. 20 is an example of a radiating structure for a radiating system, the radiating structure including a first and a second radiation booster integrated in a tablet.

FIG. 20 shows a particular example of a radiating structure 2000 comprising four radiation boosters 2001, 2002, 2003, and 2004 placed at the corners of a ground plane layer 2005. This particular example is suitable for providing MIMO operation. According to the present invention, a cellphone, a smartphone, a tablet, a phablet includes a radiating structure 2000 enabling MIMO capabilities to the wireless or cellular device.

Figure 21A:
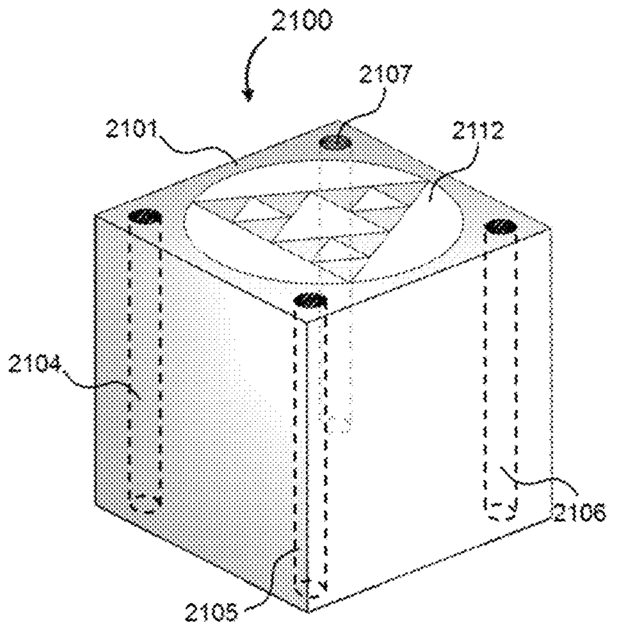
FIGS. 21*a* and 21*b* show an example of a radiation booster made of FR4 comprising 4 vias and pads seen from two different sides.
Figure 21B:
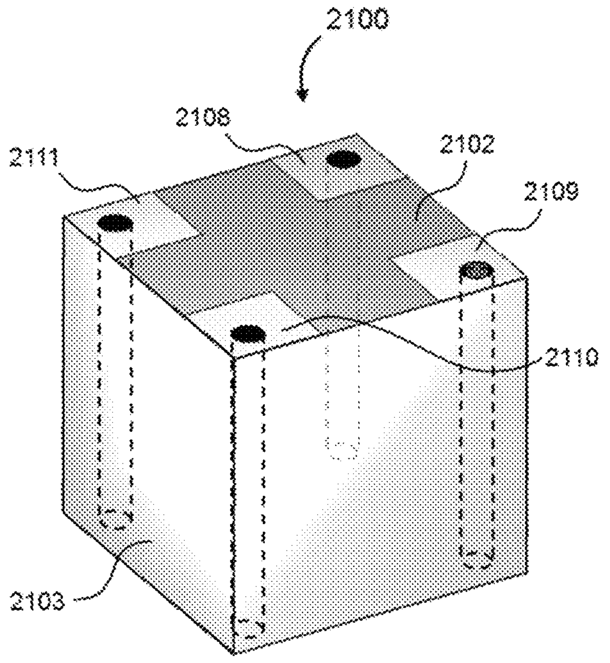

FIGS. 21*a* and 21*b* show an example of a radiation booster 2100, fabricated using a dielectric material 2103, seen from one side and from an opposite side. The dielectric material is FR4 for this example. Said radiation booster comprises a top conductive part 2101 and a bottom conductive part 2102 connected by connecting means (via holes that are shown with dashed lines for illustrative purposes) 2104, 2105, 2106, and 2107. Both the top 2101 and bottom 2102 conductive parts are protected by a thin silk screen ink layer placed on top of each conductive layer. For this particular example, the thickness of said silk screen ink layer is 25 um. In order to solder said radiation booster to a PCB, said silk screen layer is removed so as to have the conductor free. This creates four conductive means (pads) as shown in 2108, 2109, 2110, and 2111. At least one of these pads together with a connection point in a ground plane conforms an internal port of a radiating structure as the one shown in FIG. 3. A thin layer of ink 2112 in the top conductive part 2101 is used for marking a logo of a company. Some examples of placing said radiation booster 2100 in a radiating system are illustrated in FIG. 4*a, b, c*, FIG. 9, FIG. 10, FIG. 11, FIG. 12, FIG. 14, FIG. 15*a, b*, FIG. 16*a*, FIG. 17, FIG. 18, FIG. 19, and FIG. 20. For this example, the size of the radiation booster is 5 mm×5 mm×5 mm.

Figure 22A:
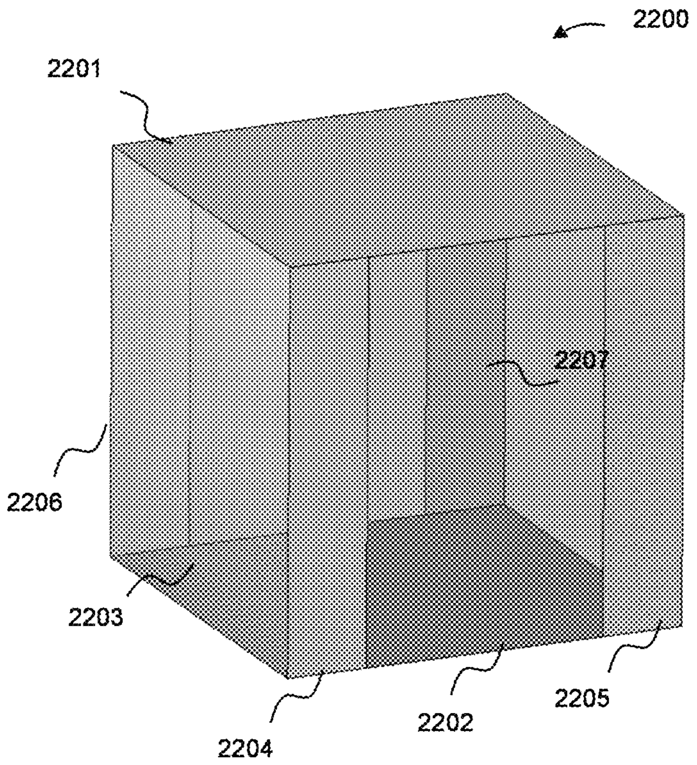
FIGS. 22*a* and 22*b* show examples of radiation boosters fabricated using MID technology.

FIG. 22*a* shows another example of a radiation booster 2200 according to the present invention which is fabricated using for instance an LMS and/or MID (Injection Molding Device) technique. Said radiation booster 2200 comprises a top conductive part 2201 and a bottom conductive part 2202 connected by conductive means 2204, 2205, 2206, and 2207. Said conductive means 2204, 2205, 2206, and 2207 are printed through the MID process on a dielectric support 2203.

In some examples, the radiation booster 2200 is connected to a radiofrequency module 1300. The bottom conductive part 2202 of the radiation booster 2200 is connected to the conductive part 1302 of the radiofrequency module 1300.

In some examples, the radiation booster 2200 is integrated in a ground plane layer as the radiation booster 430 of FIG. 4*b*.

Figure 22B:
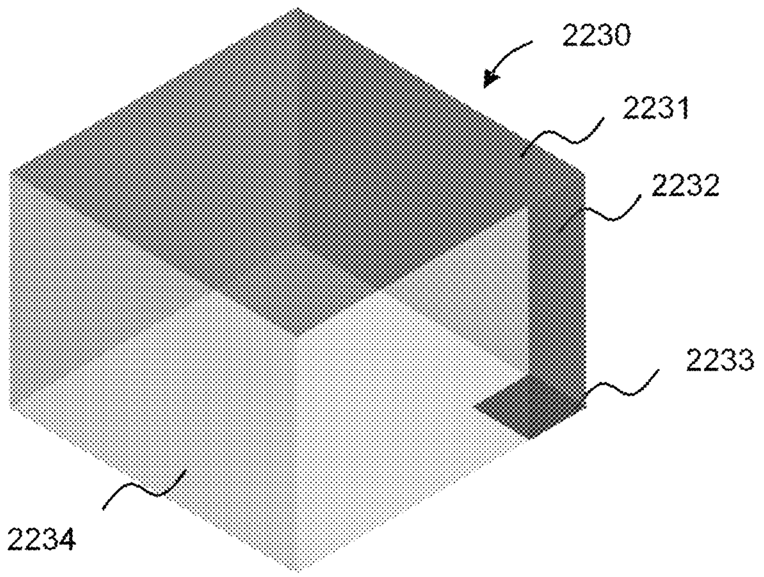

FIG. 22*b* shows an example of a radiation booster 2230 fabricated using MID. Said radiation booster 2230 comprises a top conductive part 2231 over a dielectric support 2234. Said conductive part 2231 is connected to a pad 2233 by means of a conductive strip 2232. This particular embodiment is particularly advantageous when the radiation booster is placed over a PCB having a ground plane underneath except under the pad 2233. Since the radiation booster 2230 does not have a bottom conductive part except for the small pad 2233, it is not short circuited by the ground plane underneath.

Figure 23:
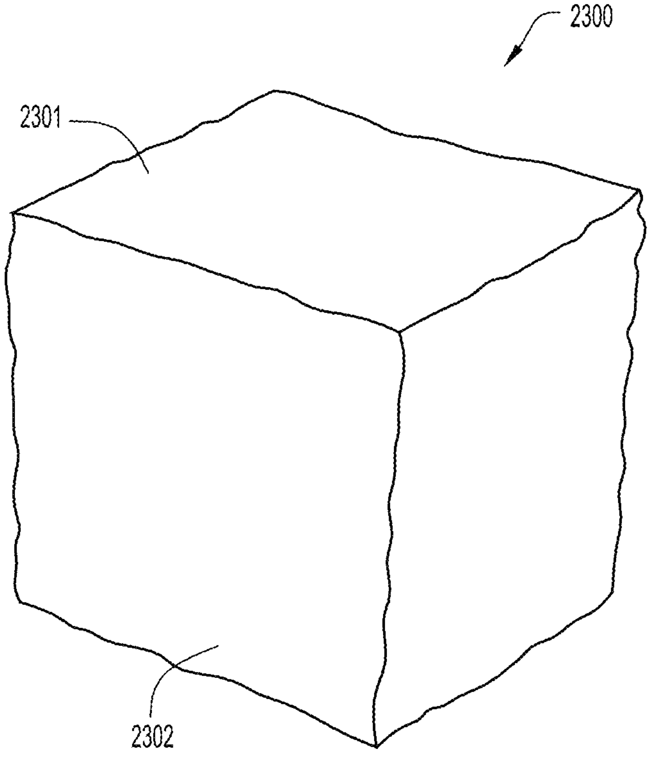
FIG. 23 is an example of a radiation booster fabricated using a metallized foam process.

FIG. 23 shows another example of a radiation booster 2300 fabricated using a metallized foam. This particular example shows a radiation booster having a substantially cubic shape. In some other examples, a substantially parallelepiped shaped radiation booster comprises three faces 2301, 2302, and 2303 with a different area. In some other examples, the parallelepiped comprises two faces 2301 and 2302 with the same area and different than 2303.

In some examples, the radiation booster 2300 is connected to a radiofrequency module 1300. A conductive part 2301 or 2032 or 2303 of the radiation booster 2300 is connected to the conductive part 1302 of the radiofrequency module 1300.

In some examples, the radiation booster 2300 is integrated in a ground plane layer as the radiation booster 430 of FIG. 4*b*.

Figure 24A:
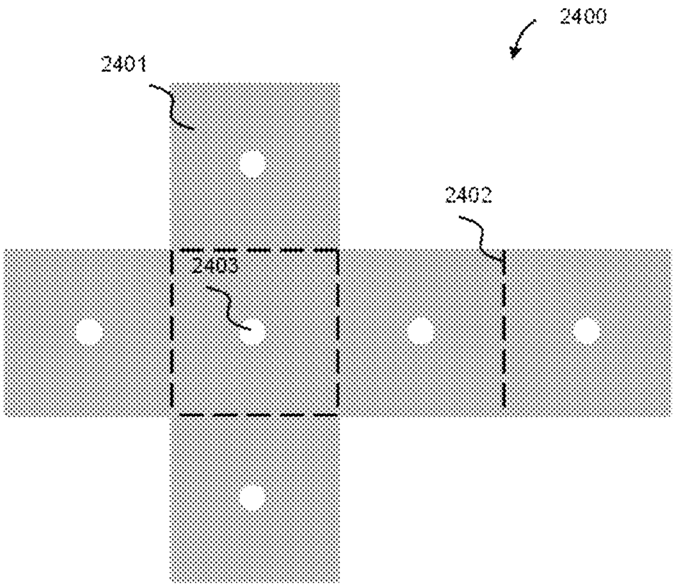
FIGS. 24*a* and 24*b* illustrate a method of fabricating a radiation booster stamping a conductive surface to a dielectric support.
Figure 24B:
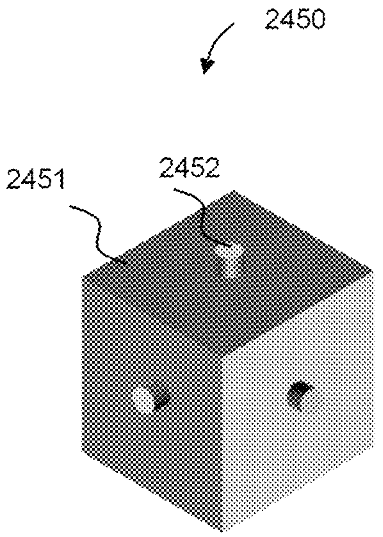

FIGS. 24*a* and 24*b* show an element and a step for a method of fabricating a radiation booster through a metal-stamping process. For this example, a concave 2D conductive surface 2400 comprises 6 square conductive faces 2401 comprising a hole (2403). The conductive surface 2400 is bent by the imaginary dashed lines (as the one shown in 2402). Once folded, the conductive surface 2400 is attached to a support material 2450 (FIG. 24*b*), forming a 3D concave conductive surface. Said support material has a cubic (or substantially cubic) shape 2451. Said cubic shape comprises a small protuberance (2452). Once the conductive surface 2400 is folded and attached to the cubic shape 2451, the protuberances as 2452 are melted by a heating process so as to fix the conductive surface 2400 to the cubic shape 2451. Said conductive surface 2400 is in some examples a rigid conductor which can be easily bent following the imaginary dashed lines as the one illustrated by 2402. In some other examples, the conductive surface 2400 is a flexible material which is easily folded. Said flexible material is attached to the cubic shape 2450 following the same heating process described above. However, in some embodiments, it is not necessary to have protuberances as 2452 so as the flexible material is fixed to the cubic shape by adhesive material. In some examples, the flexible material is a flex-film which is easily bent. In some other examples, the flexible material is graphene.

The connection of a radiation booster made up following this method is carried out by adding a pogo pin in the PCB of the wireless device which can be connected to a radiofrequency system. In some other examples, the contact is made by pressure so as to connect the radiation booster to a pad in the PCB. Said pad is then connected to a radiofrequency system. In some other examples, the radiation booster can be soldered to a pad of the ground plane layer.

Figure 25:
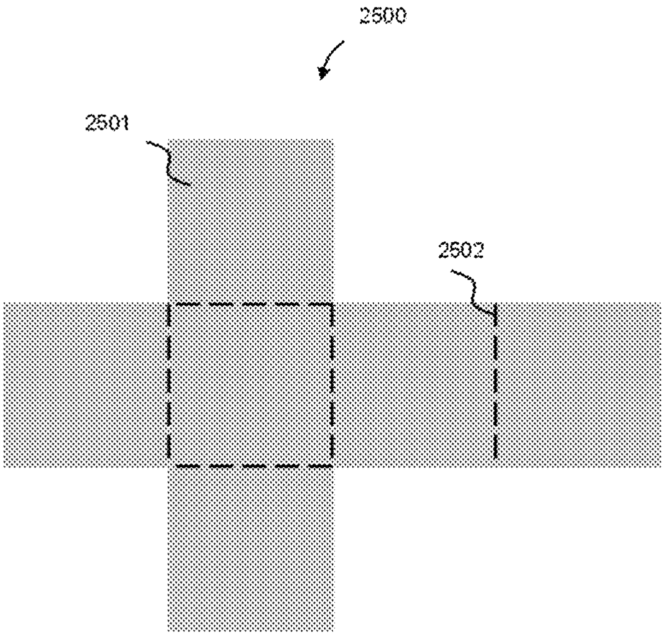
FIG. 25 illustrates a method of fabricating a radiation booster using a flexible conductor.

FIG. 25 shows an element and a step for a method of fabricating a radiation booster 2500 comprising a flexible conductive surface 2501 which is folded by the imaginary lines as shown in 2502. Examples of flexible conductive materials are flexfilm and graphene. In a similar manner, FIG. 26 shows another example where the flexible conductive surface is simpler. Once folded, the radiation booster can adopt the shape of a prism or a parallelepiped with two open faces or even a cylinder with two open ends. The connection can be made for instance by means of the same methods explained in FIG. 24.

While FIGS. 24*a*, 24*b*, and 25 show 6 conductive faces that substantially enclose an entire volume when folded in a 3D form (such as in FIG. 24*b*), in other embodiments one or more of the sides might be incomplete so that, when folded in a 3D form, the resulting concave conductive structure does not completely enclose an entire volume.

In other embodiments, one or more of the sides are electrically disconnected from the remaining sides. This way, when folded in a 3D form, two or more electrically disconnected conductive structures are formed to be included in two or more radiation boosters respectively.

Figure 26A:
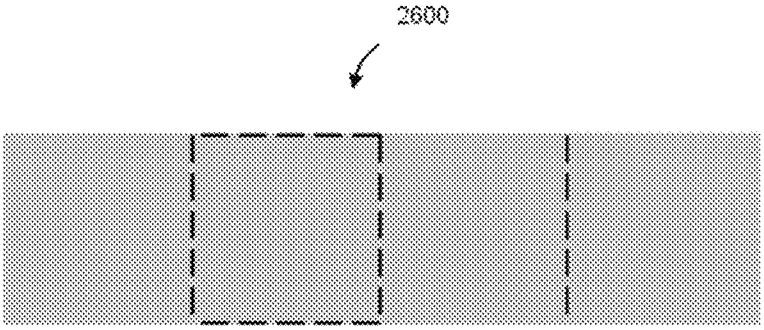
FIG. 26*a* illustrates a method of fabricating a radiation booster using a flexible conductor comprising open faces in a 2D representation.
Figure 26B:
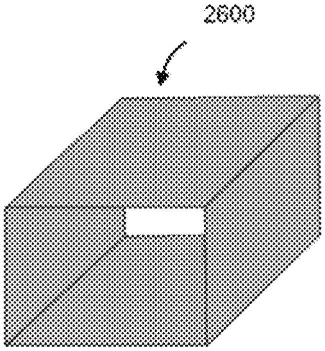
FIG. 26*b* illustrates a method of fabricating a radiation booster using a flexible conductor comprising open faces in a 3D representation.

FIGS. 26*a* and 26*b* show another method of fabricating a radiation booster comprising a flexible conductive surface 2600. In FIG. 26*a*, when folded by the imaginary lines, the resulting object has two open faces as seen in FIG. 26*b*. In some examples, the resulting shape forms a closed loop. In some other examples, the resulting shape is an open-loop. This may be particularly advantageous for impedance matching purposes.

Figure 27:
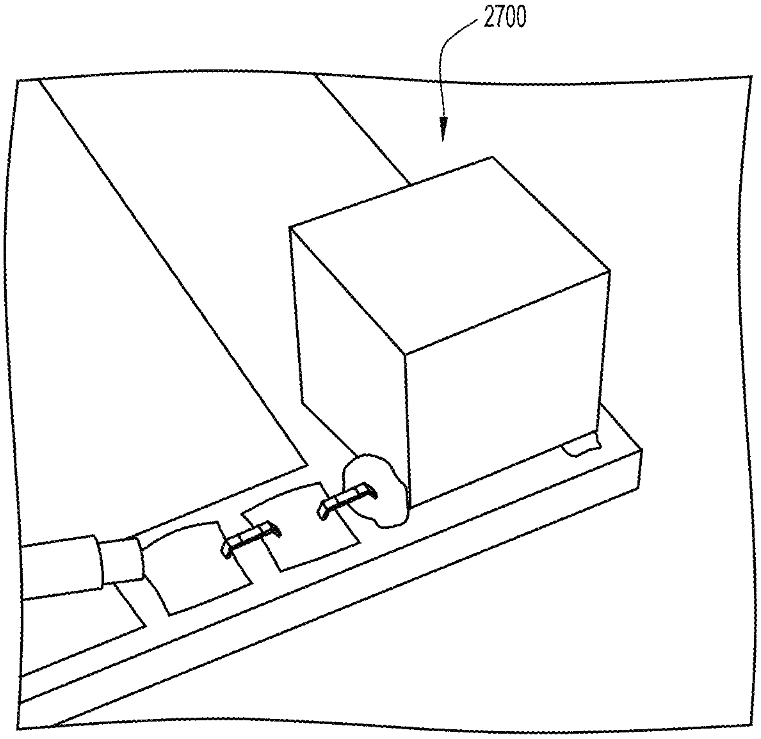
(PRIOR ART) FIG. 27
FIG. 27 is a radiation booster as described in the prior art.

FIG. 27 shows an example of a radiation booster 2700 as described in the prior art. This example shows a solid cube made up of brass which is a bulky, heavy structure, difficult to solder and to manufacture in large quantities at a low cost.

Figure 28A:
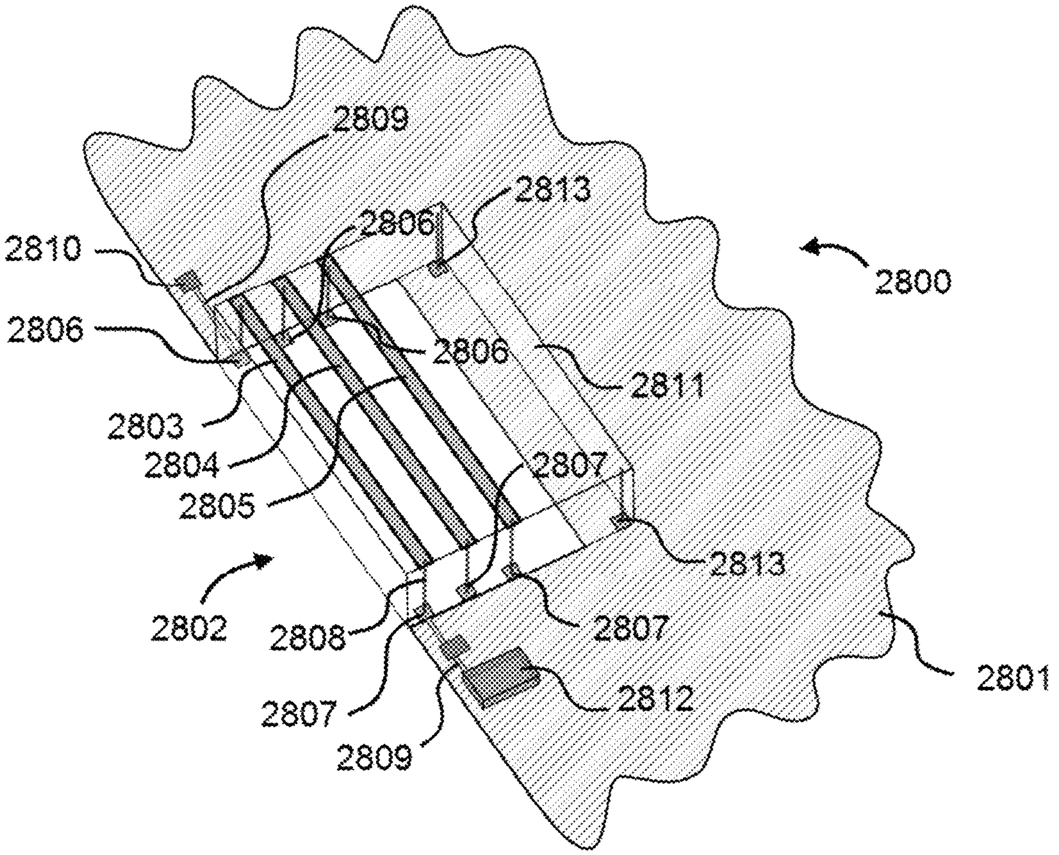
FIGS. 28*a*, 28*b*, and 28*c* show examples of radiating structures for a radiating system, the radiating structures including a reconfigurable radiation booster.

FIG. 28*a* shows an example of a radiating structure 2800 comprising a stand-alone component 2802 including a radiation booster. In this example, the stand-alone component is on one side of a ground plane layer 2801, on top of an indentation or slot in said ground plane layer. The stand-alone component comprises a dielectric support 2811 (shown transparent with dashed lines for illustrative purposes) and one or more linear conductive elements, such as for instance metallic strips 2803, 2804 and 2805, used for coupling energy and/or reconfiguring the radiation booster 2802. Each metallic strip is connected with linear conductive elements 2808, for instance via holes, to pads 2806 and 2807 located beneath the ends of the metallic strips. A strip together with a vertical via and the pad or pads at the end of a via or vias form a concave conductive element according to the present invention. In this particular embodiment, the connection from an integrated circuit chip with radiofrequency functionality 2812 to the ground plane 2810 is done through strip 2803 with a connection means 2809. The dielectric support 2811 is soldered to the ground plane layer 2801 in the overlapping area applying heat to the vias arriving to soldering pads 2813.

Diverse interconnections between the metallic strips through their pads permit the tuning of the radiation booster 2802, which is advantageous for adjusting the electric characteristics of the booster without modifying the ground plane layer 2801. Some of the possible interconnections are shown in FIGS. 28*b* and 28*c*.

In some examples, the indentation in the ground plane layer 2801 has a physical dimension smaller than a fourth, or than a tenth, or than a fiftieth of the longest free-space operating wavelength of the booster. In some other examples, the physical dimension of the indentation in the ground plane layer is about a fourth of the longest free-space operating wavelength of the radiation booster.

Figure 28B:
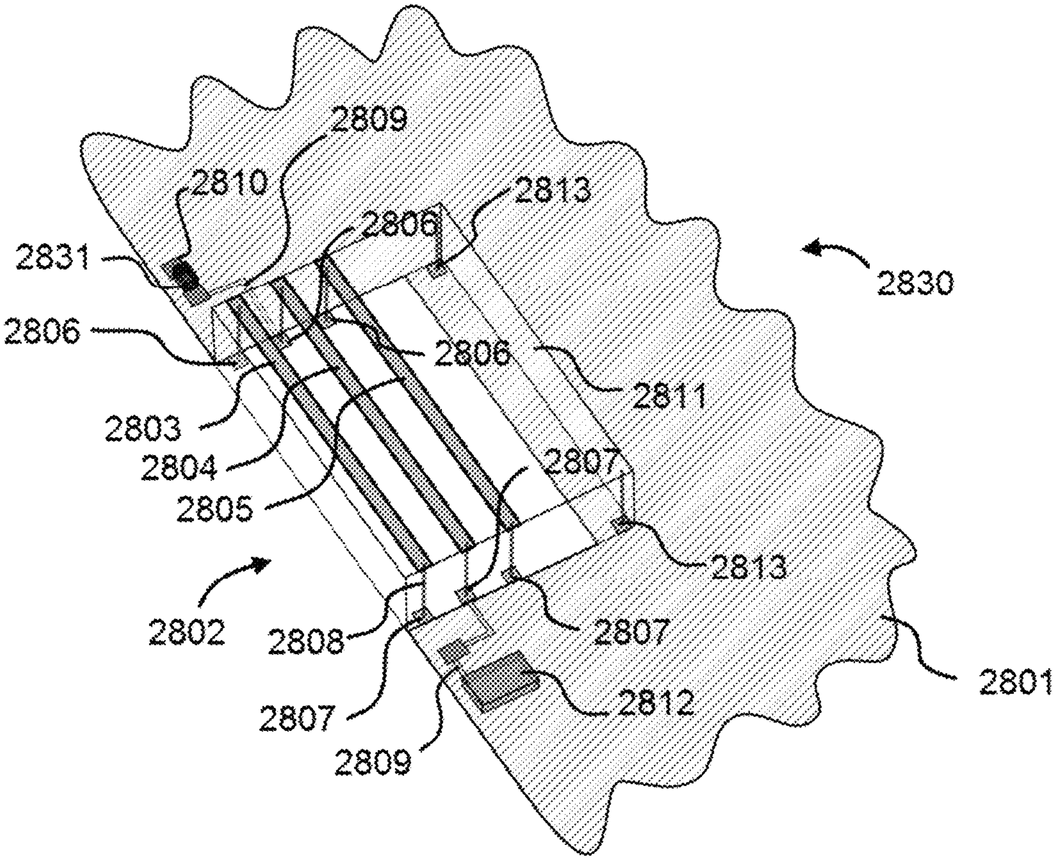

FIG. 28*b* shows an example of a radiating structure 2830 similar to the one in FIG. 28*a*, in which the tuning of the radiation booster 2802 is done with metallic strip 2804 and an SMD component 2831 for impedance matching purposes prior to the connection to the ground plane 2810.

Figure 28C:
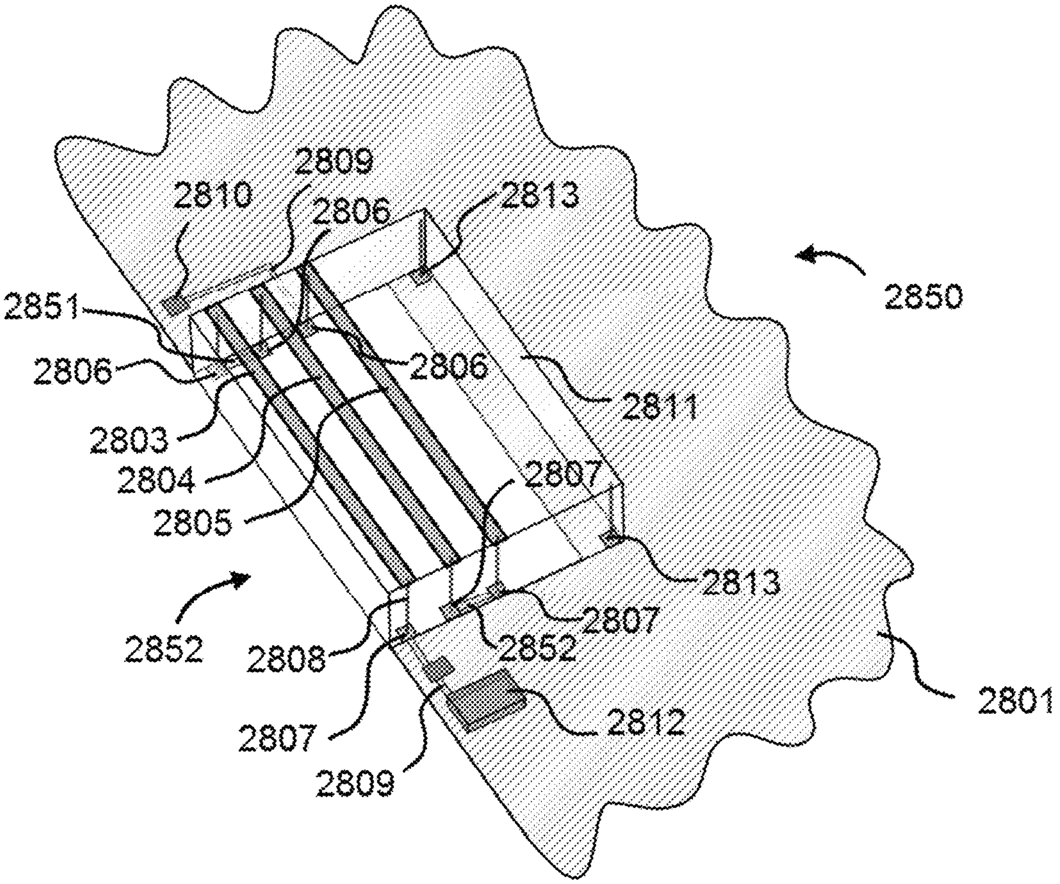

FIG. 28*c* shows another example of a radiating structure 2850 configured to modify, (e.g. maximize) the electrical path of the currents. The metallic strips 2803, 2804 and 2805 are interconnected for instance to increase the length of the path from the chip 2812, which can be a front end module in other embodiments, to the ground plane 2810. Specifically, conductive areas 2806 from linear conductive elements 2803 and 2804 are interconnected with for instance a conductive trace 2851, and pads 2807 corresponding to linear conductive elements 2804 and 2805 are also interconnected with conductive trace 2852. In other examples, the pads are interconnected with elements such as jumpers, inductors, capacitors, switches or other components that allow reconfiguring the electric characteristics of the booster.

A stand-alone component comprising radiation booster 2802 fits in one or more of any of the limiting volumes described in the present invention.

Figure 29A:
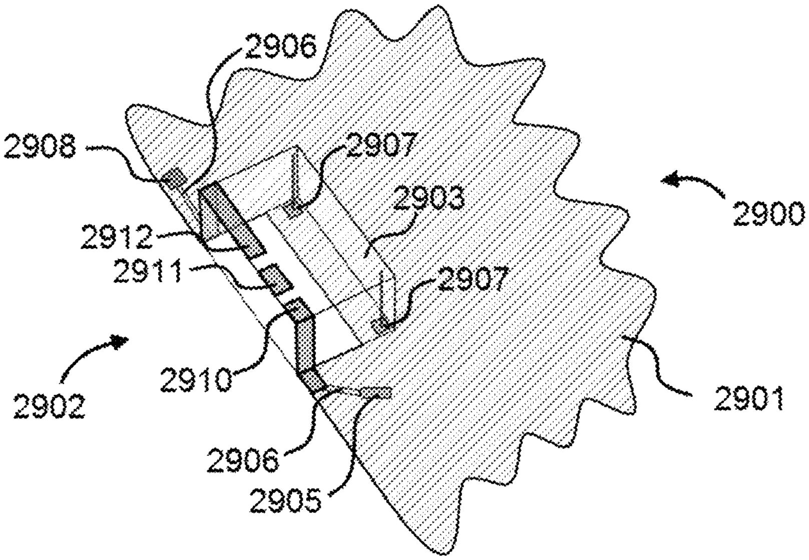
FIGS. 29*a*, 29*b*, and 29*c* show examples of radiating structures comprising a radiation booster which can be reconfigured.

FIG. 29*a* shows a radiating structure 2900 that comprises a stand-alone component 2902 in the ground plane layer 2901. The stand-alone component, which includes a radiation booster, comprises a dielectric support 2903 and a linear conductive element in the form of a strip for advantageously tuning the radiation booster 2902. The linear conductive element can be printed or etched at the edges of the dielectric element for instance, and the ends of said conductive element are connected to the feeding point 2905 and to the ground plane 2908 with a connecting means 2906. Said strip comprises two or more parts, such as for instance three parts 2910, 2911 and 2912 which result in several gaps for allocating components (SMD components for example) in series for further adjustment of the electric performance of the radiation booster 2902. The dielectric support is soldered to pads 2907 for its attachment to the ground plane layer 2901.

Figure 29B:
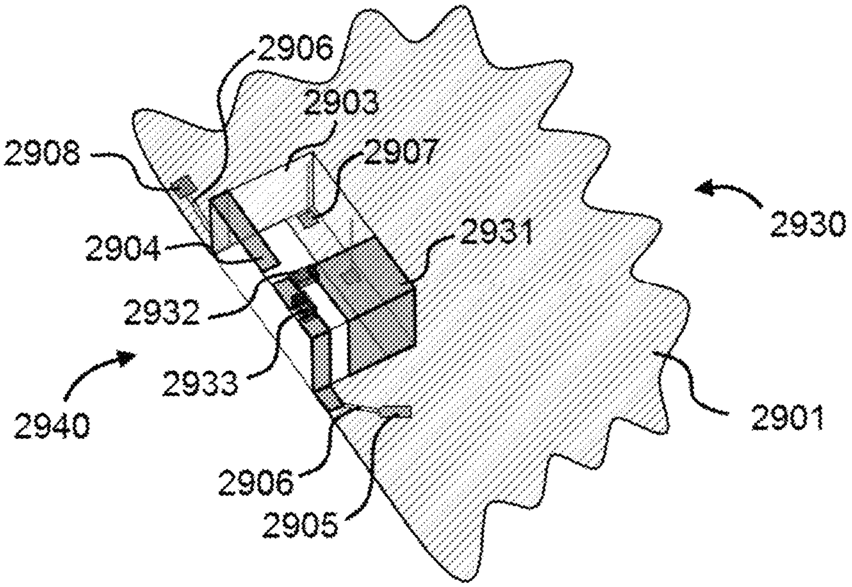

FIG. 29*b* shows an example of a radiating structure 2930 similar to 2900 where the radiation booster 2940 features a linear conductive element such as metallic strip 2904 and further comprises a conductive surface element 2931. In this example, element 2931 might be used to connect one or more shunt components 2932 in addition to components in series 2933, for instance SMD components. The use of, for instance, integrated elements (such as for instance trace notches, gaps or narrow linear or meandering strips) for capacitive or inductive coupling between conductive areas instead of SMD components is also possible.

Figure 29C:
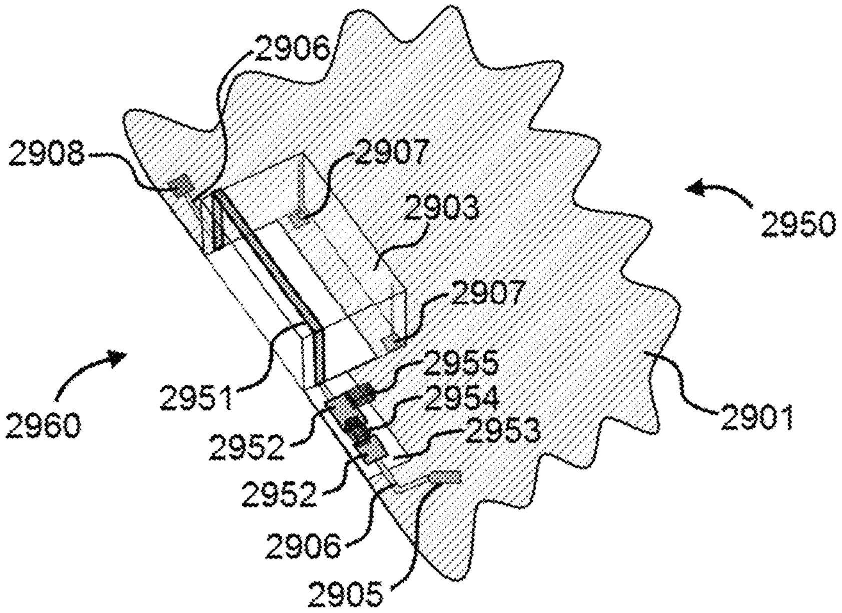

FIG. 29*c* shows another example of a radiating structure 2950 comprising a radiation booster 2960 in a stand-alone component which is placed on a ground plane layer 2901 featuring a slot or an indentation. In this embodiment, a matching network is provided between feeding point 2905 and metallic strip 2951. Series 2954 and shunt 2955 components are installed in pads 2952 provided on a layer of dielectric substrate 2953.

A stand-alone component comprising radiation booster 2902, or 2940, or 2960 from FIGS. 29*a*, 29*b* and 29*c*, fits in one or more of any of the limiting volumes described in the present invention.

In some embodiments, the physical dimension of the slot or indentation is about a fourth of the longest free-space operating wavelength of the radiation booster. In some other examples, the slot or indentation in the ground plane layer 2901 has its physical dimension smaller than a fourth, or than a tenth, or than a fiftieth of the longest free-space operating wavelength of the booster.

Figure 30A:
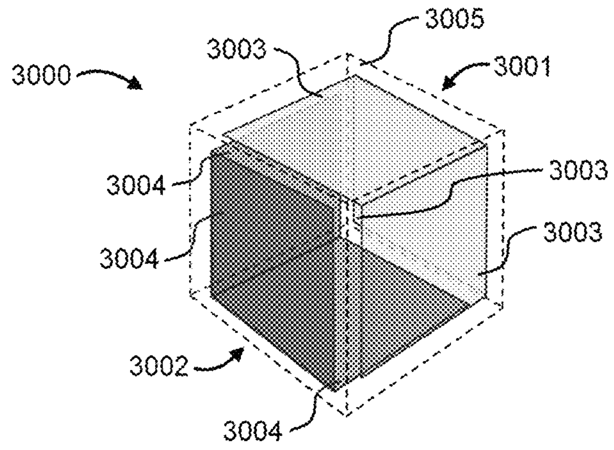
FIGS. 30*a* and 30*b* show examples of concentrated radiation boosters.

FIG. 30*a* shows a stand-alone component comprising two concentrated radiation boosters 3000 in a dielectric support 3005 (shown transparent and with dashed lines for illustrative purposes). In this particular example, the first radiation booster 3001 comprises three substantially quadrilateral sides 3003. The second radiation booster 3002 also comprises three substantially quadrilateral sides 3004. The first radiation booster 3001 is configured to operate in a first frequency region, and the second radiation booster 3002 is configured to operate in the same first frequency region, or in a second frequency region, or a combination of both.

In some other examples, the two radiation boosters comprise different numbers of sides, for instance and without being limited by these examples, the first radiation booster has four sides and the second booster one or two sides. In other embodiments, a first booster might substantially cover 5 sides and a second booster might cover one side respectively.

Figure 30B:
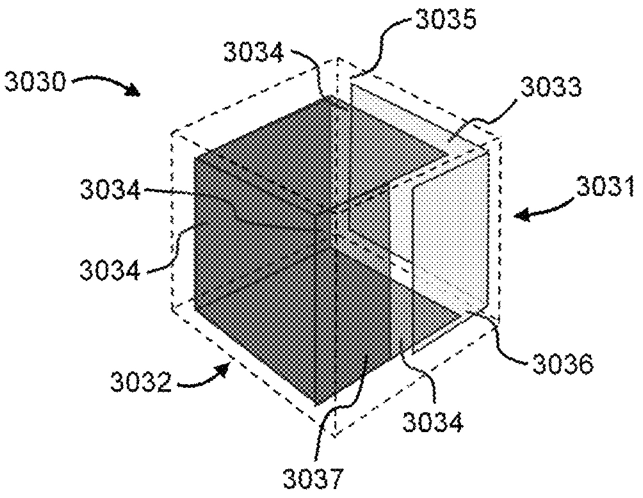

FIG. 30*b* shows another example of a compact configuration for two radiation boosters 3030, operating in two frequency regions, in a dielectric support 3035 featuring a prism like shape. In this example, the first radiation booster 3031 has two surface conductive elements: a substantially quadrilateral one 3033, and another one that is substantially quadrilateral 3036 which has an approximate area equal to a fraction (e.g. half) of the area of the quadrilateral side 3033. The second radiation booster 3032 comprises four substantially quadrilateral sides 3034 with substantially same surface, and a fifth substantially quadrilateral side 3037 that has different-sized surface (e.g. a smaller surface) than the four quadrilateral sides 3034.

In other embodiments, the sides of the radiation boosters have shapes different than quadrilaterals and the dielectric substrate 3035 takes the form of a cylinder or cone for instance.

Stand-alone components 30*a* and 30*b* might be built, for instance, by stamping and bending conductive sheets which eventually might become supported by a dielectric element, such as for instance a plastic carriers including heat-stakes to attach the stamped elements. In other embodiments, said components are manufactured by means of a double injection process such as for instance a MID technique, which can be for instance combined with LDS. Still, in other embodiments, those stand-alone components are manufactured by metallizing a dielectric foam. A stand-alone component comprising boosters 3000 or 3030 fits in one or more of any of the limiting volumes described in the present invention.

Figure 31:
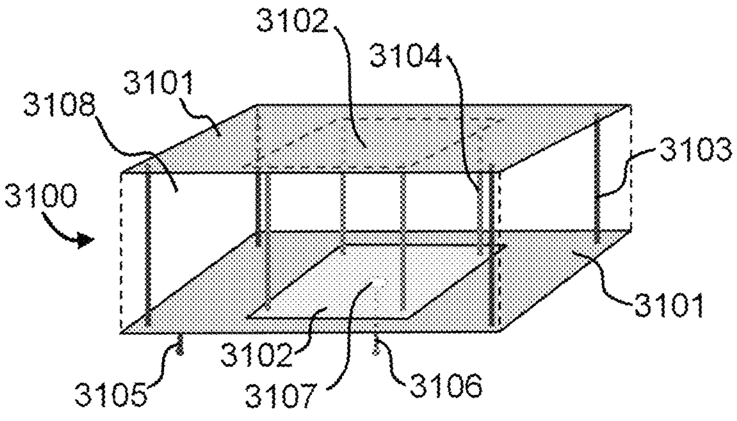
FIG. 31 is an example of two radiation boosters in a stacked configuration.

FIG. 31 shows an example of two stacked radiation boosters 3100 within a dielectric substrate 3108 that can be implemented on a multiple layer dielectric substrate for instance. More particularly, the first radiation booster comprises two conducting surfaces 3102 interconnected with electroplated via holes 3104 or the like (the pads are not represented in this figure) and has the connection 3106 for a radiofrequency system that goes through an opening 3107 in the bottom conducting surface 3101 of the second radiation booster, whose top and bottom conducting surfaces are interconnected with connecting means 3103 as well. The second radiation booster also has a connection 3105 for a radiofrequency system. In this example, the first radiation booster operates in a first frequency region and the second booster operates in said first frequency region, or in a second frequency region or in a combination of both.

In other embodiments the connections 3105 and 3106 of both radiation boosters can be arranged laterally with conductive traces for instance, or in other different ways that would not require the hole 3107 in one of the conductive surfaces.

Figure 32:
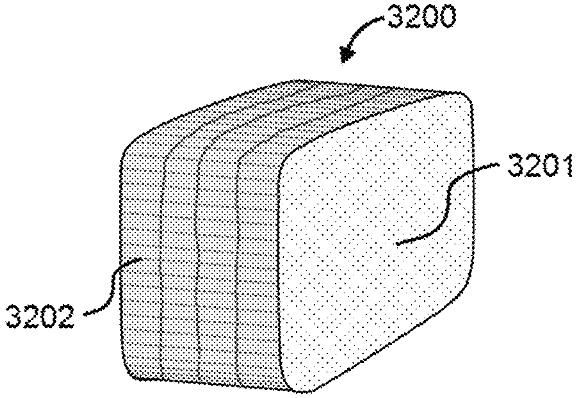
FIG. 32 is an example of a radiation booster wrapped in conductive fabric.

FIG. 32 shows a radiation booster 3200 that is substantially shaped as a rectangular cuboid and made of conductive or dielectric foam 3201. The radiation booster has a plurality of its faces wrapped in a conductive fabric 3202. In other embodiments, the radiation booster may be, for instance, completely wrapped with conductive fabric or with a layer of graphene. Radiation booster 3200 entirely fits in one or more of any of the limiting volumes described in the present invention.

Figure 33:
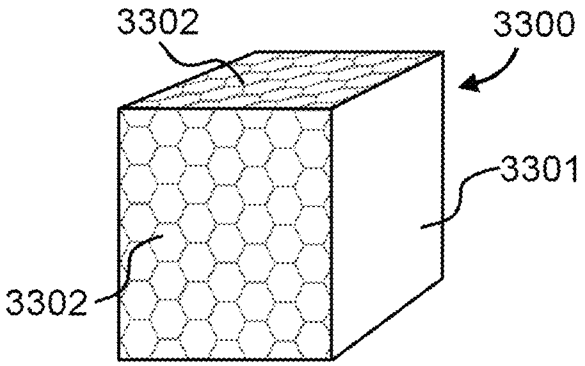
FIG. 33 is an example of a radiation booster wrapped in a layer of graphene.

FIG. 33 shows a substantially cubic radiation booster 3300 that is a dielectric or conductive element 3301, and which has a layer of graphene 3302 wrapping a plurality of the radiation booster faces. The radiation booster may have, in other examples, faces shaped as polygons different from squares, for instance rectangles. Radiation booster 3300 entirely fits in one or more of any of the limiting volumes described in the present invention.

Figure 34:
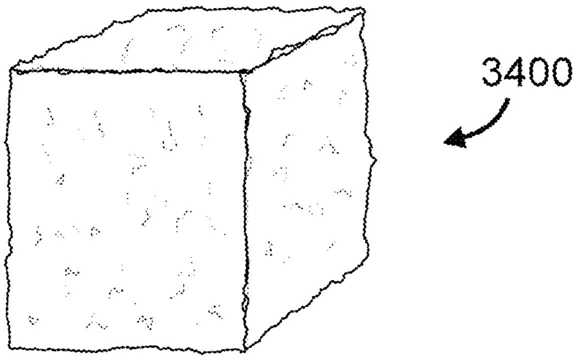
FIG. 34 is an example of a radiation booster made of a graphene foam.

FIG. 34 shows a radiation booster 3400 that is fabricated using graphene foam. This particular example shows a radiation booster having a substantially cubic shape but in other examples the shape of the booster is substantially a parallelepiped or the like. Radiation booster 3400 entirely fits in one or more of any of the limiting volumes described in the present invention.

Figure 35:
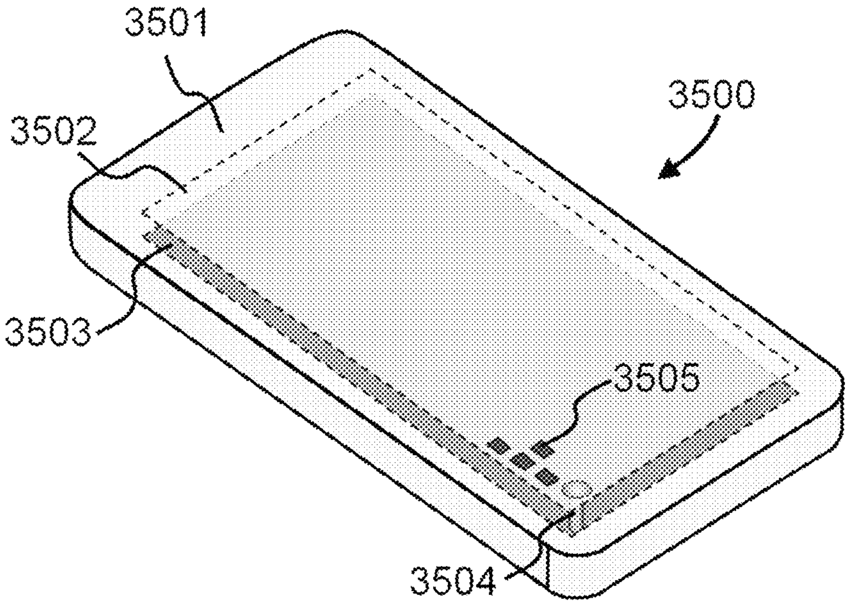
FIG. 35 is an example of a wireless handheld device reusing an existing element as a radiation booster.

FIG. 35 shows an illustrative example of a wireless handheld device 3500 in which an existing element of the device, that already performs a particular task, is configured to additionally function as a radiation booster according to the present invention. In this particular example, under the back cover 3501 of the cellular phone, a screw 3504 attaching, with a metallic connection, a dielectric support 3502 inside the device (for holding the camera of the device, for example) to the PCB 3503 is used as a radiation booster. Additionally, one or a plurality of pads 3505 are provided for integrating a matching network using SMD and/or integrated components.

In some other embodiments, elements having metallic casings and which are included in the device, such as a vibrating device for example, are used as radiation boosters. In some other embodiments, the device is a portable device such as a laptop.

Figure 36A:
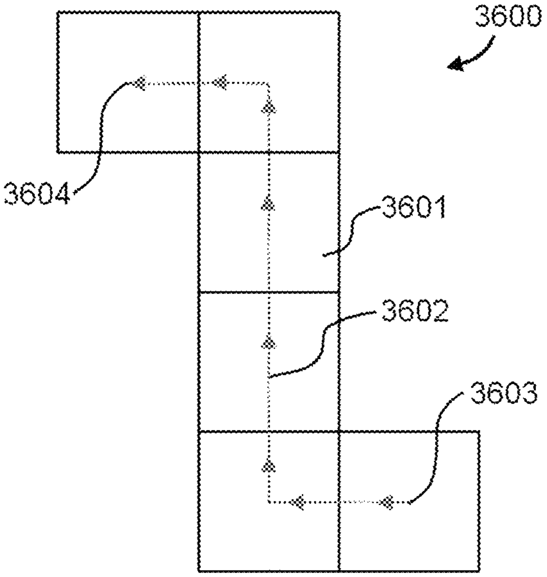
FIGS. 36*a* and 36*b* show an example of a radiation booster in which the electrical current goes through all the sides of the booster.
Figure 36B:
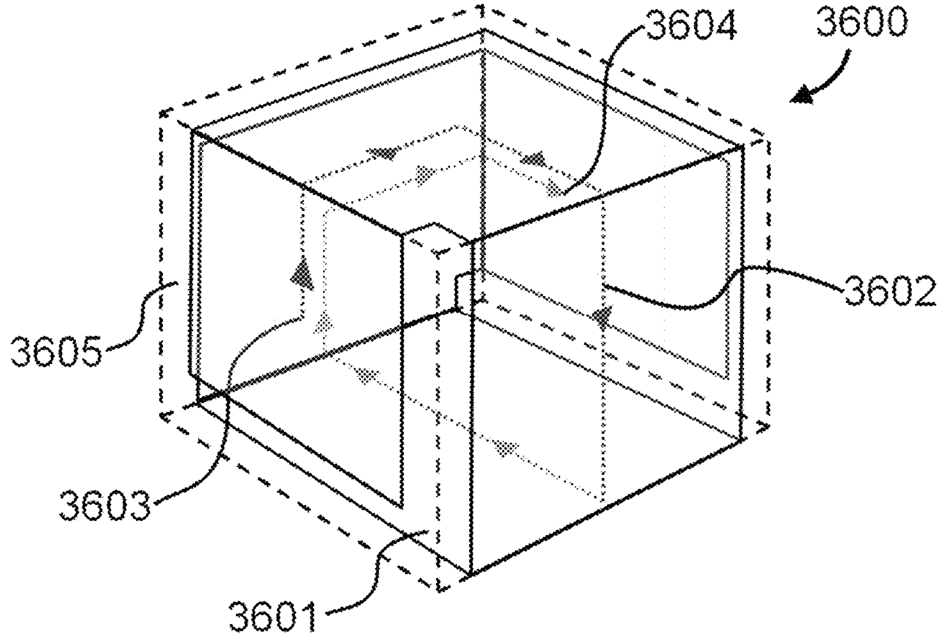

FIG. 36 shows two-dimensional (a) and three-dimensional (b) representations of a concave and substantially cubic radiation booster 3600 whose sides are arranged in a sequential manner on a dielectric support 3605. This arrangement makes the electrical path 3602 to be longer as the current goes through all conductive surfaces 3601 starting in side 3603 and ending in side 3604.

In some other examples, the radiation booster is a parallelepiped where the sequential arrangement of the radiation booster sides is done with sides differently shaped, with shapes such as rectangles or the like.

Figure 37:
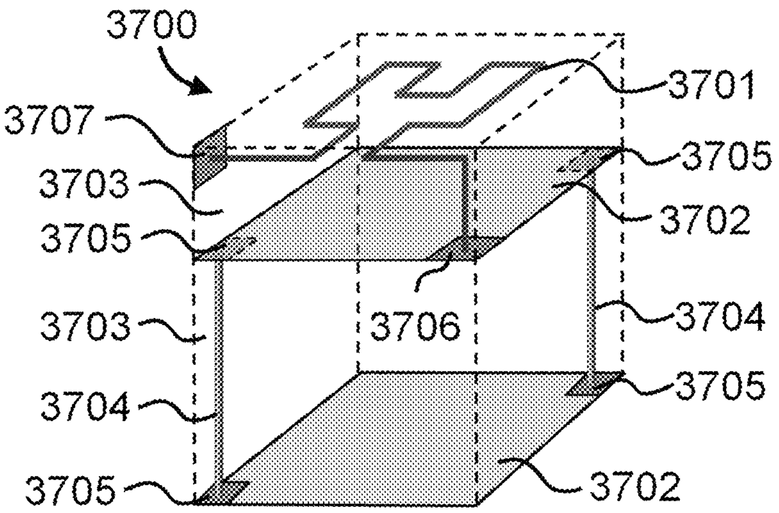
FIG. 37 is an example of a radiation booster comprising a linear conductive element for advantageously cancelling the reactance of the radiation booster.

FIG. 37 shows an example of a radiation booster 3700 comprising a dielectric substrate 3703 and several conductive parts (3701 and 3702) that can be implemented, for instance, on a multilayer PCB. More specifically, a conductive element with multiple substantially linear segments 3701 features an advantageous inductive behavior that partially or completely cancels the reactance of the radiation booster, where said conductive element 3701 can be a conductive trace for instance. One end of the curve is connected to pad 3707, which is used for connecting the booster to the radiofrequency system, and the other end of conductive element 3701 is coupled to the upper surface conductive element 3702 of the radiation booster with a connection to pad 3706. The top and the bottom conducting surfaces 3702 are interconnected with linear conductive elements (e.g. vias) using pads 3705.

In some other examples, the conductive element 3701 is shaped as a space-filling curve featuring ten or more segments. In this particular example, said element 3701 has the shape of a Hilbert curve.

Figure 38:
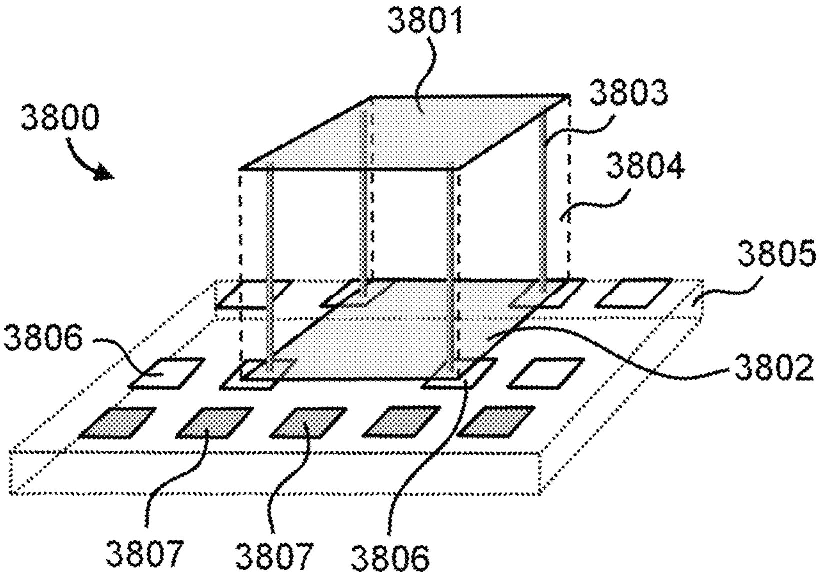
FIG. 38 is an example of a radiation booster in package.

FIG. 38 shows an example of a radiation booster in package 3800. The top and the bottom conducting surfaces 3801 and 3802, spaced by a dielectric support 3804, are connected with connection means 3803, such as linear conducting elements or via holes, for instance. Several pads 3806 (illustrated in white) provided on the dielectric support 3805 (which could be FR4 for example) are used for making electrical connection with the radiation booster, so owing to the multiplicity of pads 3806 radiation boosters of different sizes or form factors can be integrated. Additional conducting areas 3807 (illustrated in gray) can allocate devices or circuits like, for instance, reactance cancellation circuits, filters, broadband matching networks or SMD components. This advantageously reduces the integration of said types of devices on the PCB of the device in which the radiation booster 3800 is installed. The connection between pads 3806 and 3807 can be done with shunt or series SMD components or conducting traces, for example.

Figure 39A:
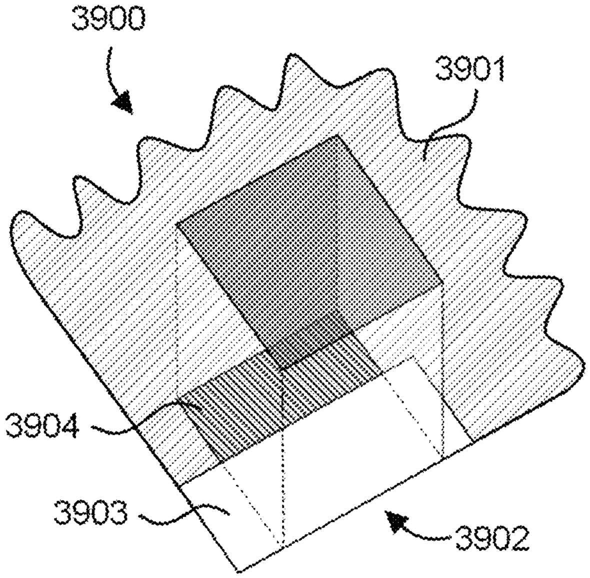
FIGS. 39*a* and 39*b* are examples of radiation boosters arranged on a clearance area of a ground plane layer.
Figure 39B:
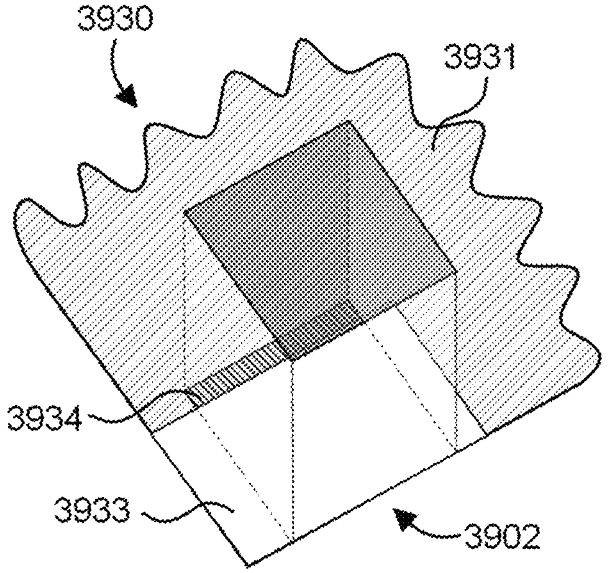

FIGS. 39*a* and 39*b* show examples of radiating structures 3900 and 3930 in which the footprint of a radiation booster 3902 partially overlaps the conductive part of the ground plane layer 3901 (*a*) and 3931 (*b*). In these examples, a clearance area 3903 (*a*) and 3933 (*b*) is provided on the ground plane layer, wherein the clearance area is a region with a substantial portion of the metal of the ground plane layer removed. The part of the footprint of the radiation booster 3902 that intersects with the conductive surface of the ground plane layer is, for instance, less than a 50% in (a) and less than 10% in (b) of the booster footprint (shown with stripe pattern 3904 and 3934 for illustrative purposes only). In other embodiments, the footprint of the radiation booster overlaps with the conductive part of the ground plane layer is about a 60% or less, a 40% or less, a 30% or less, a 20% or less, a 5% or less or even a 0% of the booster footprint.

The radiation booster 3902 can be any of the radiation boosters described in the present invention.

What is claimed is:

1. A stand-alone component for a radiating system of a wireless device, the stand-alone component comprising:

a dielectric support including one or more surfaces; and first and second conductive surface elements on the one or more surfaces of the dielectric support and electrically connected by a conductor, wherein:

the first and second conductive surface elements are spaced by the dielectric support;

the stand-alone component features a parallelepiped shape and has a maximum dimension smaller than $1/20^{th}$ of a wavelength corresponding to a frequency of 1,710 MHZ, the stand-alone component enabling transmission or reception of electromagnetic wave signals in the radiating system at the wavelength; and the stand-alone component is configured to be connected to a radiofrequency system and coupled to a ground plane within the radiating system.

2. The stand-alone component of claim 1, wherein the first and second conductive surface elements are on a same surface of the dielectric support.

3. The stand-alone component of claim 1, wherein the conductor is embedded in the dielectric support.

4. The stand-alone component of claim 1, wherein the conductor is a via.

5. The stand-alone component of claim 1, wherein the conductor is a surface conductor on a face of the dielectric support.

6. The stand-alone component of claim 1, wherein the first and second conductive surface elements are on two opposite faces of the dielectric support, and the conductor comprises two conductive elements on opposite ends of a longest side of the parallelepiped shape.

7. The stand-alone component of claim 1, further comprising a third conductive surface element on a surface of the dielectric support, the third conductive surface element being spaced by a dielectric gap from the first and second conductive surface elements and being ohmically unconnected with the first and second conductive surface elements.

8. The stand-alone component of claim 1, wherein the stand-alone component comprises a conductive structure that features an open loop shape and includes the first and second conductive surface elements and the conductor.

9. The stand-alone component of claim 1, wherein the stand-alone component comprises a conductive structure that features a closed loop shape and includes the first and second conductive surface elements and the conductor.

10. The stand-alone component of claim 1, wherein the stand-alone component comprises two surfaces not comprising conductive elements.

11. The stand-alone component of claim 1, wherein the stand-alone component does not resonate within any operating frequency band of the radiating system when disconnected from the radiofrequency system.

12. The stand-alone component of claim 1, wherein the dielectric support comprises first and second surfaces that are parallel to each other, and the first conductive surface element is on the first surface and the second conductive surface element is on the second surface.

13. The stand-alone component of claim 1, wherein the second conductive surface element is a pad that connects the stand-alone component to the radiofrequency system.

14. The stand-alone component of claim 1, wherein the radiating system and the stand-alone component provide multiband operability for cellular bands comprising at least two frequency bands separated by a gap.

15. A stand-alone component for a radiating system of a wireless device, the stand-alone component comprising:
a dielectric support including one or more surfaces; and
first and second conductive surface elements on the one or more surfaces of the dielectric support and electrically connected by a conductor, wherein:
the first and second conductive surface elements are spaced by the dielectric support;
the stand-alone component features a parallelepiped shape and has a maximum dimension smaller than $1/20^{th}$ of a wavelength corresponding to a frequency of 690 MHz, the stand-alone component enabling transmission or reception of electromagnetic wave signals in the radiating system at the wavelength; and
the stand-alone component is configured to be connected to a radiofrequency system and coupled to a ground plane within the radiating system.

16. A stand-alone component for a radiating system of a wireless device, the stand-alone component comprising:
a dielectric support including one or more surfaces; and
first and second conductive surface elements on the one or more surfaces of the dielectric support and electrically connected by a conductor, wherein;
the first and second conductive surface elements are spaced by the dielectric support;
the stand-alone component features a parallelepiped shape and has a maximum dimension smaller than $1/20^{th}$ of a wavelength corresponding to a frequency of 824 MHz, the stand-alone component enabling transmission or reception of electromagnetic wave signals in the radiating system at the wavelength; and
the stand-alone component is configured to be connected to a radiofrequency system and coupled to a ground plane within the radiating system.

17. The stand-alone component of claim 15, wherein the dielectric support comprises first and second surfaces that are parallel to each other, and the first conductive surface element is on the first surface and the second conductive surface element is on the second surface.

18. The stand-alone component of claim 15, wherein the stand-alone component does not resonate at the wavelength when disconnected from the radiofrequency system.

19. The stand-alone component of claim 16, wherein the dielectric support comprises first and second surfaces that are parallel to each other, and the first conductive surface element is on the first surface and the second conductive surface element is on the second surface.

20. The stand-alone component of claim 16, wherein the stand-alone component does not resonate at the wavelength when disconnected from the radiofrequency system.

21. The stand-alone component of claim 1, wherein the stand-alone component has a maximum dimension smaller than $1/40^{th}$ of the wavelength.

22. The stand-alone component of claim 1, wherein the stand-alone component has a maximum dimension smaller than $1/100^{th}$ of the wavelength.

23. The stand-alone component of claim 15, wherein the stand-alone component has a maximum dimension smaller than $1/40^{th}$ of the wavelength.

24. The stand-alone component of claim 15, wherein the stand-alone component has a maximum dimension smaller than $1/100^{th}$ of the wavelength.

25. The stand-alone component of claim 16, wherein the stand-alone component has a maximum dimension smaller than $1/40^{th}$ of the wavelength.

26. The stand-alone component of claim 16, wherein the stand-alone component has a maximum dimension smaller than $1/100^{th}$ of the wavelength.

27. A stand-alone component for a radiating system of a wireless device, the stand-alone component comprising:
a dielectric support including one or more surfaces; and
first and second conductive surface elements on the one or more surfaces of the dielectric support and electrically connected by a conductor, wherein:
the first and second conductive surface elements are spaced by the dielectric support;
the stand-alone component features a parallelepiped shape and has a maximum dimension smaller than $1/20^{th}$ of a wavelength corresponding to a frequency of 2.4 GHz, the stand-alone component enabling transmission or reception of electromagnetic wave signals in the radiating system at the wavelength; and
the stand-alone component is configured to be connected to a radiofrequency system and coupled to a ground plane within the radiating system.

28. The stand-alone component of claim 27, wherein the dielectric support comprises first and second surfaces that are parallel to each other, and the first conductive surface element is on the first surface and the second conductive surface element is on the second surface.

29. The stand-alone component of claim 27, wherein the stand-alone component does not resonate at the wavelength when disconnected from the radiofrequency system.

30. The stand-alone component of claim 27, wherein the stand-alone component has a maximum dimension smaller than $1/40^{th}$ of the wavelength.

31. The stand-alone component of claim 27, wherein the stand-alone component has a maximum dimension smaller than $1/100^{th}$ of the wavelength.

* * * * *